United States Patent
Hirano et al.

(10) Patent No.: US 10,338,388 B2
(45) Date of Patent: Jul. 2, 2019

(54) LIGHT GUIDE UNIT, IMAGE DISPLAY DEVICE, AND DISPLAY APPARATUS

(71) Applicant: Sony Corporation, Tokyo (JP)

(72) Inventors: Takaaki Hirano, Kanagawa (JP); Hiroshi Isobe, Kanagawa (JP); Koji Fukumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/659,784

(22) Filed: Mar. 17, 2015

(65) Prior Publication Data

US 2015/0277125 A1 Oct. 1, 2015

(30) Foreign Application Priority Data

Mar. 25, 2014 (JP) .................. 2014-062235

(51) Int. Cl.
 *G02B 27/01* (2006.01)
 *F21V 8/00* (2006.01)

(52) U.S. Cl.
 CPC ....... *G02B 27/0172* (2013.01); *G02B 6/0088* (2013.01); *G02B 6/0093* (2013.01);
 (Continued)

(58) Field of Classification Search
 CPC . G02B 27/01; G02B 27/0101–27/0103; G02B 27/0149; G02B 27/017; G02B 27/0172; G02B 27/0179; G02B 27/0189; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127; G02B 2027/0129; G02B 2027/013; G02B 2027/0132; G02B 2027/0134; G02B 2027/0136;
 (Continued)

(56) References Cited

U.S. PATENT DOCUMENTS 5,742,366 A 4/1998 Imoto
8,411,134 B2 4/2013 Tomita
(Continued)

FOREIGN PATENT DOCUMENTS

CN 202 922 965 U 5/2013
EP 539907 A2 5/1993
(Continued)

OTHER PUBLICATIONS

No Author Listed, Silicone Rubber, Wikipedia, the free encyclopedia, https://en.wikipedia.org/wiki/Silicone_rubber, last modified May 22, 2012, last accessed Jul. 5, 2016, 4 pages.

*Primary Examiner* — Robert E. Tallman
*Assistant Examiner* — Gary W O'Neill
(74) *Attorney, Agent, or Firm* — Wolf, Greenfield & Sacks, P.C.

(57) ABSTRACT

There is provided an image display device that comprises an image forming unit and a light guide unit.
The light guide unit includes a light guide plate configured to guide light of an image formed in the image forming unit, and a support member. The light guide plate is supported by one or more buffer members at, at least, a plurality of portions of the support member.

21 Claims, 38 Drawing Sheets

(52) U.S. Cl.
CPC ..... *G02B 27/0101* (2013.01); *G02B 27/0149* (2013.01); *G02B 27/0176* (2013.01); *G02B 2027/011* (2013.01); *G02B 2027/0132* (2013.01); *G02B 2027/0161* (2013.01); *G02B 2027/0174* (2013.01); *G02B 2027/0178* (2013.01)

(58) Field of Classification Search
CPC ...... G02B 2027/0138; G02B 2027/014; G02B 2027/0141; G02B 2027/0143; G02B 2027/0145; G02B 2027/0147; G02B 2027/015; G02B 2027/0152; G02B 2027/0154; G02B 2027/0156; G02B 2027/0158; G02B 2027/0159; G02B 2027/0161; G02B 2027/0163; G02B 2027/0165; G02B 2027/0167; G02B 2027/0169; G02B 2027/0174; G02B 2027/0178; G02B 2027/0181; G02B 2027/0183; G02B 2027/0185; G02B 2027/0187; G02B 2027/019; G02B 2027/0192; G02B 2027/0194; G02B 2027/0196; G02B 2027/0198
See application file for complete search history.

(56) References Cited

U.S. PATENT DOCUMENTS

| | | | |
|---|---|---|---|
| 8,570,242 B2 | 10/2013 | Chosokabe et al. | |
| 8,797,433 B2 | 8/2014 | Kaizu et al. | |
| 8,861,090 B2 | 10/2014 | Mukawa | |
| 8,976,453 B2 | 3/2015 | Akutsu et al. | |
| 8,988,315 B2 | 3/2015 | Mukawa et al. | |
| 9,016,864 B2 | 4/2015 | Sasazaki et al. | |
| 9,164,221 B2 | 10/2015 | Akutsu et al. | |
| 9,311,752 B2 | 4/2016 | Chosokabe et al. | |
| 9,451,244 B2 | 9/2016 | Sasazaki et al. | |
| 9,488,846 B2 | 11/2016 | Hayashi | |
| 9,558,540 B2 | 1/2017 | Mukawa | |
| 9,658,456 B2 | 5/2017 | Mukawa | |
| 9,726,890 B2 | 8/2017 | Akutsu et al. | |
| 2002/0060758 A1 | 5/2002 | Jeong et al. | |
| 2003/0128307 A1 | 7/2003 | Ito et al. | |
| 2004/0212754 A1 | 10/2004 | Wang | |
| 2005/0264711 A1 | 12/2005 | Chen et al. | |
| 2008/0011944 A1 | 1/2008 | Chua et al. | |
| 2009/0180054 A1 | 7/2009 | Chen | |
| 2009/0268287 A1* | 10/2009 | Buchon | G02B 7/12 359/480 |
| 2010/0027275 A1 | 2/2010 | Ohmi et al. | |
| 2010/0073582 A1 | 3/2010 | Konno et al. | |
| 2010/0128107 A1 | 5/2010 | Tomita | |
| 2011/0241975 A1* | 10/2011 | Mukawa | G02B 5/32 345/8 |
| 2011/0248905 A1 | 10/2011 | Chosokabe et al. | |
| 2012/0044571 A1 | 2/2012 | Mukawa | |
| 2012/0069448 A1 | 3/2012 | Sugihara et al. | |
| 2012/0113092 A1 | 5/2012 | Bar-Zeev et al. | |
| 2012/0127434 A1 | 5/2012 | Sasazaki et al. | |
| 2012/0200934 A1* | 8/2012 | Fujishiro | G02B 27/0172 359/630 |
| 2012/0218426 A1 | 8/2012 | Kaizu et al. | |
| 2012/0306940 A1* | 12/2012 | Machida | G02B 6/005 345/690 |
| 2012/0320100 A1* | 12/2012 | Machida | G02B 27/017 345/690 |
| 2013/0083404 A1 | 4/2013 | Takagi et al. | |
| 2013/0128611 A1 | 5/2013 | Akutsu et al. | |
| 2013/0135749 A1 | 5/2013 | Akutsu et al. | |
| 2013/0207964 A1 | 8/2013 | Fleck et al. | |
| 2013/0242555 A1 | 9/2013 | Mukawa | |
| 2013/0250608 A1 | 9/2013 | Chen et al. | |
| 2013/0300766 A1 | 11/2013 | Mukawa | |
| 2014/0022284 A1 | 1/2014 | Chosokabe et al. | |
| 2014/0062841 A1* | 3/2014 | Ishikawa | G02B 27/0176 345/8 |
| 2014/0232619 A1* | 8/2014 | Hiraide | G02B 27/0172 345/8 |
| 2014/0334010 A1 | 11/2014 | Mukawa | |
| 2014/0340286 A1 | 11/2014 | Machida et al. | |
| 2014/0340550 A1 | 11/2014 | Kaizu et al. | |
| 2015/0062699 A1 | 3/2015 | Hayashi | |
| 2015/0109679 A1 | 4/2015 | Mukawa et al. | |
| 2015/0138646 A1* | 5/2015 | Tatsugi | G02B 6/005 359/633 |
| 2015/0138647 A1 | 5/2015 | Akutsu et al. | |
| 2015/0226970 A1 | 8/2015 | Mukawa | |
| 2015/0229897 A1 | 8/2015 | Mukawa | |
| 2015/0235620 A1 | 8/2015 | Takahota et al. | |
| 2015/0260994 A1 | 9/2015 | Akutsu et al. | |
| 2015/0260995 A1 | 9/2015 | Mukawa | |
| 2015/0277126 A1 | 10/2015 | Hirano et al. | |
| 2015/0288954 A1 | 10/2015 | Sasazaki et al. | |
| 2015/0338660 A1 | 11/2015 | Mukawa | |
| 2015/0346494 A1 | 12/2015 | Tanaka et al. | |
| 2015/0362735 A1 | 12/2015 | Akutsu et al. | |
| 2015/0370075 A1 | 12/2015 | Ato et al. | |
| 2016/0004090 A1 | 1/2016 | Popovich et al. | |
| 2016/0041394 A1 | 2/2016 | Tanaka et al. | |
| 2016/0062123 A1 | 3/2016 | Tanaka et al. | |
| 2016/0097931 A1 | 4/2016 | Takahota et al. | |
| 2016/0131831 A1 | 5/2016 | Tomomasa | |
| 2016/0147069 A1 | 5/2016 | Tanaka et al. | |
| 2016/0154243 A1 | 6/2016 | Aiki | |
| 2017/0069140 A1 | 3/2017 | Mukawa | |
| 2017/0184857 A1 | 6/2017 | Ato et al. | |

FOREIGN PATENT DOCUMENTS

| | | |
|---|---|---|
| EP | 2 442 177 A1 | 4/2012 |
| JP | 09-005722 A | 1/1997 |
| JP | 2006-162767 A | 6/2006 |
| JP | 2007-094175 A | 4/2007 |
| JP | 2010-087560 A | 4/2010 |
| WO | WO 2008/143418 A1 | 11/2008 |
| WO | WO 2012/165318 A1 | 12/2012 |
| WO | WO 2013/027004 A1 | 2/2013 |
| WO | WO 2013/143191 A1 | 10/2013 |
| WO | WO 2013/166773 A1 | 11/2013 |

* cited by examiner

LIGHT GUIDE UNIT, IMAGE DISPLAY DEVICE, AND DISPLAY APPARATUS

CROSS REFERENCE TO RELATED APPLICATIONS

This application claims the benefit of Japanese Priority Patent Application JP 2014-062235 filed Mar. 25, 2014, the entire contents of which are incorporated herein by reference.

BACKGROUND

The present disclosure relates to a display apparatus and, more specifically, to a display apparatus for use as a head mounted display (HMD), for example, and also to an image display device suitable for use in the display apparatus, and a light guide unit suitable for use in the image display device.

Japanese Patent Application Laid-Open No. 2006-162767 describes a virtual image display device (image display device), for example. This virtual image display device is well known to provide two-dimensional (2D) images as enlarged virtual images by a virtual-image optical system. Herein, the 2D images are those formed by an image forming unit and provided to be viewed by viewers.

This image display device 1100 includes, as shown in the conceptual view of FIG. 38, an image forming unit 111, a collimator optical system 112, and a light guide section 120. The image forming unit 111 includes a plurality of pixels that are arranged in a 2D matrix. The collimator optical system 112 collimates light coming from each of the pixels in the image forming unit 111. The light guide section 120 guides and emits the resulting collimated light coming from the collimator optical system 112. The light emitted from the light guide section 120 is then guided to eyes 21 of a viewer 20. The light guide section 120 is configured by a light guide plate 121, and first and second deflection sections 130 and 140. The light guide plate 121 propagates therein the incoming light by total reflection, and then emits the light. The first deflection section 130 is a single-layer light reflection film, for example, and reflects the light entered the light guide plate 121 so as to achieve total reflection therein. The second deflection section 140 is a multi-layer light reflection film in the multi-layer film structure, and emits the light from the light guide plate 121 after the light is propagated therein by total reflection. If such an image display device 1100 configures an HMD, for example, the resulting display apparatus may be reduced in weight and size.

As another virtual image display device well known to provide, for viewing by a viewer, 2D images formed by an image forming unit as enlarged virtual images by an image forming unit, Japanese Patent Application Laid-Open No. 2007-094175 describes a virtual image display device (image display device) using a holographic diffraction grating, for example.

This image display device 1300 basically includes, as shown in the conceptual view of FIG. 39, the image forming unit 111 that displays images, the collimator optical system 112, and a light guide section 320. In the light guide section 320, light coming from the image forming unit 111 is guided to the eyes 21 of the viewer 20. Such a light guide section 320 includes a light guide plate 321, and first and second diffraction grating members 330 and 340. The first and second diffraction grating members 330 and 340 are each a reflective volumetric holographic diffraction grating provided to the light guide plate 321. Collimated light from the collimator optical system 112 enters a first plane 322 of the light guide plate 321, and then is emitted from the first plane 322. The light guide plate 321 has a second plane 323, which is parallel to the first plane 322 thereof. The second plane 323 is attached with the first and second diffraction grating members 330 and 340.

SUMMARY

Such image display devices as above, however, have degradation problems of display images to be viewed by a viewer, e.g., pixel displacement in images or deformed images, due to deviation of light caused by the light being guided by the expanded/contracted light guide plate. The expansion/contraction of the light guide plate is resulted from a temperature difference between the outside air and the viewer's body when the light guide plate is exposed to the outside air, or a transient change of temperature when the viewer moves in/out from a room, for example. A difference of thermal expansion coefficients between the members in the light guide section is also a cause. As an example, Japanese Patent Application Laid-Open No. 2010-087560 describes a head-mounted image display device in which a rod-shaped light guide section is elastically retained by a retaining section to be able to change in position. In the retaining section, at least a part for retaining an end portion of the rod-shaped light guide section is elastic. However, the light guide section being retained at an end portion by the elastic part does not solve the degradation problems of display images, which are caused by the expanded/contracted light guide plate resulted from an environmental temperature change or a difference of thermal expansion coefficients between the members in the light guide unit.

It is thus desirable to provide a light guide unit configured to prevent, without fail, the degradation problems of display images, which are caused by the expanded/contracted light guide plate resulted from an environmental temperature change or a difference of thermal expansion coefficients between the members therein. It is also desirable to provide an image display device including such a light guide unit, and a display apparatus including such an image display device.

In some embodiments, an image display device is provided, comprising: an image forming unit; and a light guide unit, the light guide unit including a light guide plate configured to guide light of an image formed in the image forming unit, and a support member, the light guide plate being supported by one or more buffer members at, at least, a plurality of portions of the support member.

In some embodiments, an image display device is provided, comprising: an image forming unit; and a light guide unit, the light guide unit including a light guide plate configured to guide light of an image formed in the image forming unit, and a support member, the light guide plate and the support member including therebetween a fixing member, the fixing member being provided around the light guide plate to fix the light guide plate to the support member.

In some embodiments, a light guide unit is provided, comprising: a light guide plate; and a support member, the light guide plate being supported by one or more buffer members, the one or more buffer members supporting the light guide plate at, at least, a plurality of portions of the support member.

In some embodiments, a light guide unit is provided, comprising: a light guide plate; and a support member, the light guide plate and the support member including therebetween a fixing member, the fixing member being provided around the light guide plate to fix the light guide plate to the support member.

In some embodiments, a display apparatus is provided, comprising: a frame; and an image display device attached to the frame, the image display device including an image forming unit, and a light guide unit, the light guide unit including a light guide plate configured to guide light of an image formed in the image forming unit, and a support member, the light guide plate being supported by one or more buffer members, the one or more buffer members supporting the light guide plate at, at least, a plurality of portions of the support member.

In some embodiments, a display apparatus is provided, comprising: a frame; and an image display device attached to the frame, the image display device including an image forming unit, and a light guide unit, the light guide unit including a light guide plate configured to guide light of an image formed in the image forming unit, and a support member, the light guide plate and the support member including therebetween a fixing member, the fixing member being provided around the light guide plate to fix the light guide plate to the support member.

According to a first embodiment of the present disclosure, there is provided a light guide unit including a light guide plate, and a support member, the light guide plate being supported by a buffer member at a plurality of portions of the support member.

According to a second embodiment of the present disclosure, there is provided a light guide unit including a light guide plate, and a support member, the light guide plate and the support member including therebetween a fixing member, the fixing member being provided around the light guide plate to fix the light guide plate to the support member.

According to the first or second embodiment of the present disclosure, there is provided an image display device, including an image forming unit, and a light guide unit, the light guide unit including a light guide plate, and a support member, the light guide plate being configured to guide light of an image formed in the image forming unit. In the image display device according to the first embodiment of the present disclosure, the light guide plate is supported by a buffer member at a plurality of portions of the support member. In the image display device according to the second embodiment of the present disclosure, the light guide plate and the support member include therebetween the fixing member, the fixing member being provided around the light guide plate to fix the light guide plate to the support member.

According to the first or second embodiment of the present disclosure, there is provided a display apparatus, including a frame configured to be mounted on a viewer's head portion, and an image display device attached to the frame, the image display device including an image forming unit, and a light guide unit, the light guide unit including a light guide plate configured to guide light of an image formed in the image forming unit, and a support member.

In the display apparatus according to the first embodiment of the present disclosure, the light guide plate is supported by a buffer member at a plurality of portions of the support member. In the display apparatus according to the second embodiment of the present disclosure, the light guide plate and the support member include therebetween a fixing member, the fixing member being provided around the light guide plate to fix the light guide plate to the support member.

In the light guide unit, the image display device, or the display apparatus in the first embodiment of the present disclosure, the light guide plate is supported by the support member using the buffer member at a plurality of portions. Such a configuration can prevent, without fail, the degradation problems of display images that are caused by the expanded/contracted light guide plate resulted from an environmental temperature change or a difference of thermal expansion coefficients between the members in the light guide unit. Such a configuration also can retain the light guide plate with sufficient stability. Moreover, in the light guide unit, the image display device, or the display apparatus in the second embodiment of the present disclosure, the fixing member for use to fix the light guide plate to the support member is disposed therebetween and around the light guide plate. Such a configuration can prevent, without fail, the degradation problems of display images that are caused by the expanded/contracted light guide plate resulted from an environmental temperature change or a difference of thermal expansion coefficient between the members in the light guide unit. Such a configuration also can retain the light guide plate with sufficient stability. Note that the effects described in this Specification are by way of example only and in no way restrictive, and any additional effects are to be applied.

These and other objects, features and advantages of the present disclosure will become more apparent in light of the following detailed description of best mode embodiments thereof, as illustrated in the accompanying drawings.

DETAILED DESCRIPTION OF EMBODIMENTS

Figure 1:
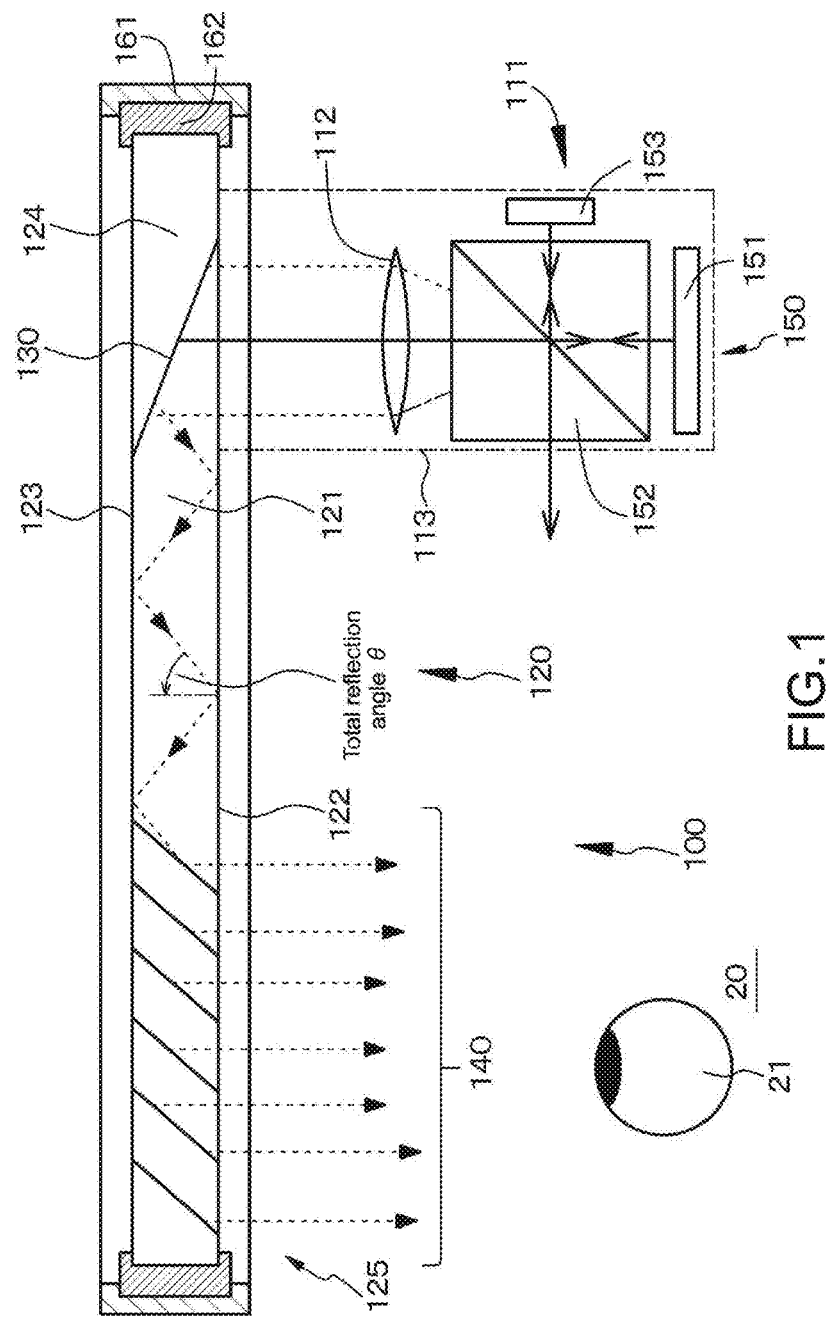
FIG. 1 is a conceptual view of an image display device in a display apparatus in Example 1.

Hereinafter, Examples of the present disclosure will be
described with reference to the drawings. The present dis-
closure is not restricted to Examples, and various numeric
values and materials in Examples are illustrative and not
restrictive. The description is given in the following order.

1. Description about Light Guide Unit, Image Display
Device, and Display Apparatus according to First and Second Embodiments of Present Disclosure, and Overall
Description 2. Example 1 (Light Guide Unit, Image Display Device,
and Display Apparatus according to First Embodiment of
Present Disclosure)

3. Example 2 (Modification of Example 1)

4. Example 3 (Another Modification of Example 1)

5. Example 4 (Modification of Example 3)

6. Example 5 (Light Guide Unit, Image Display Device
and Display Apparatus according to Second Embodiment of
Present Disclosure)

7. Example 6 (Modification of Examples 1 to 5)

8. Example 7 (Modification of Example 6)

9. Example 8 (Another Modification of Example 6)

10. Example 9 (Modification of Examples 1 to 8)

11. Example 10 (Modification of Example 9)

12. Example 11 (Another Modification of Example 9)

13. Example 12 (Modification of Examples 6 to 11)

14. Example 13 (Modification of Examples 6 to 12)

15. Example 14 (Modification of Examples 1 to 13)

16. Example 15 (Modification of Example 14), and Others

[Description about Light Guide Unit, Image Display Device
and Display Apparatus According to First and Second
Embodiments of Present Disclosure, and Overall Description]

In the below, the expression of "light guide unit or others
in the first embodiment of the present disclosure" means a
light guide unit in a first embodiment of the present disclosure, a light guide unit in an image display device in the first
embodiment of the present disclosure, and a light guide unit
in a display apparatus in the first embodiment of the present
disclosure. Moreover, the expression of "light guide unit or
others in the second embodiment of the present disclosure"
means a light guide unit in a second embodiment of the
present disclosure, a light guide unit in an image display
device in the second embodiment of the present disclosure,
and a light guide unit in a display apparatus in the second
embodiment of the present disclosure.

In the light guide unit or others in the first embodiment of
the present disclosure, desirably, using a buffer member, a
light guide plate is supported at a plurality of portions of a
support member opposed to each other with the light guide
plate being sandwiched therebetween. In such a light guide
unit or others in the first embodiment of the present disclosure, the buffer member may have an elastic modulus lower
than that of the light guide plate. Further, in such a desirable
light guide unit or others in the first embodiment of the
present disclosure, the buffer member may be made of resin.
Still further, also in such a desirable light guide unit or others
in the first embodiment of the present disclosure, the support
member may be shaped like a picture frame to be around the
light guide plate. The resin for the buffer member is specifically exemplified by epoxy resin, modified silicone resin,
epoxy-modified silicone resin, or urethane resin. However,
these examples are not restrictive, and the buffer member
may also be made of a porous material, specifically including porous alumina, porous silicon carbide, porous carbon,
sintered porous plastic media, and others, or silica aerogel.

In the light guide unit or others in the second embodiment
of the present disclosure, a fixing member may be provided
with a buffer area. If this is the configuration, the buffer area
may be formed with a void or a notch section. Alternatively, the fixing member may be a spring that is specifically exemplified by a leaf spring or a meandering spring. Still alternatively, the fixing member may be an adhesive layer. If this is the configuration, the adhesive layer may be formed with a void or a notch section. The fixing member or the adhesive layer serving as the fixing member may be specifically made of epoxy resin, modified silicone resin, epoxy-modified silicone resin, urethane resin, acrylic resin, or others, but this is not restrictive. Still alternatively, the buffer area may be provided to the light guide plate on the outer circumferential portion thereof, and if this is the configuration, the buffer area may be formed with a void or a notch section. Still alternatively, the buffer area may be provided to the support member on the inner circumferential portion thereof, and if this is the configuration, the buffer area may be formed with a void or a notch section. The void or the notch section may be left as it is, or may be filled with a material having an elastic modulus lower than that of the member formed with the void or the notch section. The void or the notch section may be desirably extended along the longitudinal direction of the light guide plate.

In the light guide unit or others in the first embodiment of the present disclosure, the buffer member may

[1-1] attach the light guide plate to the support member by being entirely in contact with the outer circumferential portion of the light guide plate, or

[1-2] attach the light guide plate to the support member by being in contact with at least two areas in the outer circumferential portion of the light guide plate, e.g., when the light guide plate is in a rectangular shape, by being in contact with at least one area on each of the two opposing sides, or by being in contact with at least one area on each of the two adjacent sides, or by being in contact with at least two out of four corners of the square.

Moreover, in the light guide unit or others in the second embodiment of the present disclosure, the fixing member may

[2-1] attach the light guide plate to the support member by being entirely in contact with the outer circumferential portion of the light guide plate, or

[2-2] attach the light guide plate to the support member by being in contact with at least four areas in the outer circumferential portion of the light guide plate, e.g., when the light guide plate is in a rectangular shape, by being in contact with at least one area on each of the sides, or by being in contact with at least a plurality of areas on one of the sides. In some cases, the fixing member may

[2-3] attach the light guide plate to the support member by being in contact with at least one area in the outer circumferential portion of the light guide plate, e.g., when the light guide plate is in a rectangular shape, by being in contact with a plurality of areas on one of the sides, or

[2-4] attach the light guide plate to the support member by being in contact with two areas in the outer circumferential portion of the light guide plate, e.g., when the light guide plate is in a rectangular shape, by being in contact with two areas on one of the sides, or by being in contact with one area on each of the two sides, or

[2-5] attach the light guide plate to the support member by being in contact with three areas in the outer circumferential portion of the light guide plate, e.g., when the light guide plate is in a rectangular shape, by being in contact with a plurality of areas on one of the sides, or by being in contact with one area on each of the three sides.

The top surface of the support member on the opposite side to a viewer, or in some cases, the surface (second plane) of the light guide plate on the opposite side to the viewer may desirably be provided with a protection member (protection plate) for protecting the light guide plate.

In the light guide unit or others in the first and second embodiments of the present disclosure, the support member may be made of various types of materials that are described for the light guide plate, or may be made of a metal or alloy material including magnesium alloy, aluminum, and aluminum alloy, for example.

The material for the light guide plate is specifically exemplified by a transparent glass substrate including soda lime glass and super white glass, an optical glass including quartz glass and BK7, a plastic substrate, a plastic sheet, and a plastic film. Herein, the plastic material is exemplified by polyethylene terephthalate, polyethylene naphthalate, polycarbonate, cellulose ester such as acetylcellulose, fluorinated polymer such as copolymer of polyvinylidene difluoride or polytetrafluoroethylene and hexafluoropropene, polyether such as polyoxymethylene, polyacetal, polystyrene, polyethylene, polypropylene, polyolefin such as methylpentene polymer, polyimide including polyamideimide, or polyetherimide, polyamide, polyethersulfone, polyphenylene sulfide, polyvinylidene difluoride, tetraacetyl cellulose, bromphenoxy, polyarylate, polysulfone, PMMA (polymethyl methacrylate), acrylic resin, cycloolefin polymer (COP) resin, or others. The plastic sheet and film may be rigid not to be easily bent, or may be flexible.

Moreover, such a light guide unit in various desirable configurations as above may be provided with a dimmer unit. To be specific, the dimmer unit may be attached to the light guide plate or to the frame, for example. The provision of such a dimmer unit may prevent degradation of images for viewing by a viewer that is caused by light from outside, and may obtain high-contrast images for viewing by the viewer.

The image display device in the first or second embodiment of the present disclosure may include A. an image forming unit, and B. a light guide unit configured to receive light coming from the image forming unit, guide the light, and emit the light. The light guide unit may include a. a light guide plate configured to propagate therein by total reflection the light provided by the image forming unit, and emit the light, i.e., light guide plate configured to guide the light of an image formed by the image forming unit), b. a first deflection section configured to deflect at least a part of the light directed into the light guide plate to achieve total reflection of the light in the light guide plate, and c. a second deflection section configured to deflect the light propagated in the light guide plate by total reflection to emit the light from the light guide plate. Herein, the term of "total reflection" means total reflection or total reflection in the light guide plate. This is also applicable to the below.

The light guide unit may be transmissive or semi-transmissive (see-through type). To be specific, at least a part of the light guide unit facing the eyes of a viewer may be transmissive or semi-transmissive (see-through), and through such a part of the light guide unit, the viewer may see the outside view. The display apparatus in the first or second embodiment of the present disclosure may include one image display device (monocular type), or two image display devices (binocular type).

In this Specification, when the term of "semi-transmissive" is used, it does not mean that one half (50%) of incoming light is passed through or reflected, but means that incoming light is partially passed through and the remaining is reflected.

In such a desirable display apparatus, a desirable image display device, and a desirable light guide unit in the first or second embodiment of the present disclosure, the first deflection section reflects light directed into the light guide unit, and the second deflection section passes through and reflects the light after the light is propagated in the light guide plate by total reflection. In this configuration, the first deflection section may serve as a reflection mirror, and the second deflection section may serve as a semi-transmissive mirror. For entirely reflecting the light directed into the light guide plate, the first deflection section may be made of metal including alloy to serve as a light reflection film (a kind of mirror) that reflects the light directed into the light guide plate. For partially reflecting the light directed into the light guide plate, the first deflection section may be a multi-layer film structure of a plurality of dielectric layers, a half mirror, or a polarized beam splitter. The first deflection section reflects at least a part of the collimated light directed into the light guide plate so as to achieve total reflection of the light in the light guide plate. On the other hand, the second deflection section reflects the collimated light for a plurality of times after the light is propagated by total reflection in the light guide plate. The light remains collimated when it is emitted from the light guide plate. The second deflection section may be a multi-layer film structure of a plurality of dielectric layers, a half mirror, a polarized beam splitter, or a holographic diffraction grating film. These first and second deflection sections are both provided in the light guide plate (incorporated in the light guide plate), and the first deflection section reflects the collimated light directed into the light guide plate so as to achieve total reflection of the light in the light guide plate. On the other hand, the second deflection section reflects or diffracts the collimated light for a plurality of times after the light is propagated by total reflection in the light guide plate. The light remains collimated when it is emitted from the light guide plate.

Alternatively, the first deflection section may diffract and reflect the light directed into the light guide plate, and the second deflection section may diffract and reflect the light for a plurality of times after the light is propagated by total reflection in the light guide plate. In this configuration, the first and second deflection sections may be each configured by a diffraction grating element. These diffraction grating elements may be each a reflective diffraction grating element or a transmissive diffraction grating element, or one of the diffraction grating elements may be a reflective diffraction grating element, and the remaining diffraction grating element may be a transmissive diffraction grating element. The reflective diffraction grating element is exemplified by a reflective volumetric holographic diffraction grating. For convenience, the first deflection section being a reflective volumetric holographic diffraction grating is sometimes referred to as "first diffraction grating member", and the second deflection section being a reflective volumetric holographic diffraction grating is sometimes referred to as "second diffraction grating member".

The display apparatus in the first or second embodiment of the present disclosure offers image display in a color, e.g., green. In this case, with the viewing angle divided into two, more specifically, with the viewing angle equally divided into two, for example, the first deflection section for use may be a laminate structure of two diffraction grating members, each of which corresponds to one-half of the viewing angle. When the display apparatus offers color image display, the first and second deflection sections may be each a laminate structure of P diffraction grating members in order to be ready for diffraction and reflection of P types of light in P different wavelength bands (or wavelengths), e.g., P is 3 for red, green, and blue. In this case, the diffraction grating members are each formed with an interference pattern corresponding to one wavelength band (or wavelength). Alternatively, to be ready for diffraction and reflection of P types of light in P different wavelength bands (or wavelengths), one-layer diffraction grating member may be formed with P types of interference patterns. Still alternatively, first to third light guide plates may be stacked together with an interval thereamong. The first light guide plate is provided with a diffraction grating member being a layer of reflective volumetric holographic diffraction grating that diffracts and reflects light in a red wavelength band (or wavelength). The second light guide plate is provided with a diffraction grating member being a layer of reflective volumetric holographic diffraction grating that diffracts and reflects light in a green wavelength band (or wavelength). The third light guide plate is provided with a diffraction grating member being a layer of reflective volumetric holographic diffraction grating that diffracts and reflects light in a blue wavelength band (or wavelength). Such configurations accordingly increase the diffraction efficiency, increase the angle available for diffraction, and optimize the angle at which diffraction and reflection occur when the light in each wavelength band (or wavelength) is diffracted and reflected in the diffraction grating members.

The first and second diffraction grating members are each made of a photopolymer material. The first and second diffraction grating members each being a reflective volumetric holographic diffraction grating may be the same as a previous reflective volumetric holographic diffraction grating in terms of basic material and configuration. The reflective volumetric holographic diffraction grating means a holographic diffraction grating that diffracts and reflects only +1 order diffracted light. The diffraction grating member is formed with an interference pattern from the inside to the surface, and the interference pattern itself may be formed similarly to a previous interference pattern. As a specific example, a substance to be a diffraction grating member, e.g., photopolymer material, may be exposed to object light from a first predetermined direction on one side, and at the same time, the substance is also exposed to reference light from a second predetermined direction on the other side. Such exposure to the object light and the reference light accordingly forms an interference pattern, and the resulting interference pattern may be recorded inside of the substance. With the appropriately-selected first and second predetermined directions, and with the appropriately-selected wavelengths for the object and reference light, the resulting interference pattern may have a desired pitch and a desired slant angle on the surface of the diffraction grating member. The slant angle of the interference pattern means an angle at which the surface of the diffraction grating member (or the diffraction grating layer) forms with the interference pattern. When the first and second diffraction grating members are each a laminate structure of P diffraction grating layers each being a reflective volumetric holographic diffraction grating, the P diffraction grating layers may be formed separately, and then stacked (bonded) one on the other using a UV (ultraviolet) curing agent. For forming the P diffraction grating layers, alternatively, a diffraction grating layer may be first formed using an adhesive photopolymer material, and for attachment thereon, other diffraction grating layers may be then formed one by one also using an adhesive photopolymer material.

In such a desirable display apparatus in the first or second embodiment of the present disclosure, the image forming unit may include a plurality of pixels arranged in a 2D matrix. Such an image forming unit may be referred to as "first image forming unit" for convenience.

The first image forming unit may be configured by a reflective spatial light modulator and a light source, by a transmissive spatial light modulator and a light source, or by a light-emitting element such as light-emitting diode (LED), semiconductor laser element, organic EL (Electro Luminescence) element, or inorganic EL element. The desirable image forming unit is configured by a reflective spatial light modulator and a light source. The spatial light modulator is exemplified by a light bulb, including a transmissive or reflective liquid crystal display such as LCOS (Liquid Crystal On Silicon), and a digital micro mirror device (DMD). The light source is exemplified by the above-mentioned light-emitting element. The reflective spatial light modulator may be a polarized beam splitter with which light coming from the liquid crystal display and the light source is partially reflected and directed to the liquid crystal display, and the light reflected by the liquid crystal display is partially passed and directed to the optical system. The light-emitting element for the light source includes red, green, blue, and white light emitting elements. Alternatively, the light emitted from these red, green, and blue light-emitting elements, i.e., red, green, and blue light, may be mixed and made uniform in luminance using a light bulb to obtain white light. Such light-emitting elements may be each a semiconductor laser element, a solid laser, or an LED, for example. The number of the pixels may be determined based on the performance specifications expected for the image display device, and the specific number of the pixels may be 320×240, 432×240, 640×480, 854×480, 1024×768, or 1920×1080, for example. The collimator optical system that will be described later is capable of converting information about pixel position into information about angle of the light guide section in the optical system. The collimator optical system has the positive optical power as a whole, and is a convex lens, a concave lens, a free-shaped prism, or a holographic lens, or a combination thereof, for example.

Alternatively, in the display apparatus in the first or second embodiment of the present disclosure, the image forming unit may include a light source, and a scanning section that scans collimated light coming from the light source. Such an image forming unit may be referred to as "second image forming unit" for convenience.

The light source in the second image forming unit may be a light-emitting element, specifically including red, green, blue, and white light-emitting elements. Alternatively, the light emitted from these red, green, and blue light-emitting elements, i.e., red, green, and blue light, may be mixed and made uniform in luminance using a light bulb to obtain white light. Such light-emitting elements may be each a semiconductor laser element, a solid laser, or an LED, for example. The number of the pixels (virtual pixels) in the second image forming unit may also be determined based on the performance specifications expected for the image display device, and the specific number of the pixels (virtual pixels) may be 320×240, 432×240, 640×480, 854×480, 1024×768, or 1920×1080, for example. When the light source is configured by the red, green, and blue light-emitting elements for color image display, a cross prism is desirably used for color composition, for example. The scanning section scans horizontally and vertically light coming from the light source, and may be a MEMS (Micro Electro Mechanism Systems) including a micro mirror that is rotatable in the 2D direction, or a galvano mirror, for example. A relay optical system that will be described next may be a well-known relay optical system.

In the first or second image forming unit, the optical system collimates light, and directs the resulting collimated light beams into the light guide plate. Such an optical system is sometimes referred to as "collimator light emitting optical system", and is specifically a collimator optical system or a relay optical system. The reason for the light to remain collimated is that information about optical wavefront when such light beams are directed into the light guide plate is expected to be stored even after the light beams are emitted therefrom via the first and second deflection sections. For generating collimated light beams, a light emitting section of the image forming unit may be positioned at the focal length in the collimator light emitting optical system, for example. The collimator light emitting optical system is capable of converting information about pixel position into information about angle of the light guide section in the optical system. The collimator light emitting optical system has the positive optical power as a whole, and is a convex lens, a concave lens, a free-shaped prism, or a holographic lens, or a combination thereof, for example.

Still alternatively, as the image forming unit or the light source configured by light-emitting elements and a light bulb, the following configurations may be also possible other than the combination of a backlight that emits white light as a whole, and a liquid crystal display including red, green, and blue light-emitting pixels.

[Image Forming Unit A]

An image forming unit A may include

α. a first image forming unit being a first light-emitting panel in which first light-emitting elements are arranged in a 2D matrix, the first light-emitting elements emitting blue light, β. a second image forming unit being a second light-emitting panel in which second light-emitting elements are arranged in a 2D matrix, the second light-emitting elements emitting green light, γ. a third image forming unit being a third light-emitting panel in which third light-emitting elements are arranged in a 2D matrix, the third light-emitting elements emitting red light, and δ. a section configured to collectively direct the light emitted from the first, second, and third image forming units to a single optical path, e.g., this section is a dichroic prism, and this is also applicable to the below.

The image forming unit A controls light-emission/no light-emission of the first, second, and third light-emitting elements.

[Image Forming Unit B]

An image forming unit B includes

α. a first image forming unit including first light-emitting elements that emit blue light, and a first light-pass control unit configured to control light-pass/no light-pass of light coming from the first blue light-emitting elements, i.e., this first light-pass control unit is a kind of light bulb, and may be a liquid crystal display, a digital micro mirror device (DMD), or an LCOS, for example, and this is also applicable to the below, β. a second image forming unit including second light-emitting elements that emit green light, and a second light-pass control unit (light bulb) configured to control light-pass/no light-pass of light coming from the second green light-emitting elements, and γ. a third image forming unit including third light-emitting elements that emit red light, and a third light-pass control unit (light bulb) configured to control light-pass/no light-pass of light coming from the third red light-emitting elements, and δ. a section configured to collectively direct the light passed through the first, second, and third light-pass control units to a single optical path.

Image display is performed by the light-pass control units controlling light-pass/no light-pass of light coming from the light-emitting elements. For guiding the light from the first, second, and third light-emitting elements to the light-pass control units, a section (light directing member) in use may be a light guide member, a micro lens array, a mirror, a reflection plate, or a condenser lens, for example.

[Image Forming Unit C]

An image forming unit C includes

α. a first image forming unit including a first light-emitting panel, and a blue light-pass control unit (light bulb), the first light-emitting panel including first light-emitting elements arranged in a 2D matrix, the first light-emitting elements emitting blue light, the blue light-pass control unit being a unit configured to control light-pass/no light-pass of light coming from the first light-emitting panel, β. a second image forming unit including a second light-emitting panel, and a green light-pass control unit (light bulb), the second light-emitting panel including second light-emitting elements arranged in a 2D matrix, the second light-emitting elements emitting green light, the green light-pass control unit being a unit configured to control light-pass/no light-pass of light coming from the second light-emitting panel, γ. a third image forming unit including a third light-emitting panel, and a red light-pass control unit (light bulb), the third light-emitting panel including third light-emitting elements arranged in a 2D matrix, the third light-emitting elements emitting red light, the red light-pass control unit being a unit configured to control light-pass/no light-pass of light coming from the third light-emitting panel, and δ. a section configured to collectively direct the light emitted from the blue, green, and red light-pass control units to a single optical path.

Image display is performed by the light-pass control units (light bulbs) controlling light-pass/no light-pass of light coming from these first, second, and third light-emitting panels.

[Image Forming Unit D]

An image forming unit D is a field-sequential color image forming unit, including α. a first image forming unit including first light-emitting elements that emit blue light, β. a second image forming unit including second light-emitting elements that emit green light, γ. a third image forming unit including third light-emitting elements that emit red light, δ. a section configured to collectively direct light emitted from the first, second, and third image forming units to a single optical path, and ε. a light-pass control unit (light bulb) configured to control light-pass/no light-pass of light emitted from the optical-path-directing section.

Image display is performed by the light-pass control unit controlling light-pass/no light-pass of light coming from these light-emitting elements.

[Image Forming Unit E]

An image forming unit E is also a field-sequential color image forming unit, including α. a first image forming unit being a first light-emitting panel including first light-emitting elements arranged in a 2D matrix, the first light-emitting elements emitting blue light, β. a second image forming unit being a second light-emitting panel including second light-emitting elements arranged in a 2D matrix, the second light-emitting elements emitting green light, γ. a third image forming unit being a third light-emitting panel including third light-emitting elements arranged in a 2D matrix, the third light-emitting elements emitting red light, δ. a section configured to collectively direct light emitted from the first, second, and third image forming units to a single optical path, and ε. a light-pass control unit (light bulb) configured to control light-pass/no light-pass of light emitted from the optical-path-directing section.

Image display is performed by the light-pass control unit controlling light-pass/no light-pass of light coming from these light-emitting panels.

[Image Forming Unit F]

An image forming unit F is a passive- or active-matrix color image forming unit configured to perform image display by controlling light-emission/no light-emission of first, second, and third light-emitting elements.

[Image Forming Unit G]

An image forming unit G is a field-sequential color image forming unit, including a light-pass control unit (light bulb) configured to control light-pass/no light-pass of light coming from light-emitting element units arranged in a 2D matrix. Image display is performed by time-sharing control executed over light-emission/no light-emission of first, second, and third light-emitting elements in the light-emitting element units, and by the light-pass control unit controlling light-pass/no light-pass of light coming from first, second, and third light-emitting elements.

Alternatively, when the display apparatus in the first or second embodiment of the present disclosure is of a binocular type, the light guide plate is provided to be closer as a whole to the center side of the viewer's face than the image forming units, a coupling member is further provided to couple the two image display devices, the coupling member is attached to the center portion of a frame on the side facing the viewer, the frame being positioned between the viewer's two eyes, and a projection image of the coupling member is in a projection image of the frame.

In such a configuration that the coupling member is attached to the center portion of the frame positioned between the viewer's two eyes, that is, if the image display devices are not directly attached to the frame, temple sections are extended outward when the viewer wears the frame on his head portion. Therefore, even if the frame is deformed, the frame deformation does not cause displacement (position change) of the image forming units or the light guide plate, and even if such displacement occurs, the displacement is negligible. Such a configuration thus prevents a change of convergence angle between right and left images without fail. Further, the configuration eliminates having to increase the rigidity of the front part of the frame so that the frame is not increased in weight, the design ability is not impaired, and the cost is not increased. Still further, with the image display devices not directly attached to the eyeglass-shaped frame, the frame may be in various designs and colors to meet the viewer's preferences, and the frame designing is less restricted and highly flexible. What is more, the coupling member is positioned between the viewer and the frame, and the projection image of the coupling member is in the projection image of the frame, i.e., when the head mounted display is viewed from the front of the viewer, the coupling member is hidden behind the frame. This offers the head mounted display with sophistication and refinement of design.

Herein, desirably, the coupling member is attached to the center portion of a front section on the side facing the viewer. The front section is positioned between the viewer's two eyes, and corresponds to a bridge section of ordinary glasses.

In the state that the coupling member couples together the two image display devices, specifically, the image forming units may be respectively attached to end portions of the coupling member to be adjustable. In this configuration, the image forming units are desirably positioned outside of the viewer's eyes. Such a configuration also desirably satisfies $0.01 \times L \leq \alpha \leq 0.30 \times L$, or $0.05 \times L \leq \alpha \leq 0.25 \times L$, $0.35 \times L \leq \beta \leq 0.65 \times L$, or $0.45 \times L \leq \beta \leq 0.55 \times L$, $0.70 \times L \leq \gamma \leq 0.99 \times L$, or $0.75 \times L \leq \gamma \leq 0.95 \times L$, where $\alpha$ denotes a distance from the attachment center for one of the image forming units to one end portion (one endpiece) of the frame, $\beta$ denotes a distance from the center of the coupling member to the one end portion (the one endpiece) of the frame, $\gamma$ denotes a distance from the attachment center for the remaining image forming unit to the one end portion (the one endpiece) of the frame, and L denotes a length of the frame. For respectively attaching the image forming units to the end portions of the coupling member, specifically, three through holes are formed to each of the end portions of the coupling member, and screw sections corresponding to these through holes are formed to each of the image forming units. Thereafter, screws are fastened into the screw sections formed to the image forming units through the through holes. Between each of the screws and each of the screw sections, a spring is inserted in advance. Therefore, by controlling the degree of screw fastening, the image forming units may be adjusted in state of attachment, i.e., adjusted in angle with respect to the coupling member.

Herein, the expression of "the attachment center for the image forming unit" denotes a point at which an overlapped portion between the projection image of the image forming unit and the projection image of the frame is divided equally into two along the axis of the frame. The projection images are those obtained by projecting the image forming unit and the frame onto a virtual plane when the image forming unit is attached to the coupling member. The expression of "the center of the coupling member" denotes, when the coupling member is attached to the frame, a point at which a portion where the coupling member is in contact with the frame is divided equally into two along the axis of the frame. The expression of "the length of the frame" means the length of the projection image of the frame when the frame is bent. Note that the projection direction is vertical to the viewer's face.

Alternatively, in the state that the coupling member couples together the two image display devices, specifically, the coupling member may couple together two light guide plates. Note here that the two light guide plates may be integrally manufactured. If this is the case, the coupling member is coupled to the integrally-manufactured light guide plate, and this configuration is also regarded as the coupling member coupling together two light guide plates. When a distance from the center of one of the image forming units to one end portion of the frame is $\alpha'$, and when a distance from the center of the remaining image forming unit to the end portion of the frame is $\gamma'$, the values of $\alpha'$ and $\gamma'$ are desirably similar to those of $\alpha$ and $\gamma$ described above. The expression of "the center of the image forming unit" denotes a point at which an overlapped portion between the projection image of the image forming unit and the projection image of the frame is divided equally into two along the axis of the frame. The projection images are those obtained by projecting the image forming unit and the frame onto a virtual plane when the image forming unit is attached to the light guide plate.

The shape of the coupling member is essentially arbitrary as long as the projection image thereof is in the projection image of the frame, e.g., like a rod or a slim plate. The material for the coupling member may be metal, alloy, plastic, or a combination thereof.

A light beam emitted from the center of the image forming unit and passed through a node in the optical system on the side of the image forming unit is referred to as "center light beam", and a part of the center light beam vertically entering the light guide unit is referred to as "at-center incident light beam". The point at which the at-center incident light beam enters the light guide unit is referred to as "light-guide-unit center point". The axis passing through the light-guide-unit center point and being parallel to the axis of the light guide unit is referred to as "X axis", and the axis passing through the light-guide-unit center point and coinciding with the normal to the light guide unit is referred to as "Z axis". In the display apparatus in the first or second embodiment of the present disclosure, the horizontal direction is parallel to the X axis, and hereinafter, may sometimes referred to as "X-axis direction". Herein, the optical system is disposed between the image forming unit and the light guide unit, and collimates light coming from the image forming unit. The resulting collimated luminous flux is directed into the light guide unit, is guided therein, and is emitted therefrom. The center point of the first deflection section is the "light-guide-unit center point".

The light guide plate includes two parallel planes (first and second planes) extending parallel to the axis of the light guide plate, i.e., longitudinal direction, horizontal direction, and corresponds to the X axis. The width direction of the light guide plate (height direction, vertical direction) corresponds to the Y axis.

When the plane of the light guide plate from which light comes is the light-guide-plate incident plane, and the plane of the light guide plate from which light exits is the light-guide-plate exit plane, the first plane may serve both as the light-guide-plate incident plane and the light-guide-plate exit plane, or the first plane may serve as the light-guide-plate incident plane, and the second plane may serve as the light-guide-plate exit plane. The interference pattern on the diffraction grating member is extended substantially parallel to the Y axis.

In the display apparatuses in the first or second embodiment of the present disclosure, the frame may be configured by a front section, and two temple sections. The front section is disposed to be in front of a viewer, and the temple sections are respectively attached to the ends of the front section via hinges to be able to rotate. The tip end portion of each of the temple sections is attached with a temple tip section. In the state that the image display device is attached to the frame, specifically, the image forming unit may be attached to the temple sections. The front section and the two temple sections may be integrally manufactured. That is, when the display apparatus in the first or second embodiment is viewed in its entirety, the frame looks substantially the same as that of ordinary glasses. The material for the frame may be same as that for the ordinary glasses, e.g., metal, alloy, plastic, or a combination thereof. The front section may be provided with a nose pad. That is, when the display apparatus in the first or second embodiment is viewed in its entirety, the structure of the frame with the nose pad looks substantially the same as that of the ordinary glasses except that there is no rim. The nose pad may also be in the well-known structure and configuration.

In the display apparatus in the first or second embodiment of the present disclosure, considering design and ease of attachment, desirably, a wiring line (signal line or power supply line) from one or two image forming units goes through the temple section and the temple tip section to be outside from the tip end portion of the temple tip sections, and then is connected to a control unit (control circuit or control section). The image forming unit may be provided with a headphone section, and if this is the configuration, a headphone-use wiring line from the image forming unit goes through the temple section and the temple tip section to reach the headphone section via the tip end portion of the temple tip section. The headphone section may be of an in-ear type or a canal type, for example. To be specific, desirably, the headphone-use wiring line goes around behind the pinna from the tip end portion of the temple tip section, and reaches the headphone section.

In the display apparatus in the first or second embodiment of the present disclosure, an imaging unit may be attached to the center or end portion of the front section, or to the temple sections, for example. A wiring line from the imaging unit may be connected to the image display device (or the image forming unit) via the front section, or may be merged with another wiring line extending from the image display device (or the image forming unit), for example.

When the display apparatus includes a dimmer unit, the dimmer unit includes first and second substrates, the first substrate opposing the light guide unit, the second substrate opposing the first substrate, first and second electrodes respectively provided to the first and second substrates, and a light-transmission control material layer sealed between the first and second substrates.

The first substrate may also be a component in the light guide unit. The display apparatus in such a configuration is referred to as "first display apparatus" for convenience. In the first display apparatus, with the first substrate in the dimmer unit being also a component in the light guide unit, the entire weight reduced so that this does not cause discomfort to a user of the display apparatus. The second substrate may be made thinner than the first substrate. The first substrate in the dimmer unit may serve also as a protection member (protection plate), for example.

In the dimmer unit, the light-transmission control material layer may be an optical shutter being a liquid crystal material layer, or may be an optical shutter being an inorganic EL material layer. However, this is not restrictive, and the optical shutter for use in the dimmer unit may also be configured by a large number of electrically-charged electrophoretic particles and a dispersion medium colored differently from the electrophoretic particles, by application of electrodeposition/dissociation that occurs in response to the reversible oxidation reduction of metal, e.g., silver particles, by utilizing color change of substance that occurs in response to the oxidation reduction of an electrochromic material, or by controlling the light transmittance by electrowetting. When the dimmer unit is an optical shutter in which the light-transmission control material layer is a liquid crystal material layer, the material for the light-transmission control material layer may be TN (Twisted Nematic) liquid crystal, or STN (Super Twisted Nematic) liquid crystal, for example, but this is not restrictive. When the dimmer unit is an optical shutter in which the light-transmission control material layer is an inorganic EL material layer, the material for the light-transmission control material layer may be tungsten oxide ($WO_3$), for example, but this is not restrictive. In the display apparatus in the first or second embodiment of the present disclosure, desirably, the light guide unit and the dimmer unit are disposed in this order from the viewer's side, but this order may be reversed.

The material of the first and second substrates is specifically exemplified by a transparent glass substrate including soda lime glass and super white glass, a plastic substrate, a plastic sheet, and a plastic film. Herein, the plastic material is exemplified by polyethylene terephthalate, polyethylene naphthalate, polycarbonate, cellulose ester such as acetylcellulose, fluorinated polymer such as copolymer of polyvinylidene difluoride or polytetrafluoroethylene and hexafluoropropene, polyether such as polyoxymethylene, polyacetal, polystyrene, polyethylene, polypropylene, polyolefin such as methylpentene polymer, polyimide including polyamideimide, or polyetherimide, polyamide, polyethersulfone, polyphenylene sulfide, polyvinylidene difluoride, tetraacetyl cellulose, bromphenoxy, polyarylate, polysulfone, or others. The plastic sheet and film may be rigid not to be easily bent, or may be flexible. When the first and second substrates are each configured by a transparent plastic substrate, the inner surface of the substrate may be formed with a barrier layer made of an inorganic or organic material.

The first and second substrates are respectively formed with first and second electrodes, e.g., so-called transparent electrodes. The first and second electrodes are each specifically made of indium tin oxide (ITO, including Sn-doped $In_2O_3$, crystalline ITO, and amorphous ITO), fluorine doped $SnO_2$ (FTO), IFO (F-doped $In_2O_3$), antimony doped $SnO_2$ (ATO), $SnO_2$, ZnO (including Al-doped ZnO, and B-doped ZnO), indium zinc oxide (IZO), spinel oxide, oxide with $YbFe_2O_4$ structure, or conductive polymers including polyaniline, polypyrrole, and polythiophene, for example, but these are not restrictive, or a combination of two or more of them is also possible. The first and second electrodes may be each formed by physical vapor deposition (PVD) such as vacuum deposition and sputtering, various types of chemical vapor deposition (CVD), or various types of coating, for example. Patterning of the electrodes may be arbitrarily performed by etching, lifting off, or using various types of masks. In some cases, the patterning of the electrodes is unnecessary.

The first and second substrates are attached together by being sealed at outer edge portions using a sealing agent. The sealing agent for use may be various types of resin including thermosetting resin, light curing resin, moisture curing resin, and anaerobic curing resin, e.g., epoxy resin, urethane resin, acrylic resin, vinyl acetate resin, enethiol resin, silicone resin, and modified polymer resin.

The display apparatus is further provided with an illumination sensor that measures the illumination in the environment where the display apparatus is disposed. Such an illumination sensor is sometimes referred to as "environmental illumination measurement sensor" for convenience. With the illumination sensor (environmental illumination measurement sensor), the measurement result thereof is used as a basis to control the light transmittance of the dimmer unit, or to control the luminance of images to be formed by the image forming unit.

The display apparatus is also further provided with a second illumination sensor that measures the illumination based on the light passed through the dimmer unit from the outside environment. Such a second illumination sensor is sometimes referred to as "transmitted-light illumination measurement sensor" for convenience. With the second illumination sensor (transmitted-light illumination measurement sensor), the measurement result thereof is used as a basis to control the light transmittance of the dimmer unit, or to control the luminance of images to be formed by the image forming unit.

As described above, with such control execution, i.e., control over the light transmittance of the dimmer unit based on the measurement result of the illumination sensor (environmental illumination measurement sensor), control over the luminance of images to be formed by the image forming unit based on the measurement result of the illumination sensor (environmental illumination measurement sensor), control over the light transmittance of the dimmer unit based on the measurement result of the second illumination sensor (transmitted-light illumination measurement sensor), and control over the luminance of images to be formed by the image forming unit based on the measurement result of the second illumination sensor (transmitted-light illumination measurement sensor), images for viewing by a viewer are prevented from being degraded due to light from outside, and high-contrast images are obtained for viewing by the viewer. Such control execution also optimizes the surrounding conditions for viewer's image viewing considering the illumination in the ambient environment where the display apparatus is disposed. The illumination sensors (environmental illumination measurement sensor and transmitted-light illumination measurement sensor) may be each a well-known illumination sensor, and may be each controlled by a well-known control circuit.

In the display apparatus including the second illumination sensor (transmitted-light illumination measurement sensor), desirably, the second illumination sensor (transmitted-light illumination measurement sensor) is provided closer to the viewer's side than to the light guide unit.

The dimmer unit may have the maximum light transmittance of 50%, and the minimum light transmittance of 30% or lower. The lowest possible light transmittance for the dimmer unit is 1%, for example.

When the illumination sensor (environmental illumination measurement sensor) shows the measurement result of a predetermined value (for convenience, sometimes referred to as "first illumination measurement value") or higher, the dimmer unit may be adjusted to have the light transmittance of a predetermined value (for convenience, sometimes referred to as "first light transmittance") or lower. When the illumination sensor (environmental illumination measurement sensor) shows the measurement result of a predetermined value (for convenience, sometimes referred to as "second illumination measurement value") or lower, the dimmer unit may be adjusted to have the light transmittance of a predetermined value (for convenience, sometimes referred to as "second light transmittance") or higher. Considering the illumination measured by the environmental illumination measurement sensor, when the transmitted-light illumination measurement sensor does not show the measurement result of a desired value, or when a delicate illumination adjustment is still expected, the dimmer unit may be adjusted in light transmittance at the same time with value monitoring of this second illumination sensor (transmitted-light illumination measurement sensor).

Herein, the first illumination measurement value is 10 lux, the first light transmittance takes any value in a range from 1% to 30%, the second illumination measurement value is 0.01 lux, and the second light transmittance takes any value in a range from 51% to 99%, for example. When the environmental illumination measurement sensor shows the measurement value of $1\times10^{-3}$ lux or smaller, the dimmer unit is desirably increased in light transmittance as prompt as possible by reducing the drive time thereof through control over the drive voltage thereof, for example.

In some cases, light passing through the dimmer unit may be colored thereby as desired. The color selected by the dimmer unit may be variable or fixed. In the former, the dimmer unit may be a laminate structure including a dimmer for red, a dimmer for green, and a dimmer for blue. In the latter, a color to be selected by the dimmer unit is not restrictive but may be brown, for example.

In the display apparatus in the first or second embodiment of the present disclosure, the dimmer unit may be smaller in size than the image display device, may be in the same size as the image display device, or may be larger in size than the image display device. In the projection image of the dimmer unit, the second deflection section may be positioned, or in the projection image of the second deflection section, the dimmer unit may be positioned.

In some cases, the dimmer unit may be provided to be detachable. In order to provide the dimmer unit to be detachable, the dimmer unit may be attached to the frame by using a screw made of transparent plastic, by forming a groove to the frame for engagement of the dimmer unit, or by providing a magnet to the frame. The frame may be also formed with a slide section to slide the dimmer unit thereinto. The dimmer unit may be provided with a connector for electrical connection to a control circuit via this connector and a wiring line. This control circuit is for controlling the light transmittance of the dimmer unit, and is provided in the control unit for controlling the image forming unit, for example. The dimmer unit may be bent.

The display apparatus in the first or second embodiment of the present disclosure may further include a microphone, and control the operation of the dimmer unit by an audio input using the microphone. To be specific, the dimmer unit may be controlled to operate/not to operate (turned ON/OFF) in response to a command issued by a viewer's voice. Alternatively, the display apparatus may further include an infrared light incident/exit unit to control the operation of the dimmer unit. To be specific, the infrared light incident/exit unit detects the viewer's blinking to control the dimmer unit to operate/not to operate.

In the display apparatus in the first or second embodiment of the present disclosure, a light shielding member may be provided to an area of the light guide unit where light comes from the image forming unit. This light shielding member is for shielding the light guide unit from the outside light, and such a display apparatus is referred to as "second display apparatus" for convenience. In the second display apparatus, with the light shielding member provided to an outside-light-entering area of the light guide unit for shielding the light guide unit from the outside light, even if the operation of the dimmer unit changes the amount of incoming outside light, this does not cause image degradation on the display apparatus with no undesired stray light because no outside light enters the outside-light-entering area of the light guide unit in the first place. Herein, the outside-light-entering area of the light guide unit is desirably included in the projection image of the light-shielding member toward the light guide unit.

The light shielding member may be provided to the light guide unit on the side not provided with the image forming unit, and is provided with a distance from the light guide unit. In the display apparatus in such a configuration, the light shielding member may be made of a non-transparent plastic material. This light shielding member may be integrally extended from the chassis of the image display device, may be attached to the chassis of the image display device, may be integrally extended from the frame, or may be attached to the frame. The light shielding member may be provided to an area of the light guide unit on the side not provided with the image forming unit, or may be provided to the dimmer unit. Herein, the light shielding member made of a non-transparent material may be formed on the surface of the light guide unit (e.g., specifically on the outer or inner surface of the protection member) by physical vapor deposition (PVD) or chemical vapor deposition (CVD), by printing, or by attaching thereto a film, a sheet, or a foil made of a non-transparent material, e.g., plastic material, metal material, or alloy material. The projection image of the end portion of the dimmer unit toward the light guide unit is desirably included in the projection image of the light-shielding member toward the light guide unit.

The display apparatus in the first or second embodiment of the present disclosure may configure a head mounted display (HMD), for example. This accordingly reduces the weight and size of the display apparatus, and the user's discomfort is significantly reduced when he wears the display apparatus. Moreover, the manufacturing cost is also reduced.

The display apparatus in the first or second embodiment of the present disclosure may receive information and data from outside for image display in the image display device. With the display apparatus in such a configuration, the information and data relevant to images to be displayed on the image display device may be recorded, retained, and stored in a so-called cloud computer and a server. When the display apparatus is provided with a communication unit, e.g., a mobile phone or a smartphone, or when the display apparatus is used with a communication unit, this allows transmission/reception, and exchange of various types of information and data between the display apparatus and the cloud computer or the server. This also allows reception of various types of information and data for image display in the image display device. Alternatively, the various types of information and data for image display on the image display device may be recorded in the image display device.

The display apparatuses in the first and second embodiments of the present disclosure including the above-mentioned various modification examples may be available for displaying received electronic mails; for displaying various types of information in various sites on the Internet; for displaying various types of instructions about how to drive, operate, maintain, or disassemble a variety of devices, and symbols, codes, marks, emblems, patterns, and others therewith; for displaying various types of descriptions about people, products, and others, and symbols, codes, marks, emblems, patterns, and others therewith; for displaying moving and still images; for displaying subtitles in movies; for displaying descriptions about video or closed captions in synchronization with video display; for displaying explanations about acting performances, Kabuki, Noh, Kyogen, Operas, music recitals, ballet, theater plays, and others, and the details of story, the progress of story, and the background of story, and others therewith; for displaying explanations about amusement parks, art museums, tourist attractions, tourist spots, sightseeing signs, and others; and for displaying closed captions. For acting performances, Kabuki, Noh, Kyogen, Operas, music recitals, ballet, theater plays, amusement parks, art museums, tourist attractions, tourist spots, and sightseeing signs, the display apparatus may display relevant text as images whenever appropriate. To be specific, the display apparatus displays images based on the progress of story in movies or in acting performances, based on a predetermined schedule and time allocation, in response to an operator's operation, or in response to an incoming image control signal under the control of a computer or others, for example. For displaying various types of descriptions about devices, people, products, and others, viewing objects including people and products may be imaged using an imaging unit, and the imaging details may be analyzed in the display apparatus. In this manner, the display apparatus may be able to display various types of explanations created in advance about the viewing objects including devices, people, and objects. The image display apparatuses in the first and second embodiments of the present disclosure may be each used as a stereoscopic display apparatus. In this case, the light guide unit may be detachably provided with a polarizer plate or film as appropriate, or the polarizer plate or film may be affixed to the light guide unit.

An image signal to the image forming unit includes not only text data but also luminance data about images to be displayed (luminance information), chromaticity data (chromaticity information), or both the luminance data and the chromaticity data, for example. The luminance data may correspond to the luminance at a predetermined area including an object viewed through the light guide unit, and the chromaticity data may correspond to the chromaticity at a predetermined area including an object viewed through the light guide unit. With an image signal including such luminance data about images, the images to be displayed become controllable in terms of luminance (brightness), and with an image signal including such chromaticity data about images, the images to be displayed become controllable in terms of chromaticity (color). Moreover, with an image signal including such luminance and chromaticity data about images, the images to be displayed become controllable in terms of both luminance (brightness) and chromaticity (color). When the luminance data in use corresponds to the luminance at a predetermined area including an object viewed through the image display device, the luminance data may be adjusted in value to increase the luminance of an image to be displayed, i.e., to make the image brighter when it is displayed, if the luminance at the predetermined area is increased. When the chromaticity data in use corresponds to the chromaticity at a predetermined area including an object viewed through the image display device, the chromaticity data may be adjusted in value to obtain, roughly, a complementary color relationship between the chromaticity at the predetermined area and the chromaticity of an image to be displayed. The complementary colors mean a pair of colors that are opposite each other on the color circle, e.g., red and green, yellow and purple, and blue and orange. The complementary colors also mean a pair of colors that produce a color with reduced chroma when mixed in appropriate proportions, e.g., white for light, and black for objects. However, the complementary characteristics are not the same in terms of visual effects when the colors are placed next to each other, and when the colors are mixed together. The complementary colors are also referred to as antagonistic colors, contrast colors, or opposing colors. Herein, the expression of "opposing colors" directly identifies which colors are opposite each other, whereas the expression of "complementary colors" identifying which colors is in a rather wider scope. The pair of complementary colors produces synergistic effects of enhancing their respective colors, and this is called complementary color harmony.

Example 1

Figure 6:
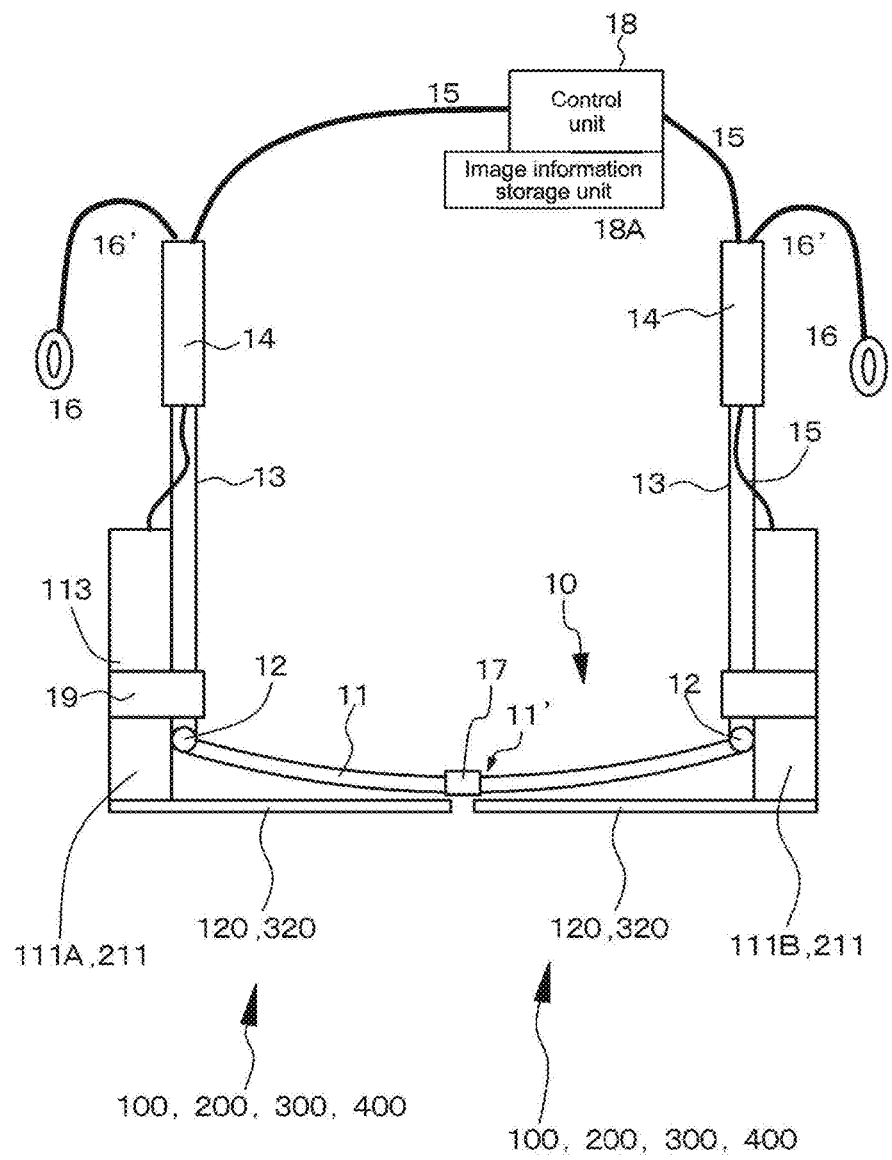
FIG. 6 is a schematic top view of the display apparatus in Example 1.
Figure 7A:
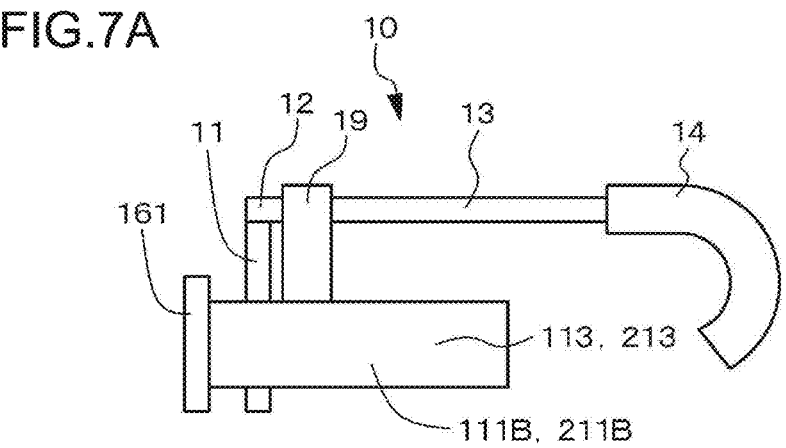
FIG. 7A is a schematic side view of the display apparatus in Example 1.
Figure 7B:
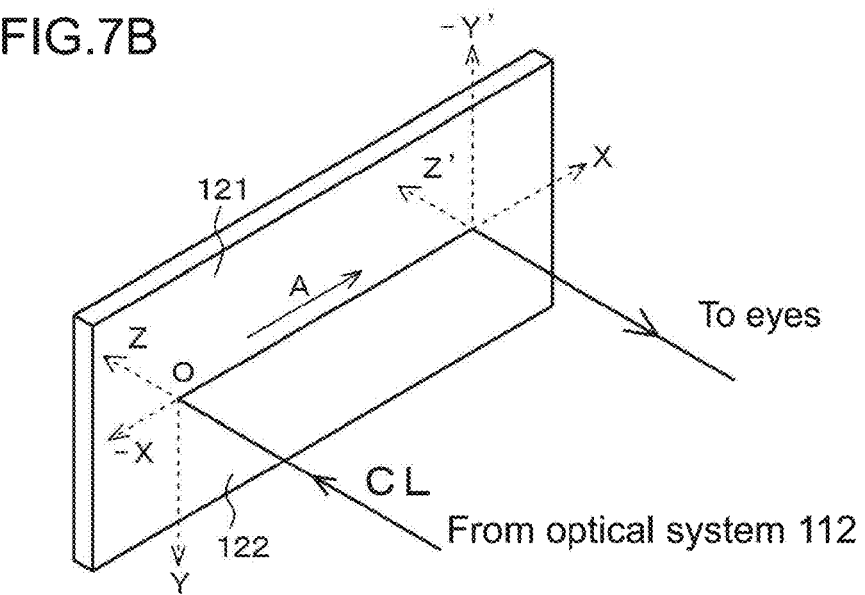
FIG. 7B is a diagram schematically showing propagation of light in a light guide plate in the image display device.

Example 1 is about a display apparatus according to the first embodiment of the present disclosure, an image display device according to the first embodiment of the present disclosure, and a light guide unit according to the first embodiment of the present disclosure. FIGS. 1, 2, 3, and 4 are each a conceptual view of the image display device in Example 1, and FIGS. 5A, 5B, 5C, and 5D are each a schematic plan view of a light guide plate, a support member, and a buffer member, showing the layout thereof in a display apparatus, an image display device, and a light guide unit each being a modification example of those in Example 1. FIG. 6 is a schematic top view of the display apparatus in Example 1, specifically a head mounted display (HMD), and FIG. 7A is a schematic side view thereof. FIG. 7B is a diagram schematically showing propagation of light in the light guide plate in the image display device. In FIGS. 6, 17A, 18A, 20, 26, 27, 28, 29, 30, 31, and 32, a support member or others are not shown.

The display apparatus in Example 1 or in Examples 2 to 15 that will be described later is more specifically a head mounted display (HMD). Hereinafter, Examples 1 to 15 are collectively referred to as "Example 1 and others". The display apparatus includes 1. a frame mounted on the head portion of the viewer 20, e.g., eyeglass-shaped frame 10, and 2. an image display device 100, 200, 300, or 400 attached to the frame 10. In this example, the display apparatus in Example 1 and others is specifically of a binocular type including two image display devices, but may be a monocular type including one image display device. An image forming unit 111 or 211 offers image display in a color, e.g., green. The image display device 100, 200, 300, or 400 in Example 1 and others includes A. the image forming unit 111 or 211, and B. a light guide unit 120 or 320, and C. an optical system (collimator light emitting optical system) 112 or 254 configured to collimate light coming from the image forming unit 111 or 211. The luminous flux as a result of collimation by the optical system 112 or 254 is directed into the light guide unit 120 or 320, is guided therein, and is emitted therefrom. In the light guide unit (light guide section) 120 or 320, specifically, the light coming from the image forming unit 111 or 211 is directed thereinto, guided therein, and emitted therefrom.

The light guide unit 120 or 320 in Example 1 and others includes a. a light guide plate 121 or 321 configured to emit the light provided by the image forming unit after the light is propagated therein by total reflection (light guide plate guiding the light of an image formed by the image forming unit), b. a first deflection section 130 or 330 configured to deflect at least a part of the light directed into the light guide plate 121 or 321 to achieve total reflection of the light in the light guide plate 121 or 321, and c. a second deflection section 140 or 340 configured to deflect the light propagated by total reflection in the light guide plate 121 or 321 to emit the light from the light guide plate 121 or 321.

The light guide unit 120 or 320 in Example 1 and others includes the light guide plate 121 of 321, and a support member 161, 171, or 177. In Examples 1 to 4, using a buffer member 162, the light guide plate 121 or 321 is supported at a plurality of portions of the support member 161. To be specific, using the buffer member 162, the light guide plate 121 or 321 is supported at a plurality of portions of the support member 161 opposed to each other with the light guide plate 121 or 321 being sandwiched therebetween. On the other hand, in Example 5 that will be described later, the light guide plate 121 or 321 and a support member 171 or 177 include therebetween a fixing member 172, 173, 175, or 179, which fixes the light guide plate 121 or 321 to the support member 171 or 177 by being around the light guide plate 121 or 321. In Example 1 and others, the support member 161, 171, or 177 is specifically shaped like a picture frame.

Figure 2:
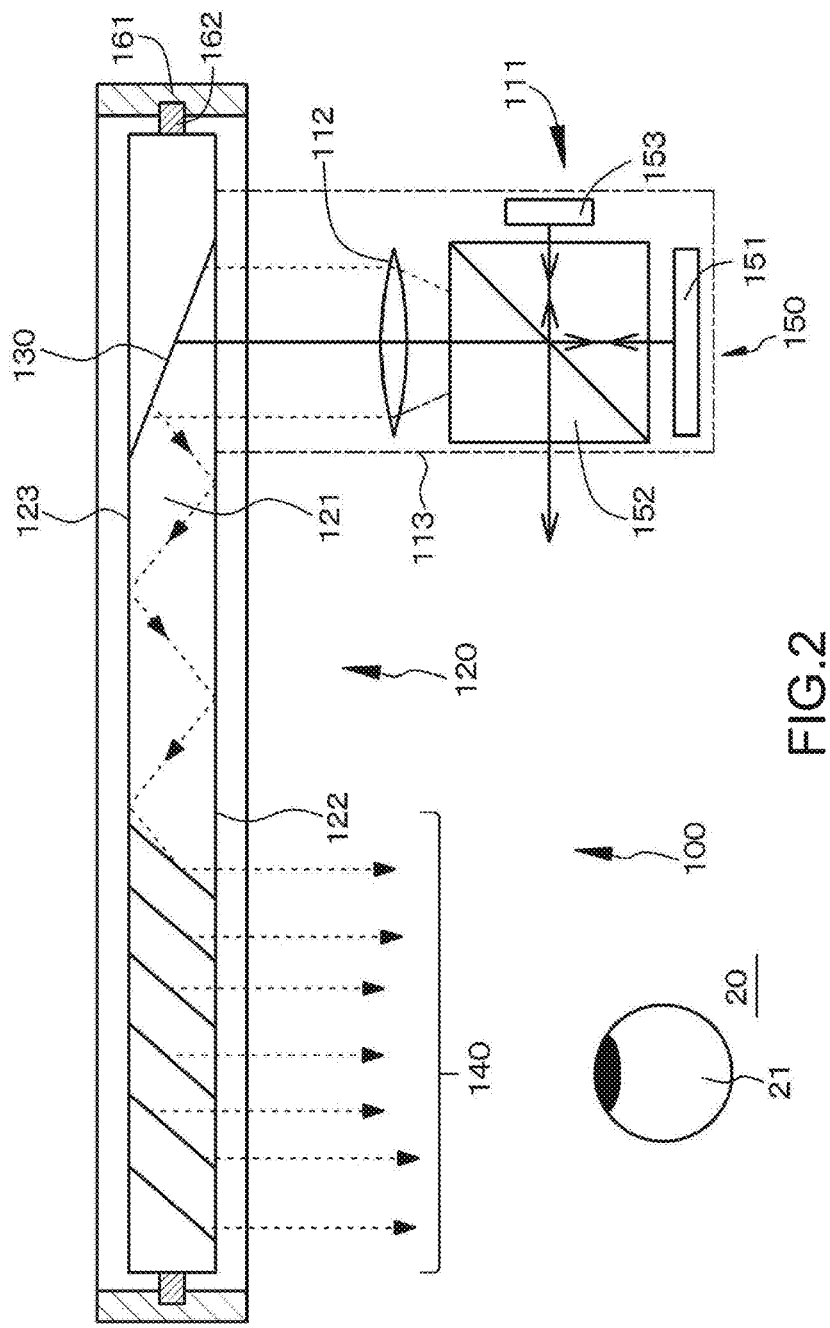
FIG. 2 is a conceptual view of a modification of the image display device in the display apparatus in Example 1.
Figure 3:
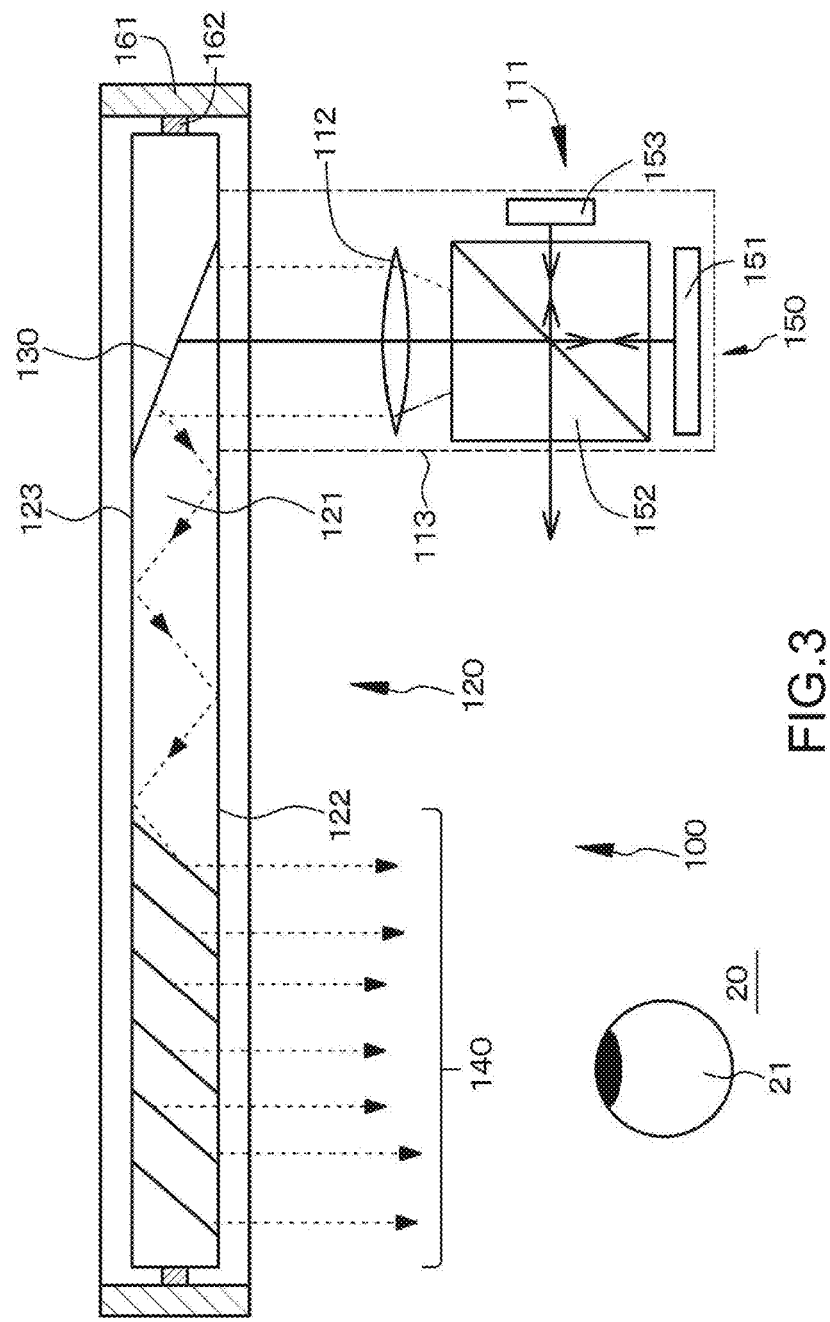
FIG. 3 is a conceptual view of another modification of the image display device in the display apparatus in Example 1.
Figure 4:
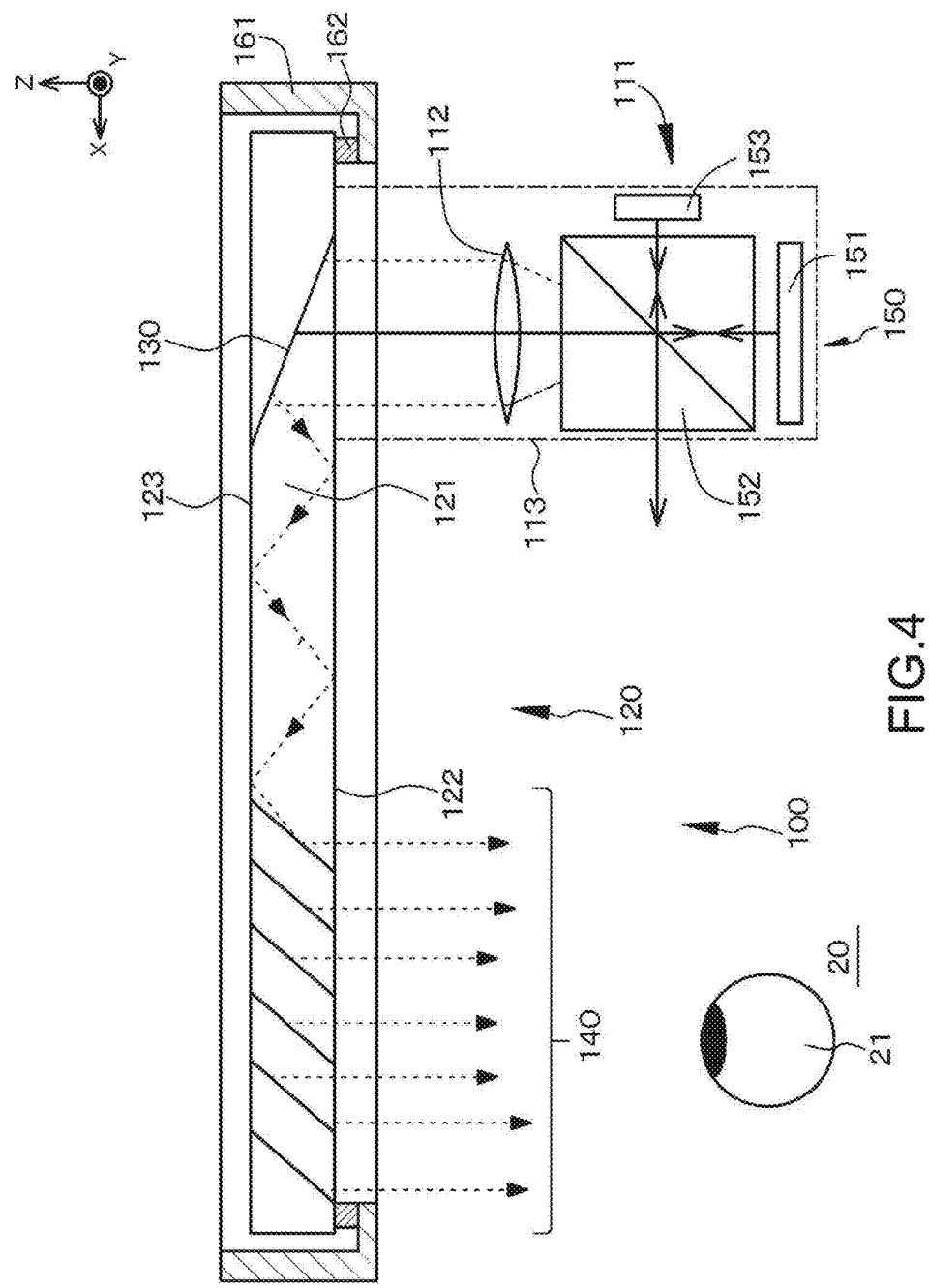
FIG. 4 is a conceptual view of still another modification of image display device in the display apparatus in Example 1.
Figure 5A:
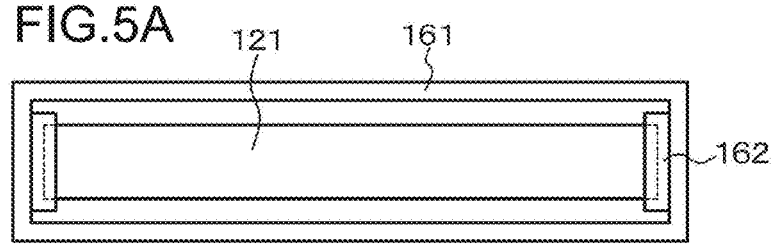
FIGS. 5A, 5B, 5C, and 5D are each a schematic plan view of a light guide plate, a support member, and a buffer member, showing the layout thereof in still another modification of the image display device in the display apparatus in Example 1.

In Example 1, as shown in FIGS. 1 and 5A, using the buffer member 162, the light guide plate 121 is supported by the two opposing inner side surfaces of the picture-frame-like support member 161. The buffer member 162 supports the light guide plate 121 at two portions, i.e., two of the buffer members 162 respectively cover the longitudinal end portions of the light guide plate 121 (two of the buffer members 162 sandwich therebetween the light guide plate 121). Alternatively, as shown in FIGS. 2, 3, and 5A, two of the buffer members 162 support the light guide plate 121 by respectively being in contact with the longitudinal end surface portions of the light guide plate 121. Still alternatively, as shown in FIG. 4, the support member 161 is shaped as a whole like a picture frame, and the cross-sectional shape thereof is substantially like a letter of "L". At the portion equivalent to the lateral portion at the bottom in the letter of "L", two of the buffer members 162 support the light guide plate 121 by respectively being in contact with the longitudinal lower end surface portions of the light guide plate 121.

Figure 5B:
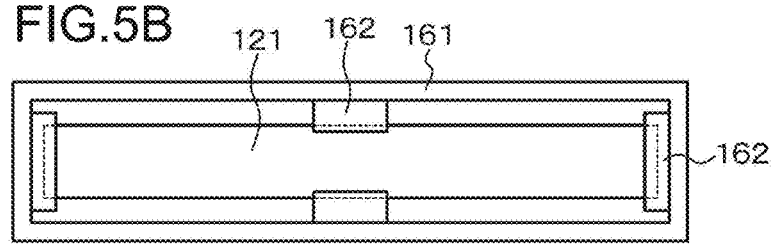
Figure 5C:
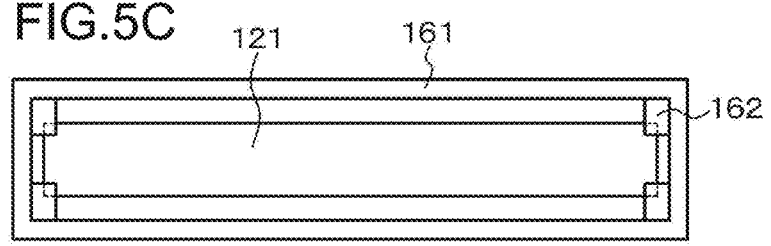
Figure 5D:
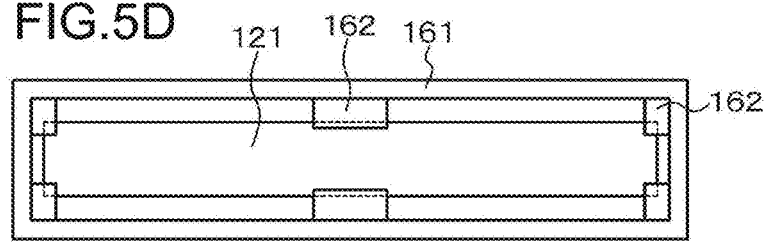

As shown in FIG. 5B, four of the buffer members 162 support the light guide plate 121, i.e., two of the buffer members 162 respectively cover (pinch) the longitudinal end portions of the light guide plate 121, and the remaining two buffer members 162 respectively cover (pinch) the transverse center portions of the light guide plate 121. Alternatively, as shown in FIG. 5C, four of the buffer members 162 support the light guide plate 121 by respectively covering (pinching) four corners of the light guide plate 121. Still alternatively, as shown in FIG. 5D, six of the buffer members 162 support the light guide plate 121, i.e., four of the buffer members 162 respectively cover (pinch) the four corners of the light guide plate 121, and the remaining two buffer members 162 respectively cover (pinch) the transverse center portions of the light guide plate 121. Herein, the buffer members of FIGS. 5B, 5C, and 5D are each a modification example of the buffer member of FIG. 1, but may each be a modification example of the buffer members of FIGS. 2, 3, and 4. Alternatively, the buffer members of FIGS. 1, 2, 3, 4, 5A, 5B, 5C, and 5D may be combined for use as appropriate.

In Example 1, the buffer member 162 may have an elastic modulus lower than that of the light guide plate 121 or 321. Assuming that the light guide plate 121 or 321 has the elastic modulus of 1, the buffer member 162 has the elastic modulus of $5 \times 10^{-5}$, for example. The buffer member 162 is made of resin, and is specifically made of epoxy resin, modified silicone resin, epoxy-modified silicone resin, urethane resin, or others with the thickness of 0.01 mm to 20 mm inclusive (e.g., specifically 5 mm) in the example of FIG. 1. The light guide plate 121 or 321 is made of a transparent glass substrate including soda lime glass and super white glass, an optical glass including quartz glass and BK7, a plastic substrate, a plastic sheet, and a plastic film with the thickness of 0.01 mm to 3 mm inclusive (e.g., specifically 2 mm).

In Example 1 and others, the support member 161, 171, or 177 may be affixed, on its top surface opposite to a viewer, with a protection member (protection plate) for protecting the light guide plate 121 or 321.

In Example 1 and others, the image display device 100, 200, 300, or 400 may be attached to the frame fixedly or detachably. The optical system 112 or 254 is disposed between the image forming unit 111 or 211 and the light guide unit 120 or 320. In such a configuration, the luminous flux as a result of collimation by the optical system 112 or 254 is directed into the light guide unit 120 or 320, is guided therein, and is emitted therefrom. The light guide unit 120 or 320 is semi-transmissive (see-through type). To be specific, at least a part of the light guide unit facing the eyes of the viewer 20 (more specifically the light guide plate 121 or 321, and the second deflection section 140 or 340 that will be described later) may be semi-transmissive (see-through), and through such a part of the light guide unit, the viewer may see the outside view.

In Example 1 and others, in a light beam emitted from the center of the image forming unit 111 or 211 and passed through a node in the optical system 112 or 254 on the side of the image forming unit (center light beam CL), a part of the center light beam vertically enters the light guide unit 120 or 320 (at-center incident light beam). The point at which the at-center incident light beam enters the light guide unit 120 or 320 is referred to as "light-guide-unit center point O". The axis passing through the light-guide-unit center point O, and being parallel to the axis of the light guide unit 120 or 320 is referred to as "X axis", and the axis passing through the light-guide-unit center point O, and coinciding with the normal to the light guide unit 120 or 320 is referred to as "Z axis". The center point of the first deflection section 130 or 330 that will be described next is the light-guide-unit center point O. That is, as shown in FIG. 7B, in the image display device 100, 200, 300, or 400, the center light beam CL emitted from the center of the image forming unit 111 or 211 and passed through a node in the optical system 112 or 254 on the side of the image forming unit bumps on the light guide plate 121 or 321 in the vertical direction. In other words, the center light beam CL enters the light guide plate 121 or 321 at an angle of 0 degrees. In this case, the center of an image to be displayed coincides with the normal to the first plane 122 or 322 of the light guide plate 121 or 321.

In Example 1 or Example 2 that will be described later, the first and second deflection sections 130 and 140 are both disposed in the light guide plate 121. The first deflection section 130 reflects light directed into the light guide plate 121, and the second deflection section 140 passes therethrough and reflects the light for a plurality of times after the light is propagated by total reflection in the light guide plate 121. That is, the first deflection section 130 serves as a reflection mirror, and the second deflection section 140 serves as a semi-transmissive mirror. More specifically, the first deflection section 130 provided in the light guide plate 121 is made of aluminum (Al), and is configured by a light reflection film (a kind of mirror) that reflects the light directed into the light guide plate 121. On the other hand, the second deflection section 140 also provided in the light guide plate 121 is configured by a multi-layer film structure of a plurality of dielectric layers. The dielectric multi-layer film includes a layer of $TiO_2$ (titanium dioxide) being a high dielectric material, and a layer of $SiO_2$ (silicon dioxide) being a low dielectric material. The multi-layer film structure of a plurality of dielectric layers is described in Japanese Unexamined Patent Application Publication No. 2005-521099. A dielectric six-layer film is exemplarily shown, but this is not restrictive. In the structure, a dielectric layer and another dielectric layer include therebetween a very thin layer made of the same material as the light guide plate 121. In the first deflection section 130, the collimated light directed into the light guide plate 121 is reflected (or diffracted) in order to achieve total reflection of the light in the light guide plate 121. On the other hand, in the second deflection section 140, the collimated light is reflected (or diffracted) for a plurality of times after the light is propagated by total reflection in the light guide plate 121, and remains collimated when it is emitted from the light guide plate 121 toward the eyes 21 of the viewer 20.

In order to provide the first deflection section 130 in the light guide plate 121, the light guide plate 121 is partially cut out to obtain a sloped surface, i.e., cut-out portion 124, and the resulting sloped surface is provided thereon with a light reflection film, i.e., first deflection section 130, by vapor deposition. The cut-out portion 124 is then attached to the first deflection section 130. Moreover, for use as the second deflection section 140, formed is a multi-layer film structure of a plurality of layers made of the same material as the light guide unit 121, e.g., glass, and a plurality of dielectric layers (e.g., formed by vapor deposition). The light guide plate 121 is then partially cut out to obtain a sloped surface, i.e., cut-out portion 125, and the resulting sloped surface is provided thereon with the multi-layer structure. The resulting structure is then put in shape by abrasion, for example. This obtains the light guide unit 120 including the light guide plate 121 formed therein with the first and second deflection sections 130 and 140.

In Example 1 and others, the light guide plate 121 or 321 includes two parallel planes (the first plane 122 or 322, and the second plane 123 or 323) extending parallel to the direction of light propagation (X axis) by total reflection in the light guide plate 121 or 321. The first plane 122 or 322 and the second plane 123 or 323 are opposed to each other. Collimated light enters the first plane 122 or 322 being the light incident plane, and then exits from the second plane 123 or 323 being the light exit plane after the light is propagated by total reflection in the light guide plate. However, this is not restrictive, and the second plane 123 or 323 may serve as the light incident plane, and the first plane 122 or 322 may serve as the light exit plane.

In Example 1 or Example 3 that will be described later, the image forming unit 111 is the first image forming unit, and includes a plurality of pixels arranged in a 2D matrix. To be specific, the image forming unit 111 includes a reflective spatial light modulator 150, and a light source 153 configured by a light-emitting diode that emits white light. The image forming unit 111 is housed as a whole in a chassis 113 (indicated by alternate long and short dashed lines in FIG. 1). The chassis 113 is formed with an aperture (not shown), and through this aperture, light is emitted from the optical system 112, i.e., collimator light emitting optical system or collimator optical system. The light guide plate 121 is attached to the chassis 113. The reflective spatial light modulator 150 is configured by a liquid crystal display (LCD) 151 configured by LCOS as a light bulb, and a polarized beam splitter 152. With the polarized beam splitter 152, light coming from the light source 153 is partially reflected and then is directed to the liquid crystal display 151, and the light reflected by the liquid crystal display 151 is partially passed therethrough and is directed to the optical system 112. The liquid crystal display 151 includes a plurality of, e.g., 640×480 pieces of, pixels (liquid crystal cells) arranged in a 2D matrix. The polarized beam splitter 152 is in the well-known structure and configuration. The not-polarized light coming from the light source 153 bumps on the polarized beam splitter 152. The polarized beam splitter 152 passes therethrough any P-polarized components, and emits the components to the outside of the system. On the other hand, the polarized beam splitter 152 reflects any S-polarized components. The S-polarized components are then directed into the liquid crystal display 151, are reflected therein, and are emitted therefrom. In the light emitted from the liquid crystal display 151, light beams emitted from "white" pixels contain a high proportion of P-polarized components, and light beams emitted from "black" pixels contain a high proportion of S-polarized components. Therefore, in the light emitted from the liquid crystal display 151 and bumped on the polarized beam splitter 152, the P-polarized components pass through the polarized beam splitter 152, and are then guided to the optical system 112. On the other hand, the S-polarized components are reflected by the polarized beam splitter 152, and are then put back to the light source 153. The optical system 112 is a convex lens, for example, and at the focal length in the optical system 112, the image forming unit 111 (more specifically, the image display device 151) is disposed for generating collimated light.

In Example 1 and others, the frame 10 is configured by a front section 11, two temple sections 13, and two temple tip sections 14. The front section 11 is disposed to be in front of the viewer 20, and the two temple sections 13 are respectively attached to the ends of the front section 11 via hinges 12 to be able to rotate. The temple tip sections 14 are also referred to as tip cells or ear pads, and are respectively attached to tip end portions of the temple sections 13. The frame 10 is attached also with a nose pad (not shown in FIG. 6). That is, the structure including the frame 10 and the nose pad looks substantially the same as that of ordinary glasses. What is more, the temple sections 13 are each attached with the chassis 113 to be detachable by a retention member 19. The frame 10 is made of metal or plastic. Alternatively, the temple sections 13 may be each attached with the chassis 113 not to be detachable by the retention member 19. For a user owning and wearing glasses, in his glasses, temple sections of the frame may be each attached with the chassis 113 to be detachable by the retention member 19. The chassis 113 may be attached inside or outside of each of the temple sections 13.

A wiring line (signal line or power supply line) 15 from one image forming unit 111A goes through the temple section 13 and the temple tip section 14 to be outside from the tip end portion of the temple tip section 14, and then is connected to a control unit (control circuit or control section) 18. The image forming unit 111A and another image forming unit 111B are each provided with a headphone section 16, and a headphone-use wiring line 16' from each of the image forming units 111A and 111B goes through the temple section 13 and the temple tip section 14 to reach the headphone section 16 via the tip end portion of the temple tip section 14. To be more specific, the headphone-use wiring line 16' goes around behind the pinna from the tip end portion of the temple tip section 14, and reaches the headphone section 16. Such a configuration simplifies the display apparatus without giving a viewer an impression that the headphone sections 16 and the headphone-use wiring lines 16' do not look tidy.

As described above, the wiring line (signal line or power supply line) 15 is connected to the control unit (control circuit) 18. The control unit 18 is provided with an image information storage unit 18A, for example. The control unit 18 performs processing for image display. The control unit 18 and the image information storage unit 18A may be each configured by a well-known circuit.

At a center portion 11' of the front section 11, an imaging unit 17 may be attached using any appropriate attachment member (not shown). The imaging unit 17 is one configured by a solid-state imaging element being a CCD (Charge-Coupled Device) or a CMOS (Complementary Metal Oxide Semiconductor) sensor, and a lens (these are not shown). Signals from the imaging unit 17 are sent to the image forming unit 111A via a wiring line (not shown) extending from the imaging unit 17, for example.

As an example, the control unit (control circuit, control section) 18 provided in the display apparatus is incorporated with a communication unit (receiver), or the display apparatus includes a communication section (receiver) such as mobile phone or smartphone. In the display apparatus, information and data relevant to images to be displayed on the image display device may be recorded, retained, and stored in a so-called cloud computer and a server. This allows transmission/reception, and exchange of various types of information and data between the display apparatus and the cloud computer or the server. This also allows reception of signals based on various types of information and data, i.e., signals for image display on the image display device, and allows the receiver to receive the signals. When the display apparatus receives the signals for image display on the image display device 100, 200, 300, or 400, e.g., electronic mails and various types of information in a variety of sites on the Internet, the image display device 100, 200, 300, or 400 accordingly displays such electronic mails and various types of information. At this time, as will be described later, a dimmer unit 700 may be changed in light transmittance under the control of the control unit 18. Alternatively, the signals for image display on the image display device 100, 200, 300, or 400 may be stored in the image display device, e.g., specifically in the image information storage unit 18A in the control unit 18.

In the light guide unit, the image display device, and the display apparatus in Example 1 described above, the light guide plate is supported by the support member using the buffer member at a plurality of portions. Such a configuration prevents, without fail, the degradation problems of display images that are caused by the expanded/contracted light guide plate resulted from an environmental temperature change or a difference of thermal expansion coefficients between the members in the light guide unit. Also in such a configuration, the light guide plate may be retained with sufficient stability.

Example 2

Figure 8:
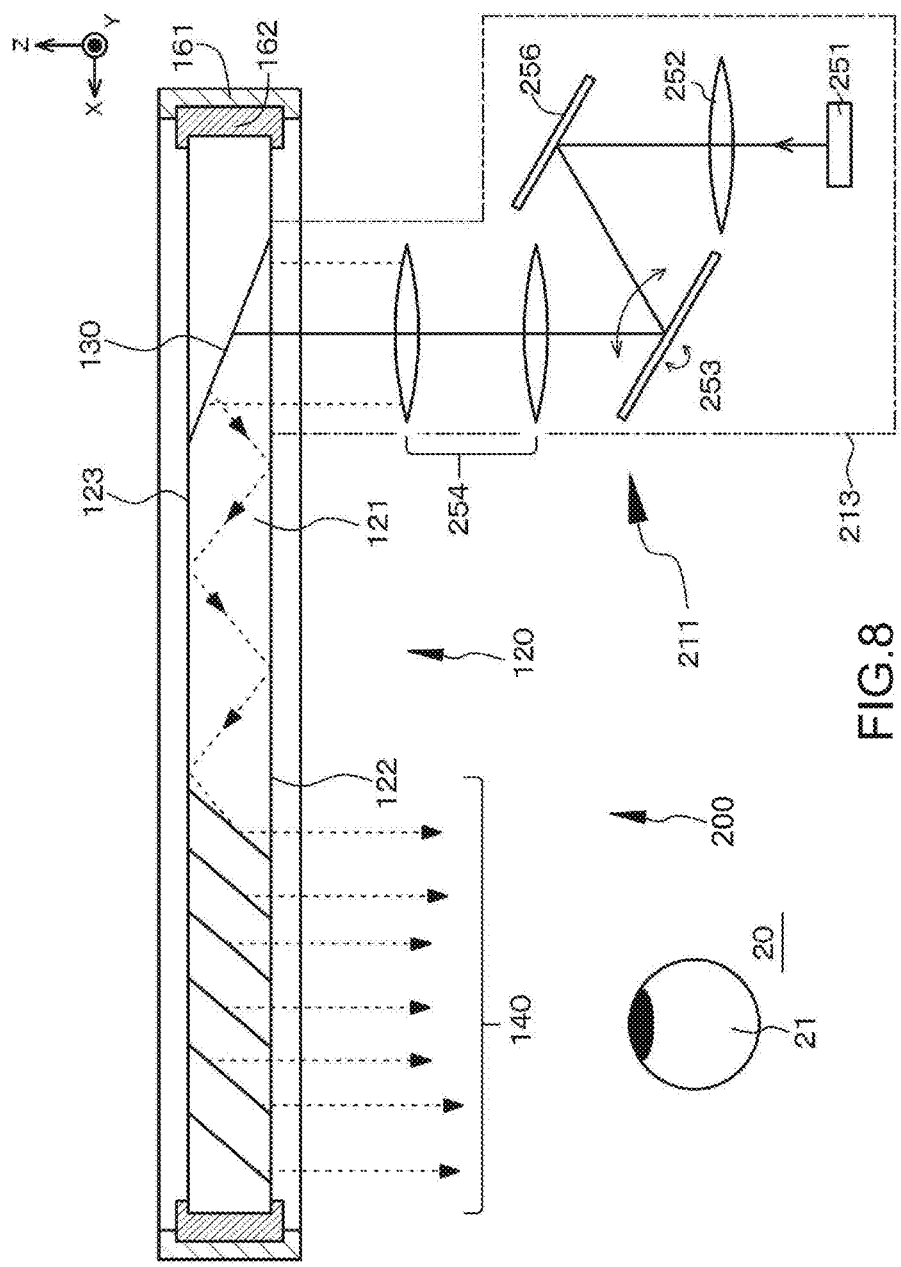
FIG. 8 is a conceptual view of an image display device in a display apparatus in Example 2.

Example 2 is a modification of Example 1. As shown in FIG. 8, i.e., the conceptual view of the image display device 200 in a display apparatus (head mounted display) in Example 2, in Example 2, an image forming unit 211 is the second image forming unit. That is, the image forming unit 211 includes a light source 251, and a scanning section 253 that scans collimated light coming from the light source 251. To be more specific, the image forming unit 211 includes A. the light source 251, B. a collimator optical system 252 configured to collimate light coming from the light source 251, C. the scanning section 253 configured to scan collimated light coming from the collimator optical system 252, and D. a relay optical system 254 configured to relay and emit the collimated light after the light is scanned by the scanning section 253. Herein, the image forming unit 211 is housed as a whole in a chassis 213 (indicated by alternate long and short dashed lines in FIG. 8). The chassis 213 is formed with an aperture (not shown), and through this aperture, light is emitted from the relay optical system 254. The chassis 213 is detachably attached to the temple section 13 by the retention section 19. The light guide plate 121 is attached to the chassis 213.

The light source 251 is a light-emitting element that emits white light. Light from the light source 251 enters the collimator optical system 252 having the positive optical power as a whole, and is collimated and emitted. This collimated light is then reflected by a total-reflection mirror 256, and then is horizontally and vertically scanned by the scanning section 253. This scanning section 253 is configured by a MEMS in which a micro mirror is rotatable in the 2D direction so that the collimated light is scanned two-dimensionally. A kind of 2D image is then formed, and virtual images are generated (e.g., the number of the pixels is the same as those in Example 1). Light from these virtual pixels passes through the relay optical system (collimator light emitting optical system) 254 configured by a well-known relay optical system, and luminous flux being the collimated light enters the light guide unit 120.

The light guide unit 120 that receives, guides, and emits the luminous flux being the collimated light obtained in the relay optical system 254 is in the same structure and configuration as the light guide unit described in Example 1, and thus is not described in detail again. Moreover, as described above, the display apparatus in Example 2 is substantially in the same structure and configuration as the display apparatus in Example 1 except for the image forming unit 211, and thus is not described in detail again.

Example 3

Figure 9:
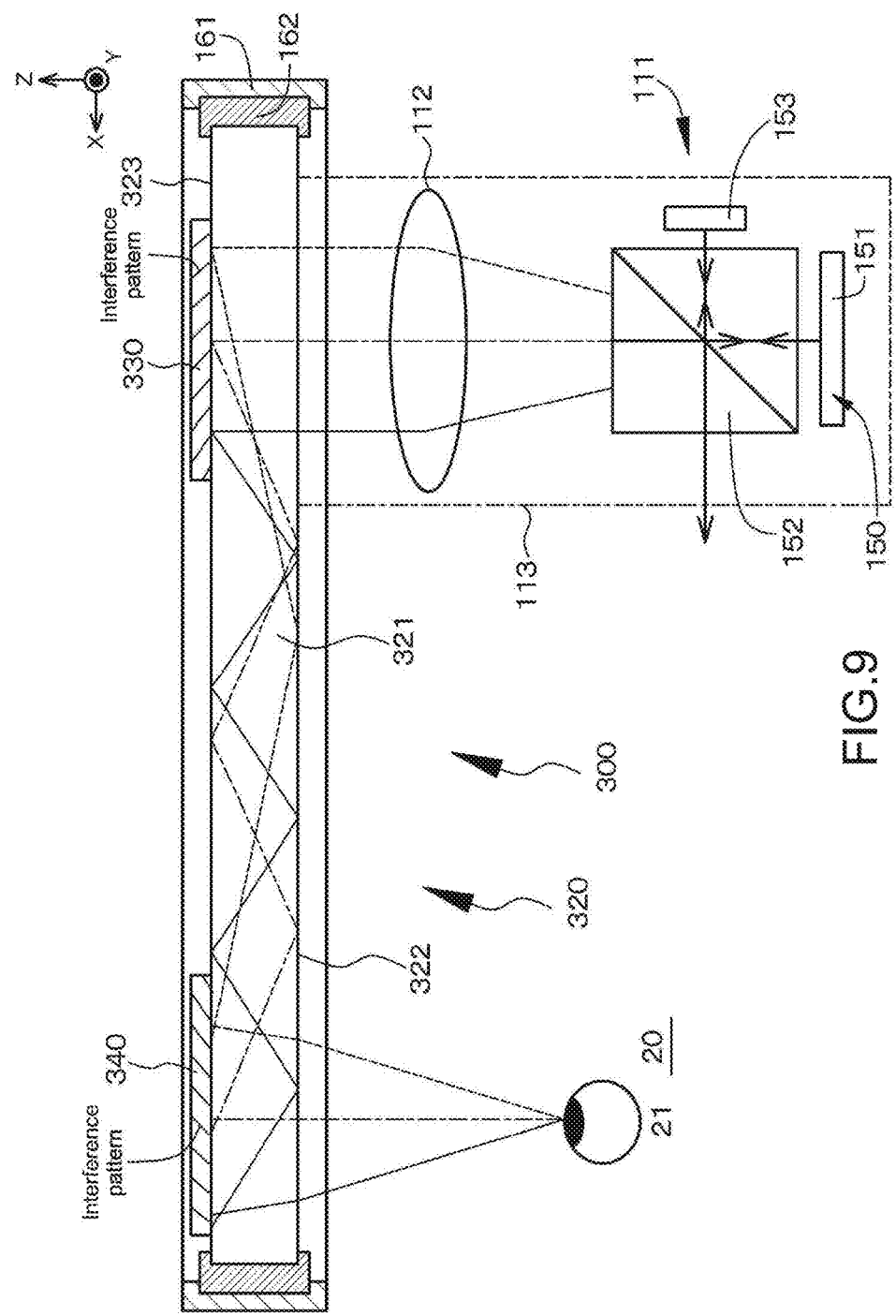
FIG. 9 is a conceptual view of an image display device in a display apparatus in Example 3.
Figure 10:
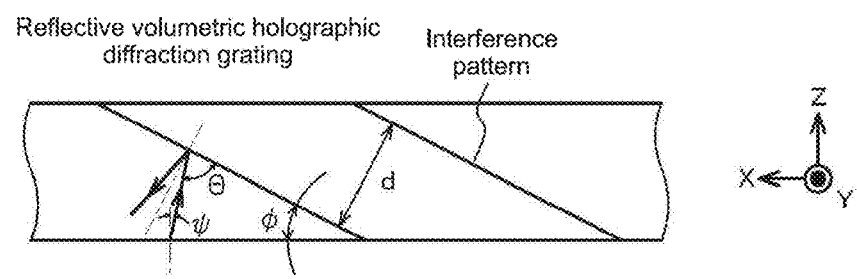
FIG. 10 is a schematic cross-sectional view of a partially-enlarged reflective volumetric holographic diffraction grating in the display apparatus in Example 3.

Example 3 is also a modification of Example 1. FIG. 9 is a conceptual view of the image display device 300 in a display apparatus (head mounted display) in Example 3. FIG. 10 is a schematic cross-sectional view of a partially-enlarged reflective volumetric holographic diffraction grating. In Example 3, the image forming unit 111 is the first image forming unit similarly in Example 1. The light guide unit 320 is basically the same as the light guide unit 120 in Example 1 in terms of structure and configuration except for first and second deflection sections.

In Example 3, the first and second deflection sections are provided on the surface of the light guide plate 321 (specifically on the second plane 323 of the light guide plate 321). The first deflection section diffracts and reflects light directed into the light guide plate 321, and the second deflection section diffracts and reflects the light for a plurality of times after the light is propagated by total reflection in the light guide plate 321. Herein, the first and second deflection sections are each a diffraction grating element, specifically a reflective diffraction grating element, and more specifically a reflective volumetric holographic grating element. In the description below, for convenience, the first deflection section being a reflective volumetric holographic diffraction grating is referred to as "first diffraction grating member 330", and the second deflection section being a reflective volumetric holographic diffraction grating is referred to as "second diffraction grating member 340".

In Example 3 or Example 4 that will be described later, the first and second diffraction grating members 330 and 340 are each a laminate structure of a single diffraction grating layer. The diffraction grating layers are each made of photopolymer, and are each manufactured in the previous manner with an interference pattern formed to correspond to one wavelength band (or wavelength). The interference pattern formed on the diffraction grating layer (diffraction optical element) is constant in pitch, and is linear and parallel to the Y axis. The axes of the first diffraction grating members 330 and 340 are both parallel to the X axis, and the normals thereto are parallel to the Z axis.

FIG. 10 is a schematic cross-sectional view of a partially-enlarged reflective volumetric holographic diffraction grating. The reflective volumetric holographic diffraction grating is formed with an interference pattern with a desired slant angle of $\phi$. Herein, the slant angle $\phi$ means an angle formed between the surface of the reflective volumetric holographic diffraction grating and the interference pattern. The interference pattern is formed from the inside to the surface of the reflective volumetric holographic diffraction grating. The interference pattern satisfies Bragg's Law. Herein, Bragg's Law means a condition satisfying Equation A below. In Equation A, m denotes a positive integer, $\lambda$ denotes a wavelength, d denotes a grating surface pitch (normal interval on virtual plane including interference pattern), and $\Theta$ denotes a complementary angle of light entering the interference pattern. Equation B shows the relationship between the complementary angle $\Theta$, the slant angle $\phi$, and an incident angle $\varphi$ when light enters the diffraction grating member at the incident angle $\varphi$.

$$m*\lambda = 2*d*\sin(\Theta) \quad \quad A$$

$$\Theta = 90° - (\phi + \varphi) \quad \quad B$$

As described above, the first diffraction grating member 330 is disposed (attached) on the second plane 323 of the light guide plate 321, and as to collimated light directed into the light guide plate 321 from the first plane 322, diffracts and reflects the light to achieve total reflection thereof in the light guide plate 321. Also as described above, the second diffraction grating member 340 is disposed (attached) on the second plane 323 of the light guide plate 321, and diffracts and reflects the collimated light for a plurality of times after the light is propagated by total reflection in the light guide plate 321. The light remains collimated when it is emitted from the first plane 322 of the light guide plate 321.

Also from the light guide plate 321, the collimated light is emitted after the light is propagated by total reflection therein. The light guide plate 321 is thin, and thus an optical path is long for the light to propagate therein. Therefore, the light is reflected a different number of times depending on the viewing angle before reaching the second diffraction grating member 340. More in detail, in the collimated light entering the light guide plate 321, a part of the light entering the light guide plate 321 at an angle in the direction of being closer to the second diffraction grating member 340 is reflected less often than a part of the light entering the light guide plate 321 at an angle in the direction of being away from the second diffraction grating member 340. This is because, in the collimated light diffracted and reflected on the first diffraction grating member 330, the collimated light entering the light guide plate 321 at an angle in the direction of being closer to the second diffraction grating member 340 forms an angle smaller than the collimated light entering the light guide plate 321 at an angle in the opposite direction. This angle is formed with the normal to the light guide plate 321 when the light propagating in the light guide plate 321 bumps on the inner surface thereof. The interference patterns formed in the first and second diffraction gating members 330 and 340 are symmetrical with respect to the virtual plane, which is vertical to the axis of the light guide plate 321.

The light guide plate 321 in Example 4 that will be described later is basically the same as the light guide plate 321 described above in terms of structure and configuration.

As described above, the display apparatus in Example 3 is substantially in the same structure and configuration as the display apparatus in Example 1 except for the light guide unit 320, and thus is not described in detail again.

Example 4

Figure 11:
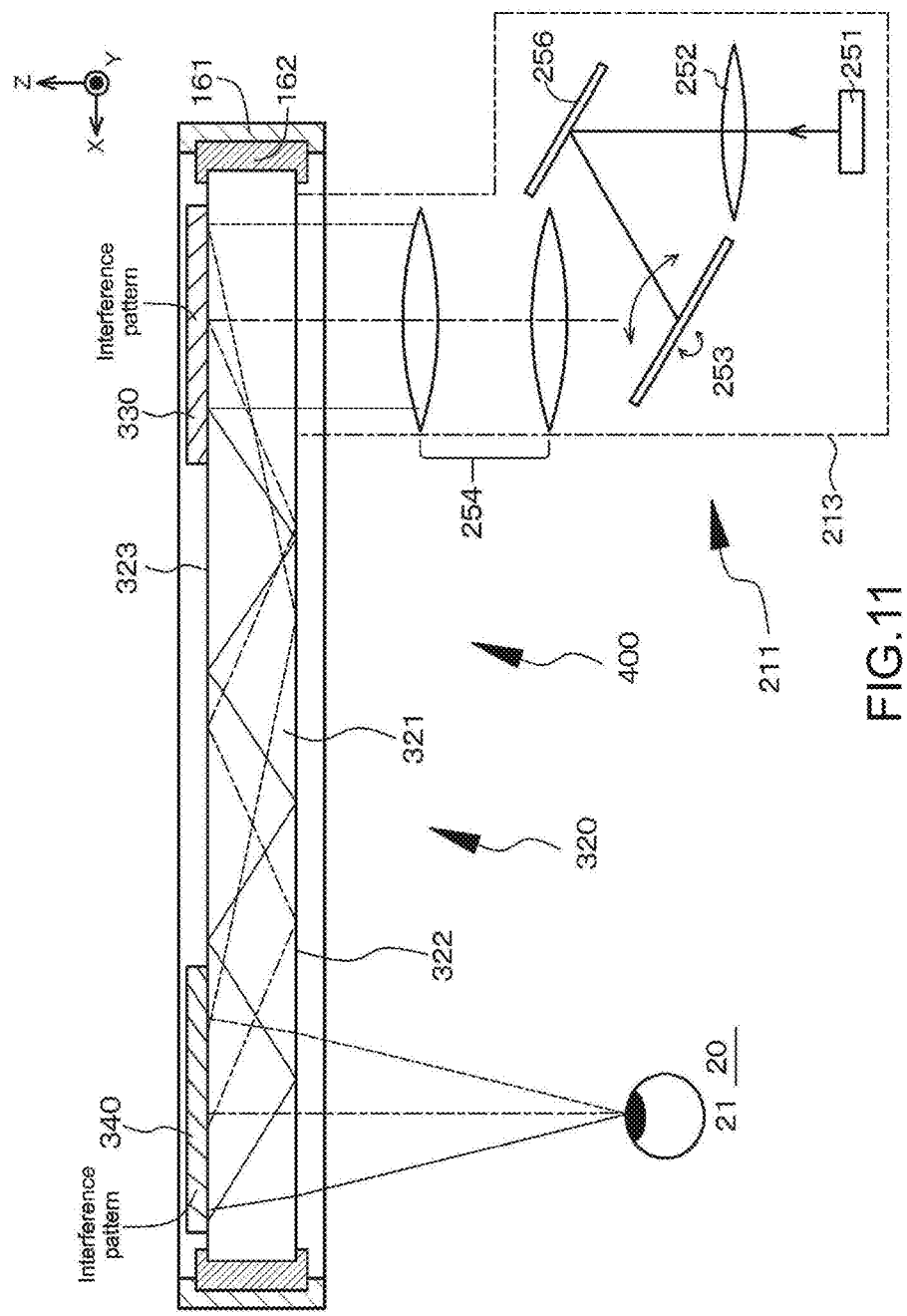
FIG. 11 is a conceptual view of an image display device in a display apparatus in Example 4.

Example 4 is a modification of Example 3. FIG. 11 is a conceptual view of an image display device in a display apparatus (head mounted display) in Example 4. The components in the image display device 400 in Example 4, i.e., the light source 251, the collimator optical system 252, the scanning section 253, the collimator light emitting optical system (relay optical system 254), and others, are in the same structure and configuration as those in Example 2 (the second image forming unit). The light guide unit 320 in Example 4 is in the same structure and configuration as the light guide unit 320 in Example 3.

The display apparatus in Example 4 is substantially in the same structure and configuration as the display apparatus in Example 2, and thus is not described in detail again.

In Examples 3 and 4, the light guide unit is configured by a piece of light guide plate. For color image display, first, second, and third light guide plates 321R, 321G, and 321B may be stacked together with an interval thereamong as shown in a conceptual view of FIG. 12. That is, the first light guide plate 321R is provided with a diffraction grating member (not shown) being a layer of reflective volumetric holographic diffraction grating that diffracts and reflects light in a red wavelength band (or with a red wavelength). The second light guide plate 321G is provided with a diffraction grating member (not shown) being a layer of reflective volumetric holographic diffraction grating that diffracts and reflects light in a green wavelength band (or with a green wavelength). The third light guide plate 321B is provided with a diffraction grating member (not shown) being a layer of reflective volumetric holographic diffraction grating that diffracts and reflects light in a blue wavelength band (or with a blue wavelength).

The light guide plate is made of resin with the thickness of 1.0 mm, and the support member 161 is made of magnesium alloy with the thickness of 3.5 mm. By using an adhesive 163 with the thickness of 0.1 mm, the first and second light guide plates 321R and 321G are bonded together at their end portions, and the second and third light guide plates 321G and 321B are bonded together at their end portions. The interval between the first and second light guide plates 321R and 321G is 0.1 mm, and the interval between the second and third light guide plates 321G and 321B is 0.1 mm. While the buffer members 162 are respectively in contact with the end surfaces on both end portions of the three light guide plates 321R, 321G, and 321B, the support member 161 is attached with these three light guide plates 321R, 321G, and 321B at their end portions via the buffer members 162. The buffer member 162 is made of an adhesive material with the thickness of 0.5 mm. Herein, assuming that the light guide plates each have an elastic modulus of 1, the buffer member 162 and the adhesive 163 respectively have the elastic modulus of $5 \times 10^{-5}$ and 3.5.

Figure 12:
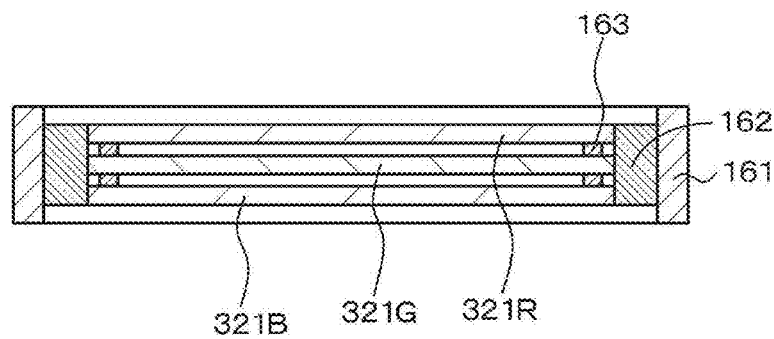
FIG. 12 is a conceptual view of a modification of the image display device in the display apparatus in Example 4.

As Comparison Example, the support member 161 is attached with the three light guide plates 321R, 321G, and 321B at their end portions using not the buffer members 162 but an adhesive same as the adhesive 163, by the same method shown in FIG. 12.

With a simulation that the light guide units in Example 4 and Comparison Example are disposed in the environment where the temperature is changed from 0° C. to 40° C., the simulation result shows 0.1 for the light guide plate in the light guide unit in Example 4 as the maximum possible value of warping when the maximum possible value of warping is 1 for the light guide plate in the light guide unit in Comparison Example.

Example 5

Example 5 is about a display apparatus according to the second embodiment of the present disclosure, an image display device according to the second embodiment of the present disclosure, and a light guide unit according to the second embodiment of the present disclosure. FIGS. 13A, 13B, 14A, 14C, and 14E are each a schematic plan view of a light guide plate, a support member, and a buffer member, showing the layout thereof in the display apparatus, the image display device, and the light guide unit in Example 5. Note that the remaining components in Example 5 are the same as those in Examples 1 to 4 except for a fixing member, and the conceptual view of the image display device in Example 5 is the same as that of the image display devices in Examples 1 to 4, and thus no detailed description thereabout is given.

Figure 13A:
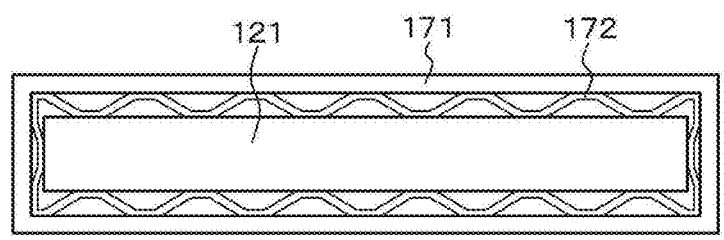
FIGS. 13A and 13B are each a schematic plan view of a light guide plate, a support member, and a fixing member, showing the layout thereof in an image display device in an image display apparatus in Example 5.
Figure 13B:
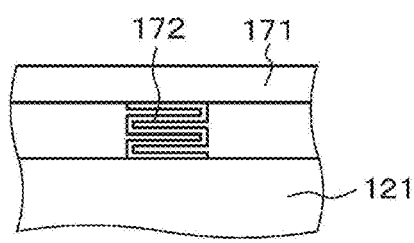
Figure 14A:
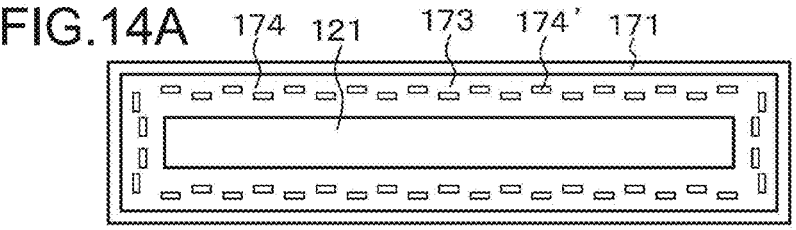
FIGS. 14A, 14C, and 14E are each a schematic plan view of a light guide plate, a support member, and a buffer member, showing the layout thereof in a modification of the image display device in the display apparatus in Example 5.
Figure 14B:
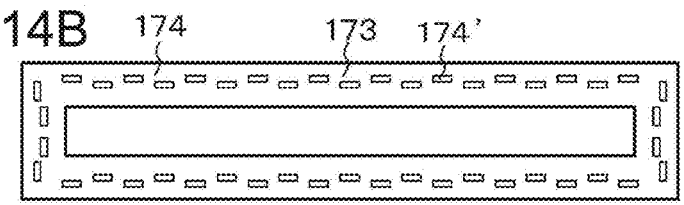
FIG. 14B is a schematic plan view of the fixing member.

In Example 5, as shown in FIGS. 13A and 13B, the fixing member 172 is a spring. In the example of FIG. 13A, there is an interval between the light guide plate 121 and the support member 171, and in this interval, the leaf spring 172 is provided. Alternatively, as FIG. 13B partially shows the light guide plate 121, the support member 171, and the fixing member 172, in the interval between the light guide plate 121 and the support member 171, provided is the meandering spring 172. As shown in FIG. 14A, although not essential, the fixing member 173 is formed with a buffer area 174, and this buffer area is formed with voids or notch sections 174'. That is, the fixing member 173 is specifically an adhesive layer (more specifically, is made of epoxy resin, modified silicone resin, epoxy-modified silicone resin, urethane resin, or others), and although not essential, the adhesive layer is formed with the voids or notch sections 174'. FIG. 14B shows a schematic plan view of the fixing member 173.

Figure 14C:
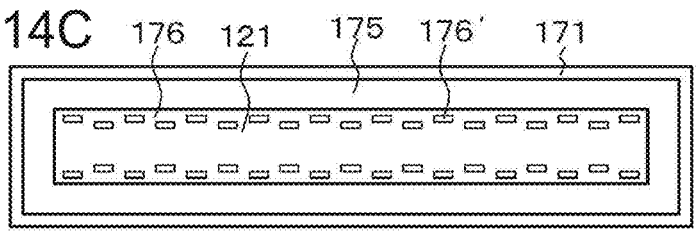
Figure 14D:
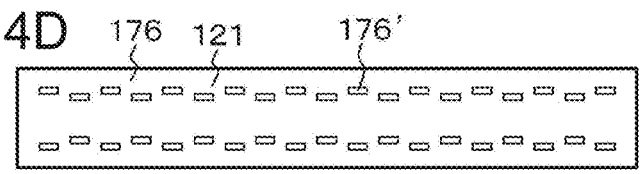
FIG. 14D is a schematic plan view of the light guide plate.
Figure 14E:
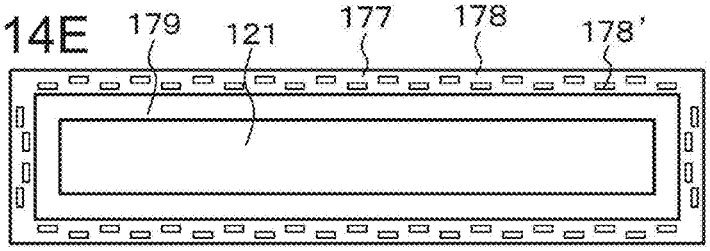
Figure 14F:
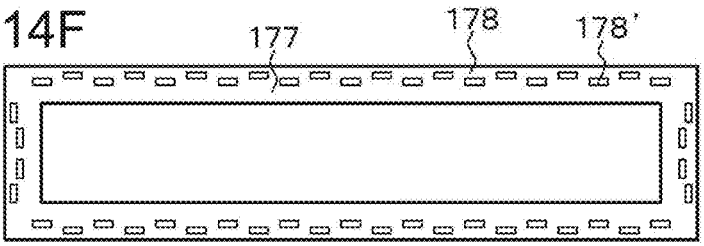
FIG. 14F is a schematic plan view of the support
member.

Alternatively, as shown in FIG. 14C, the light guide plate 121 is provided with a buffer area 176 on the outer circumferential portion thereof. This buffer area 176 is formed with voids or notch sections 176'. FIG. 14D shows a schematic plan view of the light guide plate 121. Still alternatively, as shown in FIG. 14E, a buffer area 178 is provided to the inner circumferential portion of the support member 177, and this buffer area 178 is formed with void or notch sections 178'. Around the light guide plate 121, the fixing member 175 or 179 is provided to fix the light guide plate 121 to the support member 171 or 177. FIG. 14F shows a schematic plan view of the support member 177.

In Example 5, the fixing member 172, 173, 175, or 179 attaches the light guide plate 121 to the support member 171 or 177 by being entirely in contact with the outer circumferential portion of the light guide plate 121. Alternatively, the fixing member may attach the light guide plate 121 to the support member 171 or 177 by being in contact with at least four portions on the outer circumferential portion of the light guide plate 121, i.e., in contact with at least a portion on each side of the square-shaped light guide plate 121. The structures and configurations in FIGS. 13A, 13B, 14A, 14C, and 14E may be combined as appropriate.

In the light guide unit, the image display device, or the display apparatus in Example 5, the fixing member for use to fix the light guide plate to the support member is disposed therebetween and around the light guide plate. Such a configuration prevents, without fail, the degradation problems of display images that are caused by the expanded/contracted light guide plate resulted from an environmental temperature change or a difference of thermal expansion coefficients between the members therein. Also in such a configuration, the light guide plate may be retained with sufficient stability. [Example 6]

Figure 15:
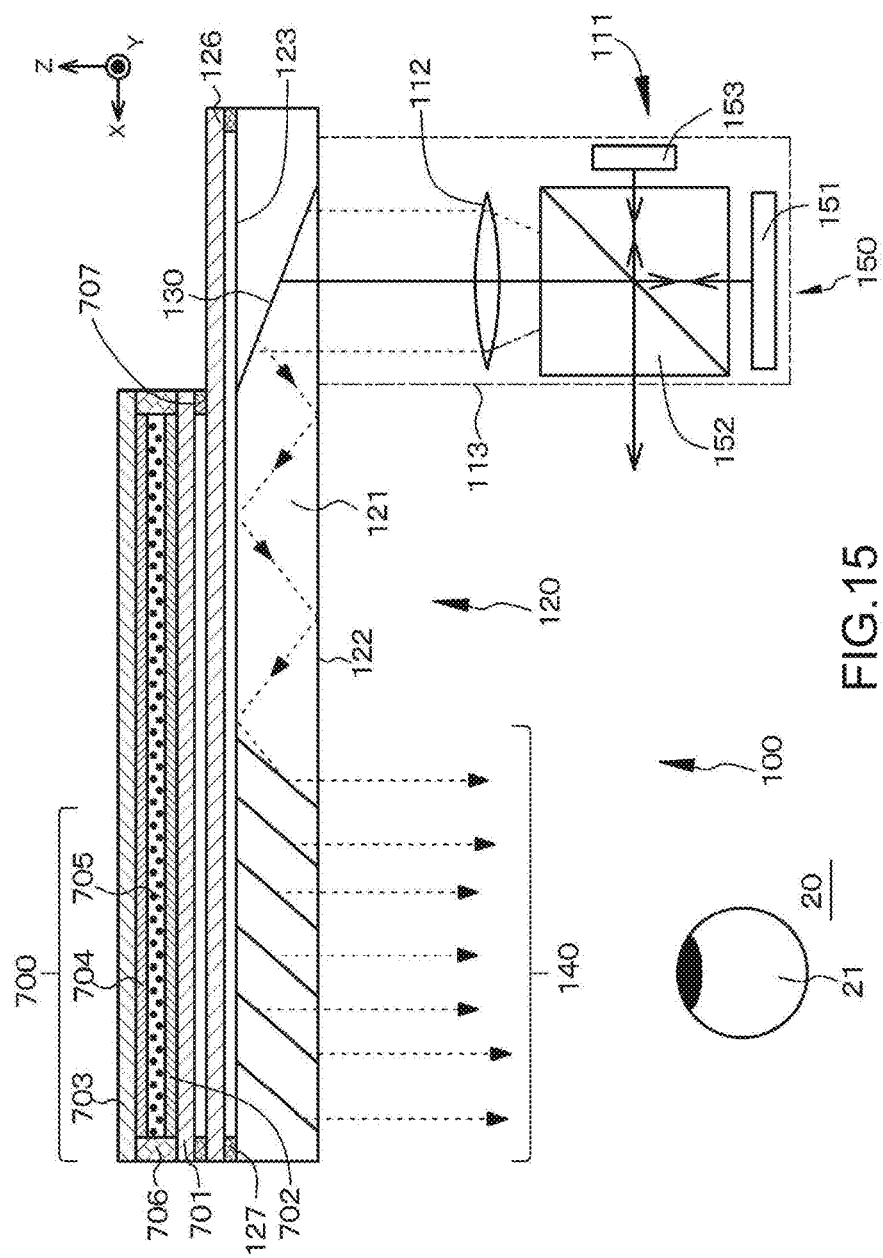
FIG. 15 is a conceptual view of an image display device
in a display apparatus in Example 6.

Example 6 is a modification of Examples 1 to 5, and as shown in a conceptual view of FIG. 15, the light guide plate 121 is attached with the dimmer unit 700 on the second plane side. That is, the dimmer unit 700 is provided on the side of the light guide unit 120 or 320 not provided with the image forming unit 111 or 211. To be specific, using an adhesive 707, the dimmer unit 700 being a kind of optical shutter is fixed to the light guide unit 120 or 320, specifically to a protection member (protection plate) 126 that protects the light guide plate 121 or 321. The dimmer unit 700 is provided to the area of the light guide unit 120 or 320 on the side opposite to the viewer 20. The protection member (protection plate) 126 is attached to the second plane 123 or 323 of the light guide plate 121 or 321 using an adhesive 127, and the protection member (protection plate) 126 covers the first deflection section 130 or 330, and the second deflection section 140 or 340. The second deflection section 140 or 340 is positioned in the projection image of the dimmer unit 700. FIGS. 15, 17A, 18A, 19, 20, 21, 22, 23, 24, 25, 26, 27, 28, 29, 30, 31, and 32 do not show the support member and others.

The dimmer unit 700 in Example 6 is an optical shutter in which a light-transmission control material layer 705 is made of a liquid crystal material. That is, the dimmer unit 700 includes transparent first and second substrates 701 and 703, the first substrate opposing the light guide unit 120, the second substrate 703 opposing the first substrate 701, first and second electrodes 702 and 704 respectively provided to the first and second substrates 701 and 703, and the light-transmission control material layer 705 sealed between the first and second substrates 701 and 703. Herein, the first and second substrates 701 and 703 are each made of a plastic material. The first and second electrodes 702 and 704 are each a transparent electrode made of ITO (indium tin oxide), and are each formed by a combination of PVD such as sputtering and lifting off. The light-transmission control material layer 705 is specifically a liquid crystal layer made of a TN (Twisted Nematic) liquid crystal material. The first and second electrodes 702 and 704 are not patterned, and are so-called solid electrodes. However, the first and second electrodes 702 and 704 may be patterned as appropriate. The first and second electrodes 702 and 704 are connected to the control unit 18 via connectors and wiring lines that are not shown.

The first and second substrates 701 and 703 are sealed together at outer edge portions using a sealing agent 706. The first substrate 701 of the dimmer unit 700 and the protection member 126 (protecting the light guide plate 121) are attached together by the adhesive 707. The first and second substrates 701 and 703 are each affixed with a polarizer film on the outer surface, but these polarizer films are not shown. The first substrate 701 in the dimmer unit 700 is shorter than the light guide plate 121, and the first substrate 701 in the dimmer unit 700 is fixed to the protection member 126 using the adhesive 707. The adhesive 707 is provided at the outer edge portion of the first substrate 701. This is applicable also to other Examples to be described below. The light guide unit 120 and the dimmer unit 700 are disposed in this order from the viewer's side.

Figure 16A:
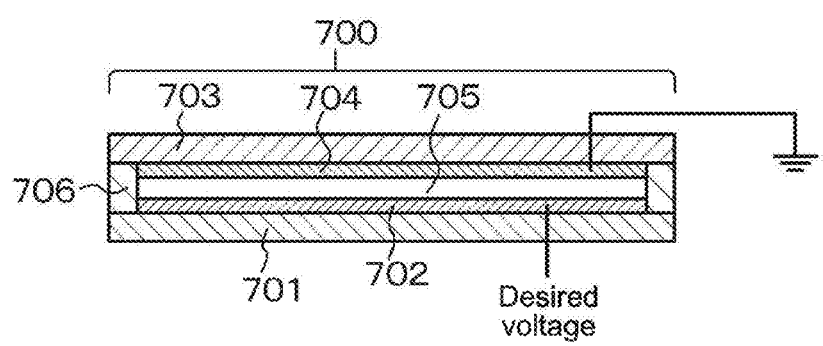
FIGS. 16A and 16B are each a schematic cross-sectional
view of a dimmer unit, showing how the dimmer unit
operates in the display apparatus in Example 6.
Figure 16B:
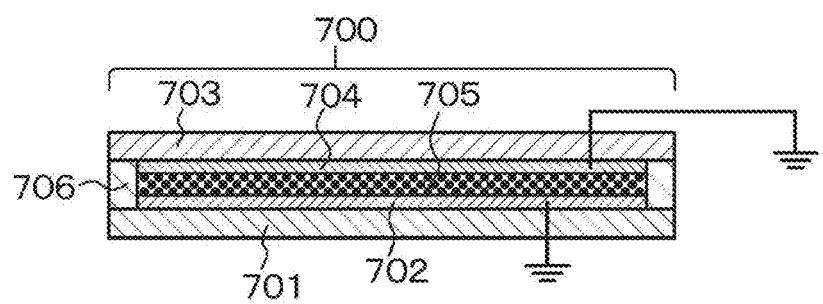

The dimmer unit 700 is controlled in light transmittance by voltage to be applied to the first and second electrodes 702 and 704. To be specific, when voltage is applied to the first electrode 702 while the second electrode 704 is grounded, for example, this causes a change of liquid crystal alignment in the liquid crystal layer configuring the light-transmission control material layer 705 so that the light transmittance is changed in the liquid crystal layer (refer to FIGS. 16A and 16B). For voltage application to the first and second electrodes 702 and 704, a viewer may operate a control knob provided to the control unit 18. That is, the viewer may adjust the light transmittance of the dimmer unit 700 while viewing images provided by the light guide unit 120 or 320.

As described above, with the display apparatus in Example 6, the image display device offers satisfactory images to the viewer with no disturbance by the outside light.

In Example 6 described above, the dimmer unit 700 is attached to the image display device 100, i.e., the dimmer unit 700 is specifically attached to the light guide unit 120. Alternatively, the dimmer unit 700 may be attached to the frame 10, or to the chassis 113.

The dimmer unit 700 may be ON at all times, may be operated/not operated (turned ON/OFF) in response to a viewer's command (operation), or may be OFF under normal conditions and may start operating in response to a signal for image display on the image display device 100, 200, 300 or 400. In order to be operated/not operated in response to a viewer's command (operation), the display apparatus may be further provided with a microphone, and may control the operation of the dimmer unit 700 in response to an audio input via the microphone, for example. To be specific, the dimmer unit may be controlled to operate/not to operate in response to a command issued by a viewer's voice. Alternatively, the display apparatus may further include an infrared light incident/exit unit, and using this infrared light incident/exit unit, may control the operation of the dimmer unit 700. That is, a viewer's blinking may be detected using the infrared light incident/exit unit to control the dimmer unit 700 to operate/not to operate.

Example 7

Figure 17A:
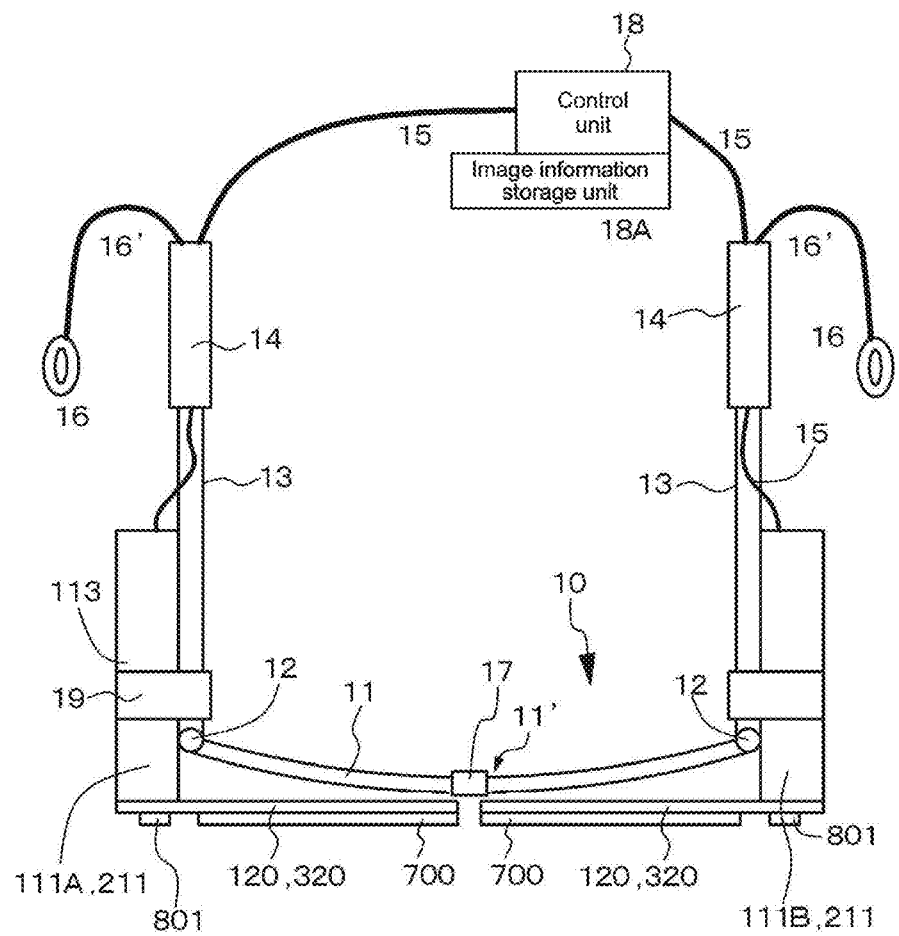
FIG. 17A is a schematic top view of a display apparatus
in Example 7.
Figure 17B:
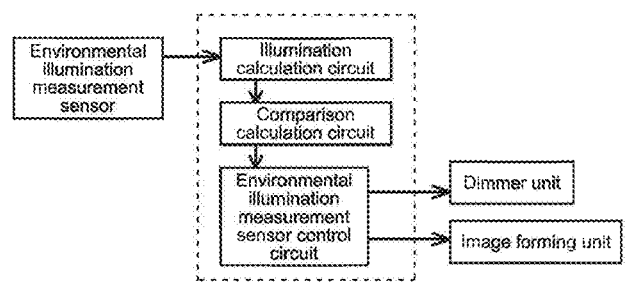
FIG. 17B is a schematic view of a circuit
that controls an illumination sensor.

Example 7 is a modification of Example 6. FIG. 17A is a schematic top view of a display apparatus in Example 7, and FIG. 17B is a schematic view of a circuit that controls an illumination sensor. The display apparatus in Example 7 is further provided with a sensor 801 that measures the brightness in the outside environment. Based on the measurement result of outside brightness obtained by the sensor (hereinafter referred to as "first illumination sensor" for convenience) 801, a part of the dimmer unit 700 is changed in light transmittance.

That is, the display apparatus in Example 7 is further provided with the first illumination sensor (environmental illumination measurement sensor) 801 that measures the illumination in the environment where the display apparatus is disposed. The display apparatus controls the light transmittance of the dimmer unit 700 based on the measurement result of the first illumination sensor 801. Together with or separately from the control over the light transmittance, the display apparatus controls the luminance of images to be formed by the image forming unit 111 or 211 based on the measurement result of the first illumination sensor 801. The first illumination sensor 801 in the well-known structure and configuration may be provided to the outer end portion of the light guide unit 120 or 320, or to the outer end portion of the dimmer unit. The first illumination sensor 801 is connected to the control unit 18 via connectors and wiring lines that are not shown. The control unit 18 includes a circuit for controlling the first illumination sensor 801. This circuit for controlling the first illumination sensor 801 is configured by an illumination calculation circuit, a comparison calculation circuit, and an environmental illumination measurement sensor control circuit. The illumination calculation circuit calculates the illumination based on the measurement value provided by the first illumination sensor 801. The comparison calculation circuit compares the calculation result of the illumination calculation circuit, i.e., illumination value, with a standard value. The environmental illumination measurement sensor control circuit controls the dimmer unit 700 and/or the image forming unit 111 or 211 based on the value obtained by the comparison calculation circuit. These circuits may be each a well-known circuit. For controlling the dimmer unit 700, the light transmittance therein is controlled, and for controlling the image forming unit 111 or 211, the luminance of images to be formed thereby is controlled. Herein, the control over the light transmittance in the dimmer unit 700 and the control over the luminance of images formed by the image forming unit 111 or 211 may be executed separately or executed in correlation with each other.

As an example, when the first illumination sensor 801 shows the measurement result of a predetermined value (first illumination measurement value) or higher, the dimmer unit 700 is adjusted to have the light transmittance of a predetermined value (first light transmittance) or lower. On the other hand, when the first illumination sensor 801 shows the measurement result of a predetermined value (second illumination measurement value) or lower, the dimmer unit 700 is adjusted to have the light transmittance of a predetermined value (second light transmittance) or higher. The first illumination measurement value is 10 lux, the first light transmittance takes any value in a range from 1% to 30% inclusive, the second illumination measurement value is 0.01 lux, and the second light transmittance takes any value in a range from 51% to 99% inclusive, for example.

The first illumination sensor (environmental illumination measurement sensor) 801 in Example 7 is applicable to the display apparatuses described in Examples 2 to 5. When the display apparatus is provided with an imaging unit, the first illumination sensor 801 may be configured by light-receiving elements provided to the imaging unit for exposure measurement.

In the display apparatus in Example 7 or Example 8 that will be described next, the light transmittance of the dimmer unit is controlled based on the measurement result of the first illumination sensor (environmental illumination measurement sensor), and the luminance of images to be formed by the image forming unit is controlled also based on the measurement result of the first illumination sensor. Moreover, as will be described next, the light transmittance of the dimmer unit is controlled based on the measurement result of the second illumination sensor (transmitted-light illumination measurement sensor), and the luminance of images to be formed by the image forming unit is controlled also based on the measurement result of the second illumination sensor. Such control execution offers high-contrast images for viewing by a viewer, and also optimizes the surrounding conditions for viewer's image viewing considering the illumination in the ambient environment where the display apparatus is disposed.

Example 8

Figure 18A:
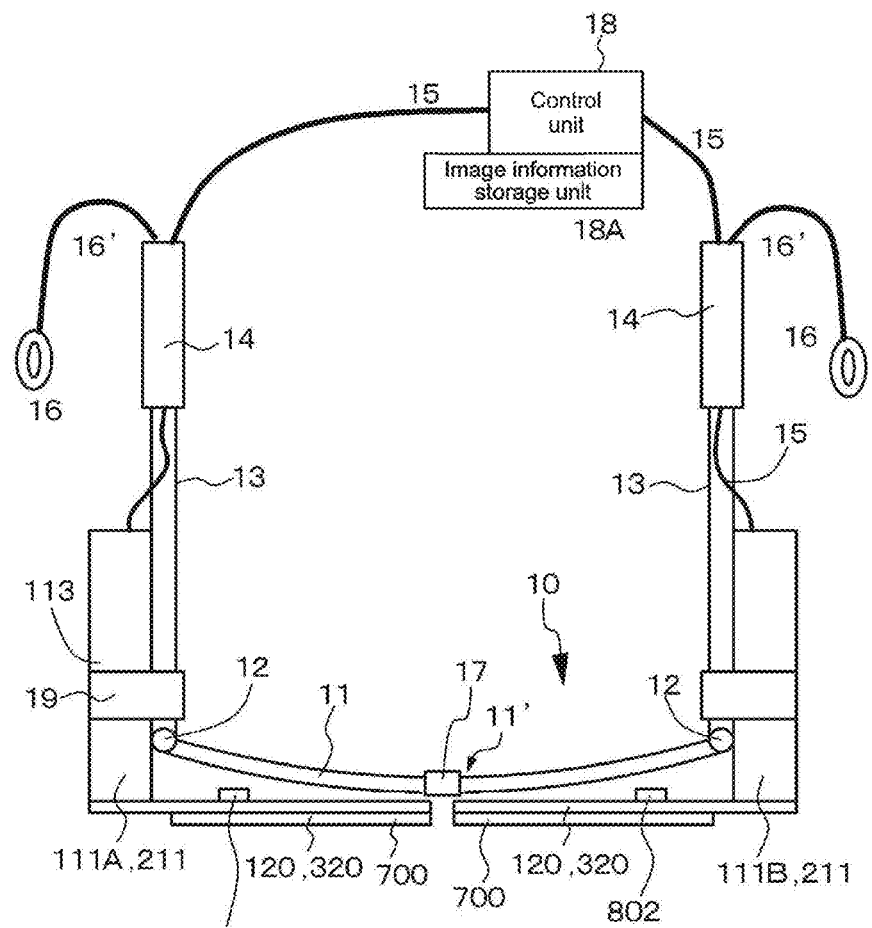
FIG. 18A is a schematic top view of a display apparatus
in Example 8.
Figure 18B:
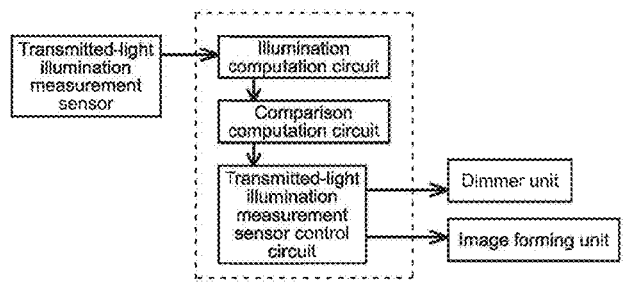
FIG. 18B is a schematic view of a circuit
that controls an illumination sensor.

Example 8 is also a modification of Example 6. FIG. 18A is a schematic top view of a display apparatus in Example 8, and FIG. 18B is a schematic view of a circuit that controls an illumination sensor.

The display apparatus in Example 8 measures the illumination based on light passed through the dimmer unit from the outside environment. That is, the display apparatus is further provided with a second illumination sensor (transmitted-light illumination measurement sensor) 802 that measures the illumination of environment light, i.e., whether the light is adjusted to have a desired value of illumination after passing through the dimmer unit. The measurement result of the second illumination sensor 802 is used as a basis to control the light transmittance of the dimmer unit 700. Together with or separately from the control over the light transmittance, the display apparatus controls the luminance of images to be formed by the image forming unit 111 or 211 based on the measurement result of the second illumination sensor 802. The second illumination sensor 802 in the well-known structure and configuration is provided closer to the viewer's side than the light guide unit 120 or 320. To be specific, the second illumination sensor 802 may be provided to the surface of the light guide unit 121 or 321 on the viewer's side. The second illumination sensor 802 is connected to the control unit 18 via connectors and wiring lines that are not shown. The control unit 18 includes a circuit for controlling the second illumination sensor 802. This circuit for controlling the second illumination sensor 802 is configured by an illumination calculation circuit, a comparison calculation circuit, and a transmitted-light illumination measurement sensor control circuit. The illumination calculation circuit calculates the illumination based on the measurement value provided by the second illumination sensor 802. The comparison calculation circuit compares the calculation result of the illumination calculation circuit, i.e., illumination value, with a standard value. The transmitted-light illumination measurement sensor control circuit controls the dimmer unit 700 and/or the image forming unit 111 or 211 based on the value obtained by the comparison calculation circuit. These circuits may be each a well-known circuit. For controlling the dimmer unit 700, the light transmittance therein is controlled, and for controlling the image forming unit 111 or 211, the luminance of images to be formed thereby is controlled. Herein, the control over the light transmittance in the dimmer unit 700 and the control over the luminance of images formed by the image forming unit 111 or 211 may be executed separately or executed in correlation with each other. Considering the illumination measured by the first illumination sensor 801, when the measurement result of the second illumination sensor 802 shows that the illumination is not controlled to obtain a desired value of illumination, i.e., the measurement result of the second illumination sensor 802 is not of a desired value of illumination, or when a delicate illumination adjustment is still expected, the dimmer unit may be adjusted in light transmittance at the same time with value monitoring of the second illumination sensor 802.

The second illumination sensor (transmitted-light illumination measurement sensor) 802 in Example 8 is applicable to the display apparatuses described in Examples 2 to 5. Alternatively, the second illumination sensor 802 in Example 8 may be combined with the first illumination sensor 801 in Example 7 for use. If this is the case, with various tests, the control over the light transmittance in the dimmer unit 700 may be executed separately from or in correlation with the control over the luminance of images to be formed by the image forming unit 111 or 211.

Example 9

Figure 19:
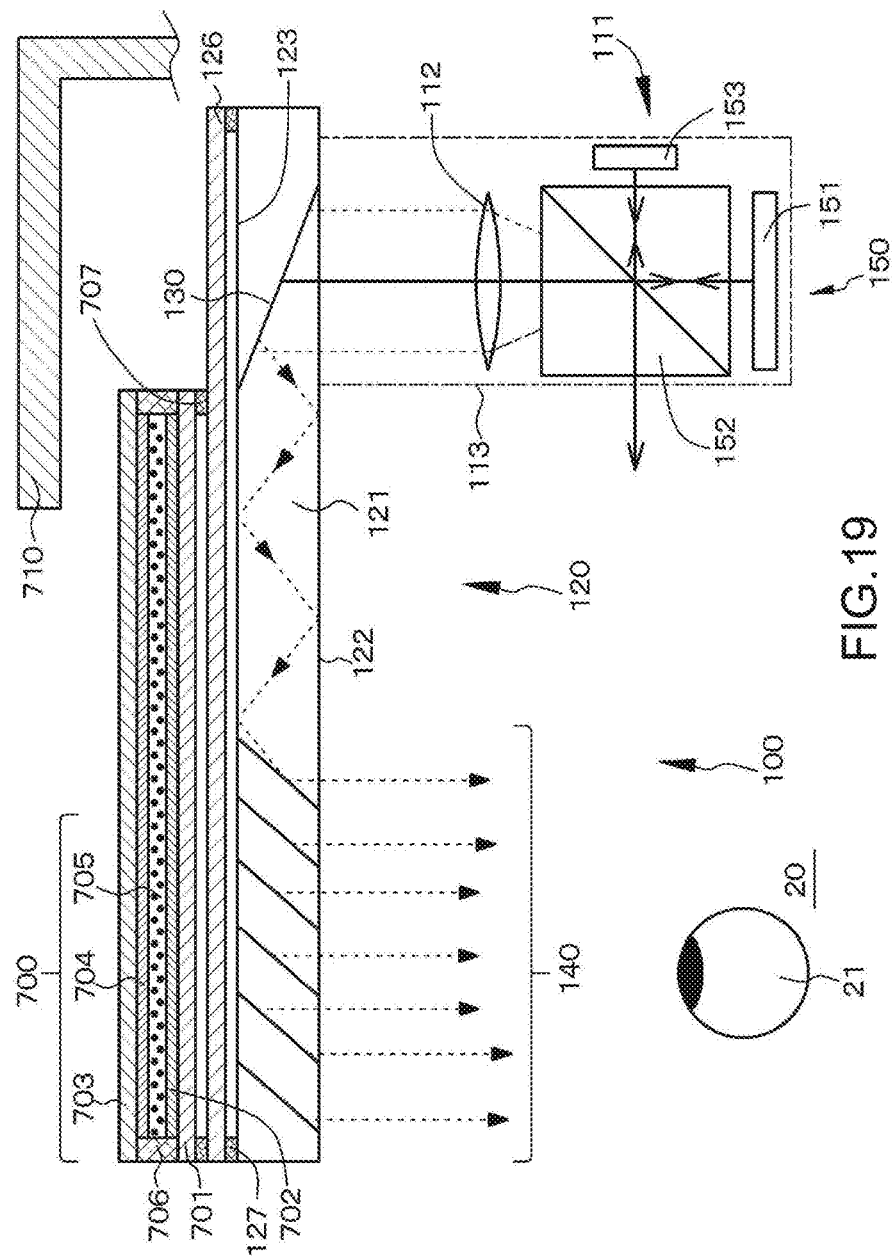
FIG. 19 is a conceptual view of an image display device
in a display apparatus in Example 9.
Figure 20:
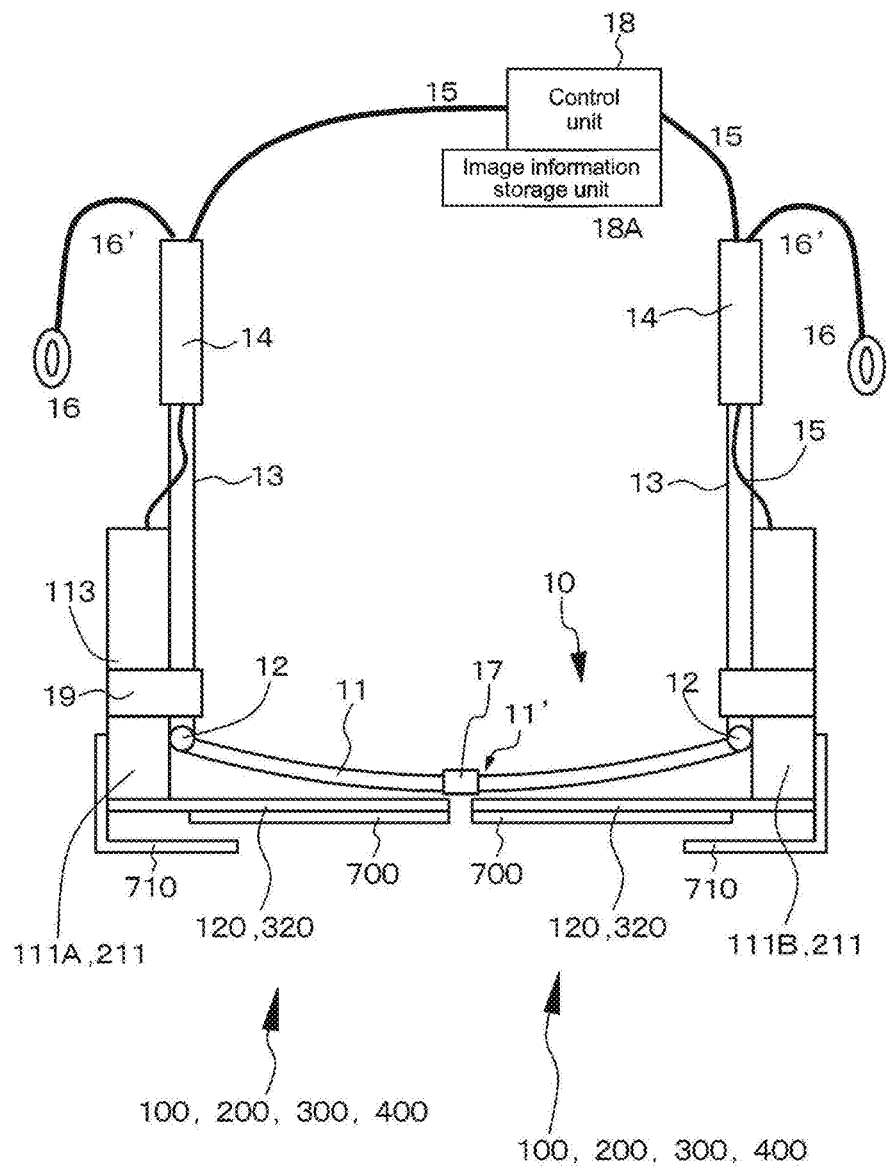
FIG. 20 is a schematic top view of the display apparatus
in Example 9.
Figure 21:
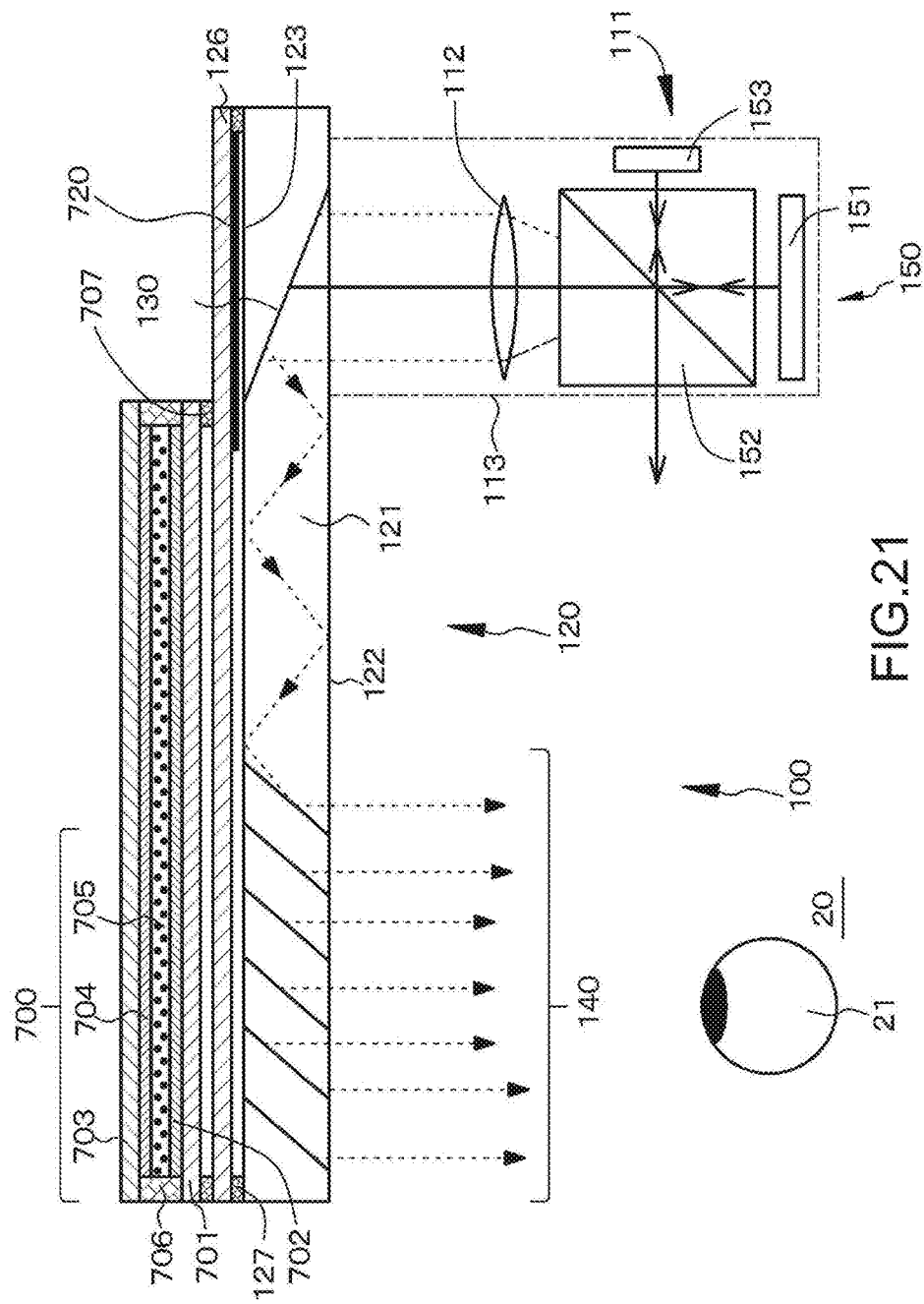
FIG. 21 is a conceptual view of an image display device
in a display apparatus in Example 10.

Example 9 is a modification of Examples 1 to 8, and is about the display apparatus in the second embodiment. FIG. 19 is a conceptual view of an image display device in Example 9, and FIG. 20 is a schematic top view of the display apparatus (specifically head mounted display (HMD)) in Example 9.

In the display apparatus in Example 9, a light shielding member 710 is provided to an area of the light guide unit 120 where light comes from the image forming unit 111A or 111B, specifically to an area where the first deflection section 130 is provided. This light shielding member 710 is for shielding the light guide unit 120 from the outside light. Herein, the projection image of the light shielding member 710 toward the light guide unit 120 includes the area of the light guide unit 120 where the light comes from the image forming unit 111A or 111B. The projection image of the light shielding member 710 toward the light guide unit 120 also includes the projection image of the end portion of the dimmer unit 700 toward the light guide unit 120.

In Example 9, the light shielding member 710 is provided to the light guide unit 120 on the side not provided with the image forming unit 111A or 111B, and is provided with a distance from the light guide unit 120. The light shielding member 710 is made of a non-transparent plastic material, for example. This light shielding member 710 is integrally extended from the chassis of the image display device 111A or 111B, or is attached to the chassis 113 of the image forming unit 111A or 111B, or is integrally extended from the frame 10, or is attached to the frame 10. In the shown example, the light shielding member 710 is integrally extended from the chassis 113 of the image forming unit 111A or 111B.

In the display apparatus in Example 9, the light shielding member is provided to an area of the light guide unit where light comes from the image forming unit. This light shielding member is for shielding the light guide unit from the outside light. Therefore, even if the operation of the dimmer unit changes the amount of incoming outside light, this does not cause image degradation on the display apparatus with no undesired stray light because no outside light enters the area of the light guide unit where light comes from the image forming unit, i.e., the first deflection section 130, in the first place.

Example 10

Example 10 is a modification of Example 9. As shown in a conceptual view of FIG. 21, unlike the display apparatus in Example 9, a display apparatus in Example 10 includes a light shielding member 720 in a portion of the light guide unit 120 on the side not provided with the image forming unit 111A or 111B. To be specific, the light shielding member 720 may be formed with printing on the light guide unit 120 (specifically on the inner surface of the protection member 126) using a non-transparent ink. Other than that, the display apparatus in Example 10 is in the same structure and configuration as the display apparatus in Example 9, and thus is not described in detail again. The light shielding member 720 in Example 10 may be combined with the light shielding member 710 in Example 9 for use. The light shielding member 720 may be formed on the outer surface of the protection member 126.

Example 11

Figure 22:
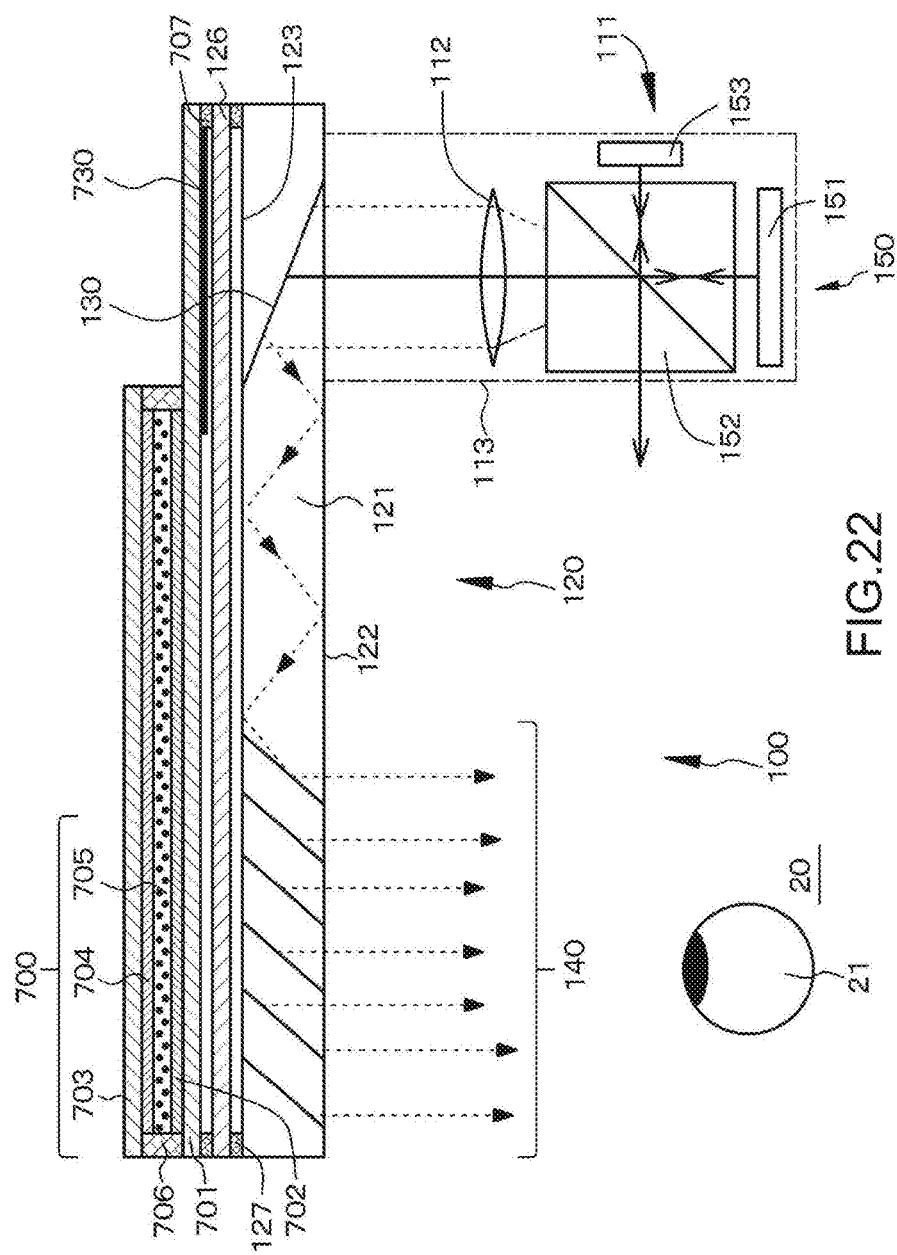
FIG. 22 is a conceptual view of an image display device
in a display apparatus in Example 11.
Figure 23:
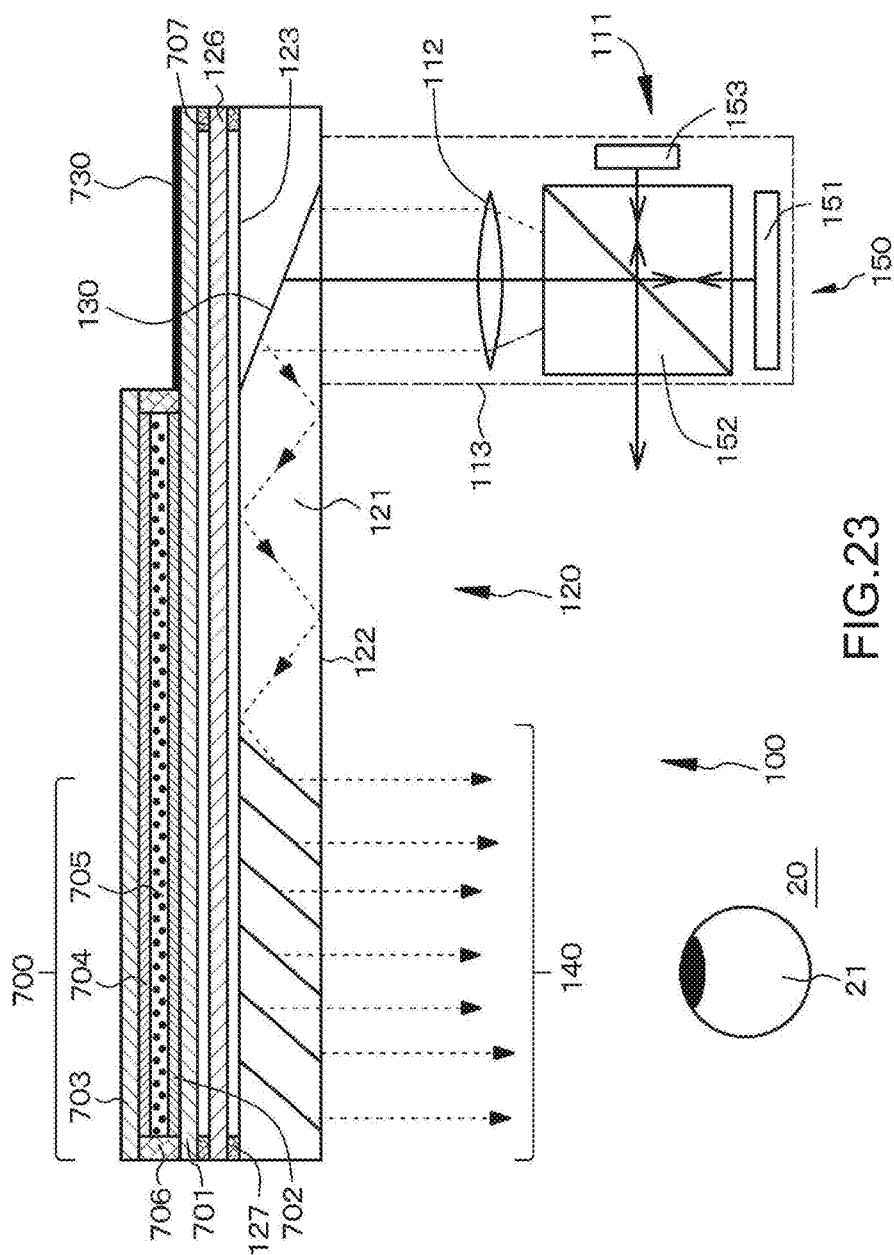
FIG. 23 is a conceptual view of a modification of the
image display device in the display apparatus in Example
11.

Example 11 is also a modification of Example 9. As shown in a conceptual view of FIG. 22 or 23, unlike the display apparatuses in Examples 9 and 10, a display apparatus in Example 11 includes a light shielding member 730 in the dimmer unit 700. To be specific, the light shielding member 730 may be formed with printing on the dimmer unit 700 using a non-transparent ink. In the example of FIG. 22, the light shielding member 730 is formed on the outer surface of the first substrate 701 in the dimmer unit 700, and in the example of FIG. 23, the light shielding member 730 is formed on the inner surface of the first substrate 701 in the dimmer unit 700. Other than that, the display apparatus in Example 11 is in the same structure and configuration as the display apparatus in Example 9, and thus is not described in detail again. The light shielding member 730 in Example 11 may be combined with the light shielding member 710 in Example 9 for use, the light shielding member 730 in Example 11 may be combined with the light shielding member 720 in Example 10 for use, or the light shielding member 730 in Example 11 may be combined with the light shielding members 710 and 720 in Examples 9 and 10.

Example 12

Example 12 is a modification of Examples 6 to 11. In Examples 6 to 11, the light-transmission control material layer 705 is configured by a liquid crystal material layer.

Figure 24:
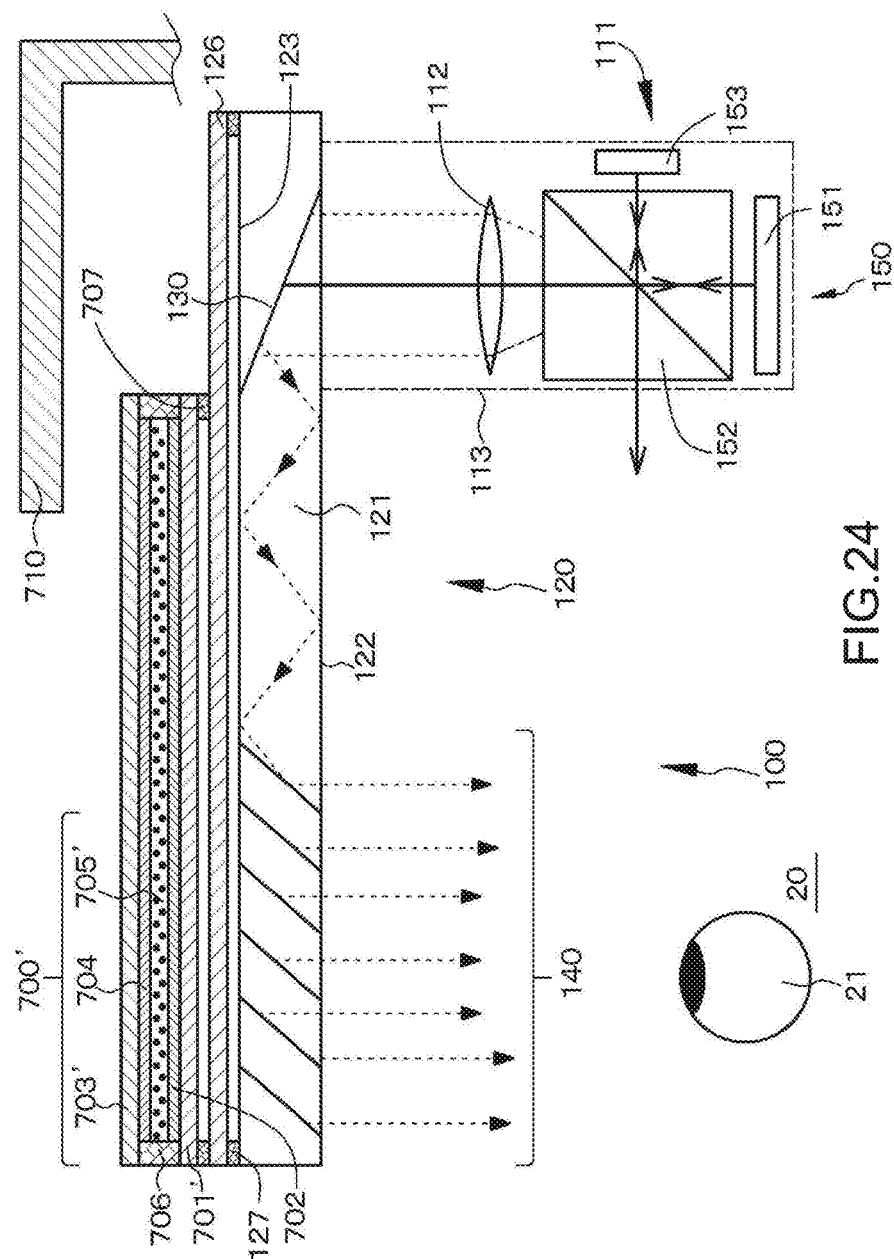
FIG. 24 is a conceptual view of an image display device
in a display apparatus in Example 12.
Figure 25:
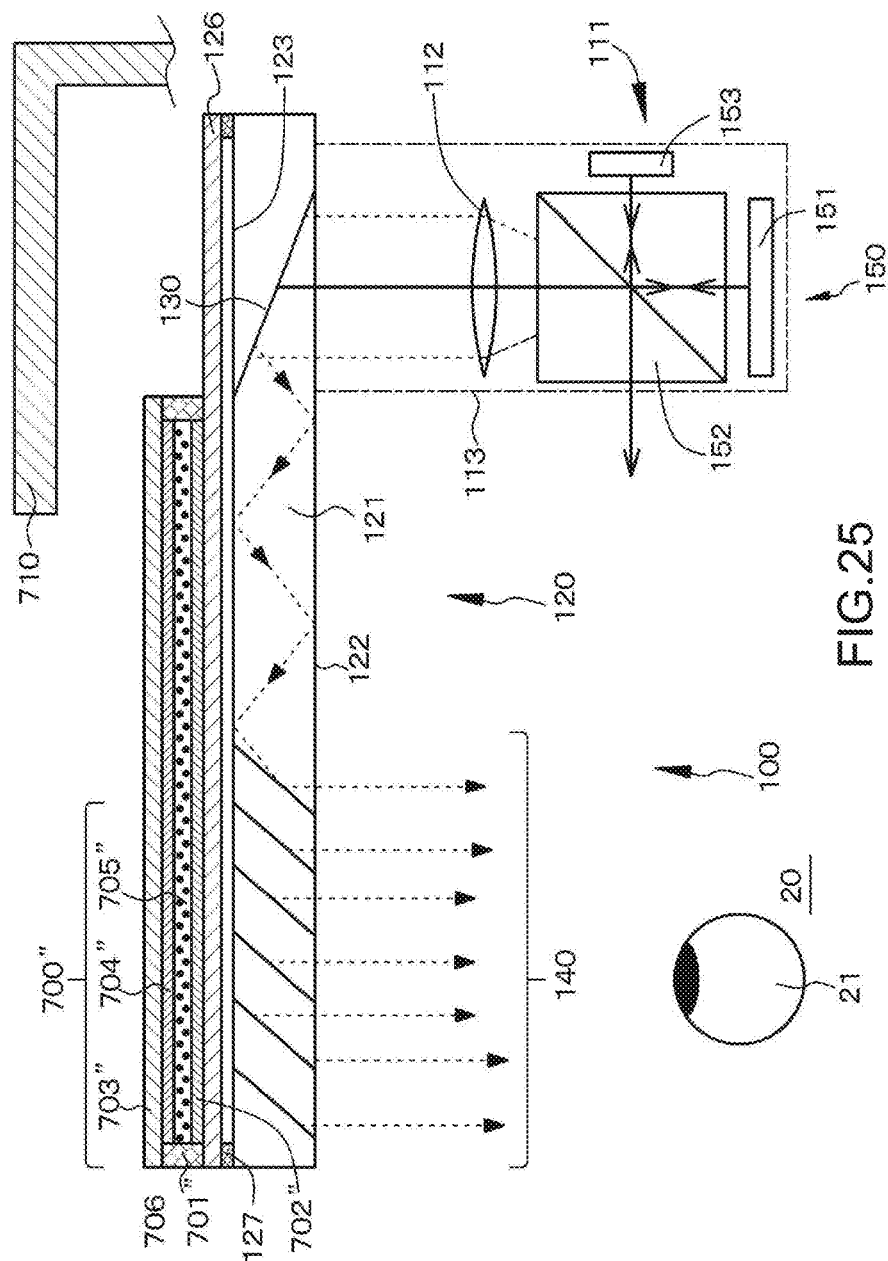
FIG. 25 is a conceptual view of an image display device
in a display apparatus in Example 13.

On the other hand, as shown in a conceptual view of FIG. 24, in a dimmer unit 700' in a display apparatus in Example 12, a light-transmission control material layer 705' is an optical shutter being an inorganic EL material layer. Herein, the inorganic EL material layer is made of tungstic oxide ($WO_3$). Also in the dimmer unit 700', first and second substrates 701' and 703' are each a transparent glass substrate such as soda lime glass or super white glass, and the second substrate 703' is made thinner than the first substrate 701'. Specifically, the second substrate 703' is formed with the thickness of 0.2 mm, and the first substrate 701' is formed with the thickness of 0.4 mm. Other than that, the display apparatus in Example 12 is in the same structure and configuration as the display apparatuses in Examples 6 to 12, and thus is not described in detail again. Herein, the first substrate 701' in the dimmer unit 700' is attached with the protection member 126 using the adhesive 707 similarly to Example 9.

Example 13

Example 13 is a modification of Examples 6 to 12, and is about the display apparatus in the first embodiment. As shown in a conceptual view of FIG. 25, in a display apparatus in Example 13, a dimmer unit 700" includes first and second substrates 701" and 703", the first substrate 701" opposing the light guide unit 120, the second substrate 703" opposing the first substrate 701", electrodes 702" and 704" respectively provided to the first and second substrates 701" and 703", and a light-transmission control material layer 705" sealed between the first and second substrates 701" and 703". The first substrate 701" serves also as the component (specifically the protection member 126) in the light guide unit 120. That is, the first substrate 701" and the protection member 126 are the one specific member, and are for shared use.

As described above, in Example 13, the first substrate 701" in the dimmer unit 700" serves also as the component (the protection member 126) in the light guide unit 120. This reduces the entire weight of the display apparatus so that this does not cause discomfort to a user of the display apparatus.

Other than that, the display apparatus in Example 13 is in the same structure and configuration as the display apparatuses in Examples 6 to 12, and thus is not described in detail again. Moreover, the light shielding member in the display apparatus in Example 13 is in the same structure and configuration as the dimmer unit in the display apparatuses in Examples 6 to 11, and thus is not described again.

Example 14

Figure 26:
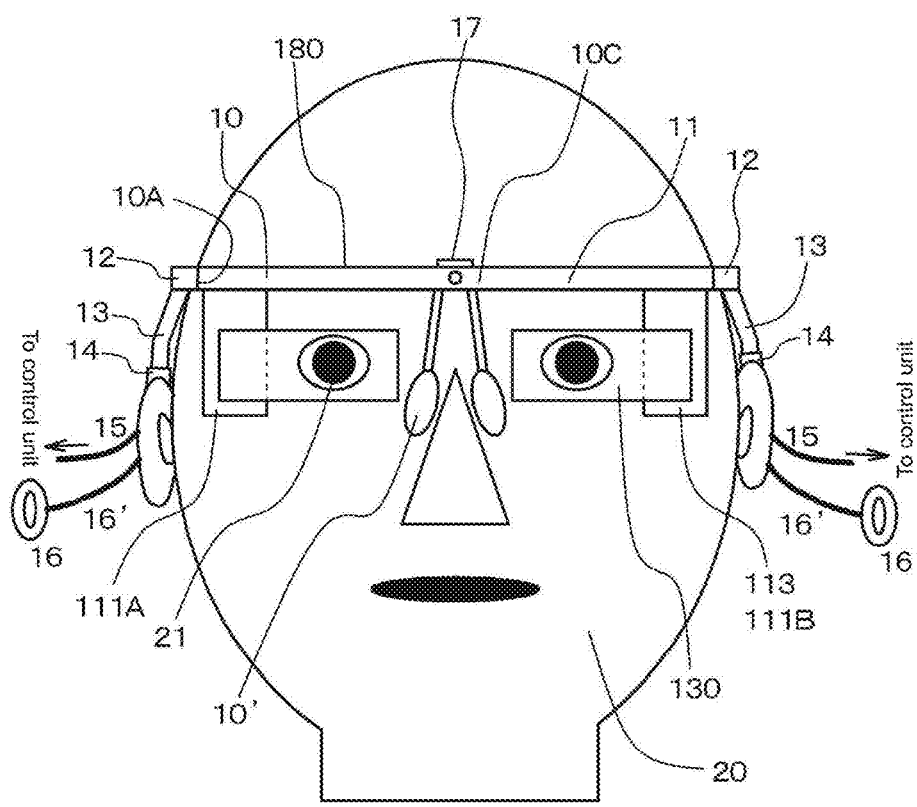
FIG. 26 is a schematic front view of a display apparatus
in Example 14.
Figure 27:
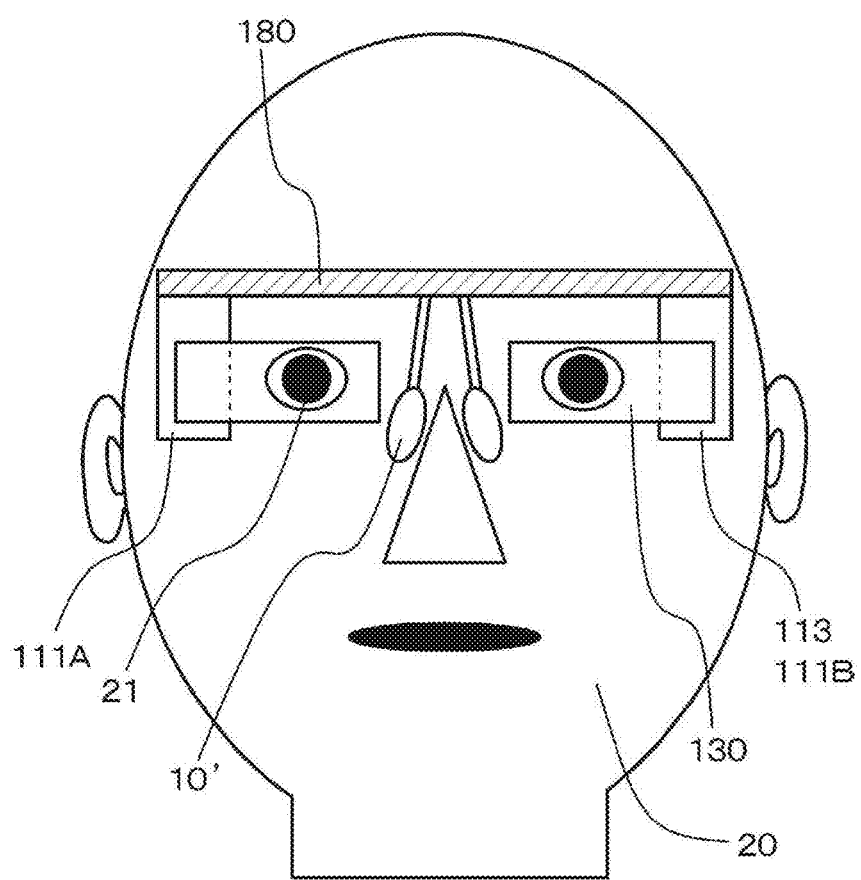
FIG. 27 is another schematic front view of the display
apparatus in Example 14, i.e., the display apparatus with no
frame.
Figure 28:
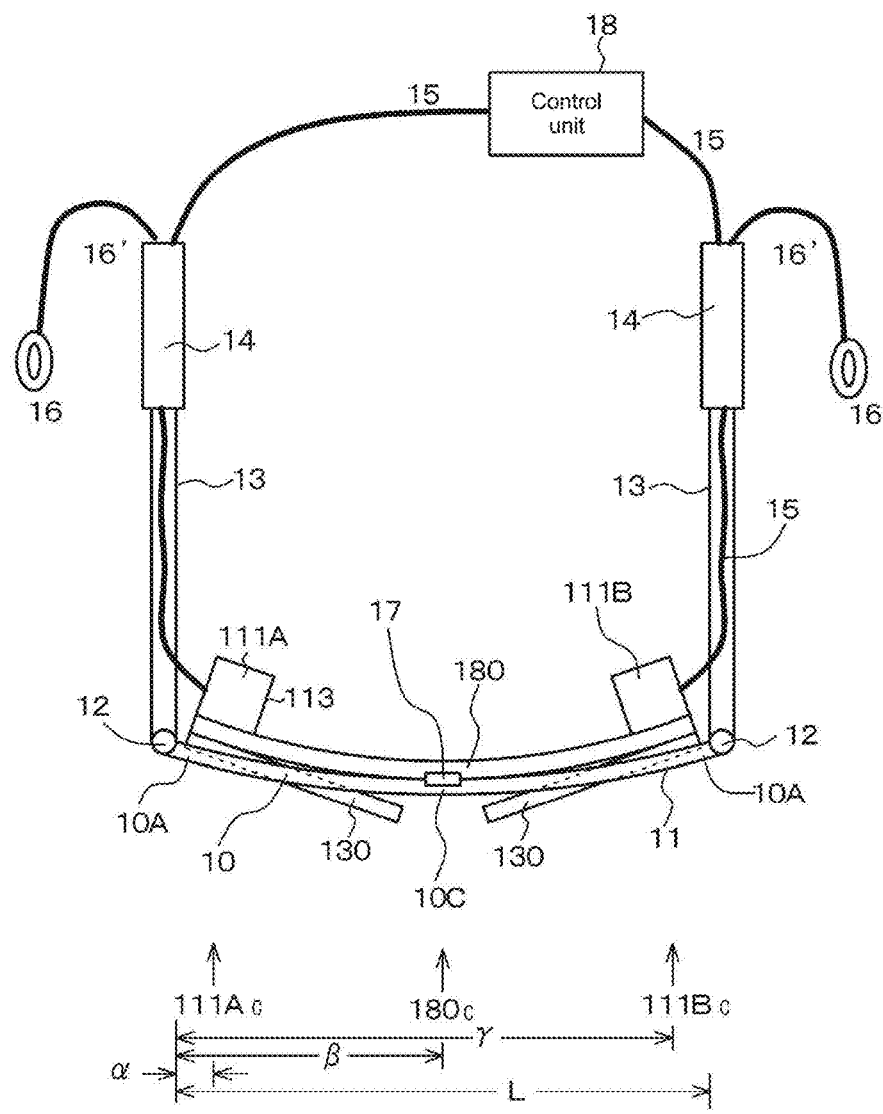
FIG. 28 is a schematic top view of the display apparatus
in Example 14.
Figure 29:
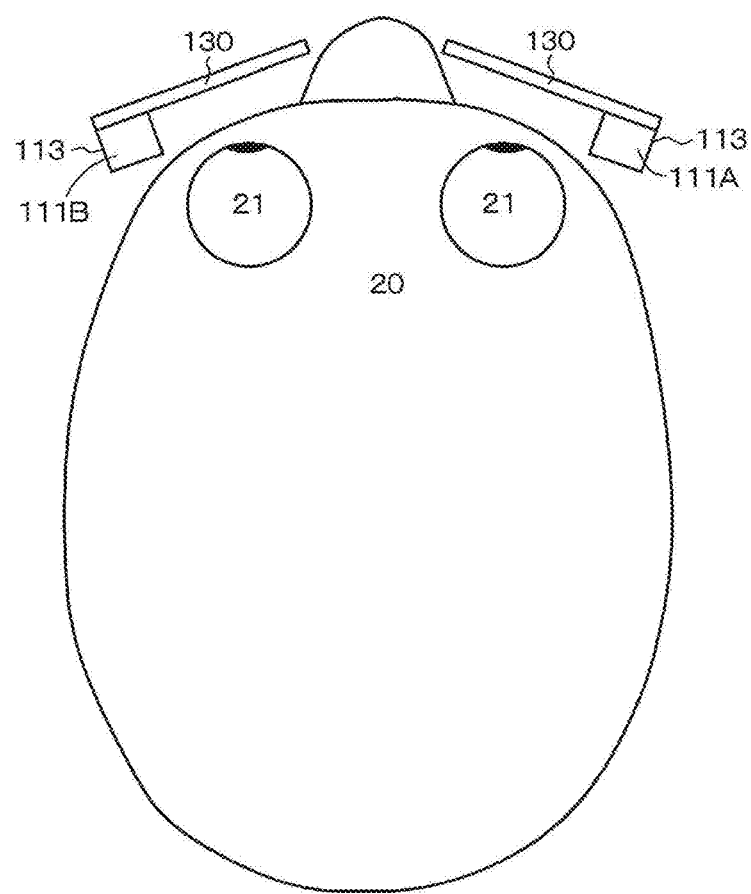
FIG. 29 is a top view of the display apparatus in Example
14 when the apparatus is mounted on a viewer's head
portion (only an image display device is shown, and no
frame is shown)

Example 14 is a modification of Examples 1 to 13. FIG. 26 is a schematic front view of a head mounted display in Example 14, and FIG. 27 is another schematic front view of the head mounted display in Example 14, i.e., the head mounted display with no frame. FIG. 28 is a schematic top view of the head mounted display in Example 14, and FIG. 29 is a top view of the head mounted display in Example 14 when the display is mounted on the head portion of the viewer 20. For convenience, FIG. 29 shows only the image display device, and no frame is shown. In the description below, the image display device 100 is mainly described, but the image display devices 200, 300, and 400 are surely also applicable. In Examples 14 and 15, the support members 161, 171, and 177 (and the dimmer unit 700 in some cases) are not shown.

The head mounted display in Example 14 is further provided with a coupling member 180 to couple together the two image display devices 100. The coupling member 180 is attached to a center portion 10C of the frame 10 on the side facing the viewer, i.e., between the viewer 20 and the frame 10, by using a screw (not shown), for example. The frame 10 is positioned between the two eyes 21 of the viewer 20. The projection image of the coupling member 180 is in the projection image of the frame 10. That is, when the head mounted display is viewed from the front of the viewer 20, the coupling member 180 is not visible as is hidden behind the frame 10. In the state that the coupling member 180 couples together the two image forming units 100, specifically, the image forming units 111A and 111B are each housed in the chassis 113, and at each end portion of the coupling member 180, the chassis 113 is attached to be adjustable. The image forming units 111A and 111B are positioned outside of the eyes 21 of the viewer 20. To be specific, such a configuration satisfies $\alpha = 0.1 \times L$ $\beta = 0.5 \times L$ $\gamma = 0.9 \times L$ where $\alpha$ denotes a distance from the attachment center 111$A_C$ for one of the image forming units 111A to one end portion (one endpiece) 10A of the frame 10, $\beta$ denotes a distance from the center 180$_C$ of the coupling member 180 to the one end portion (the one endpiece) 10A of the frame 10, $\gamma$ denotes a distance from the attachment center 111$B_C$ for the remaining image forming unit 111B to the one end portion (the one endpiece) 10A of the frame 10, and L denotes a length of the frame 10.

Figure 31:
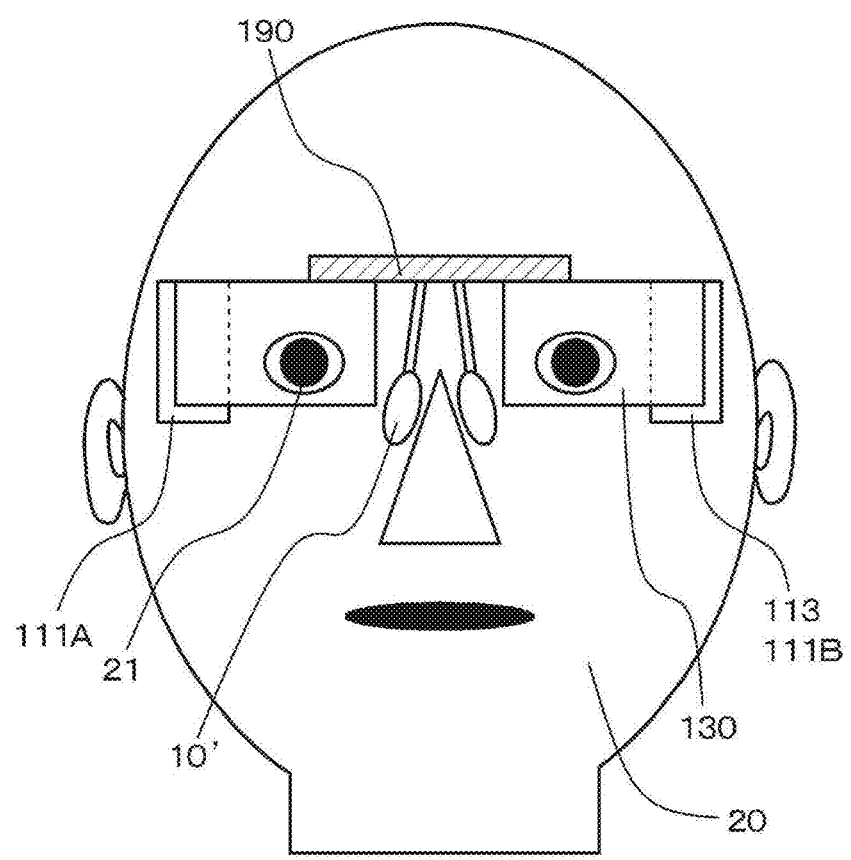
FIG. 31 is another schematic front view of the display
apparatus in Example 15, i.e., the display apparatus with no
frame.
Figure 32:
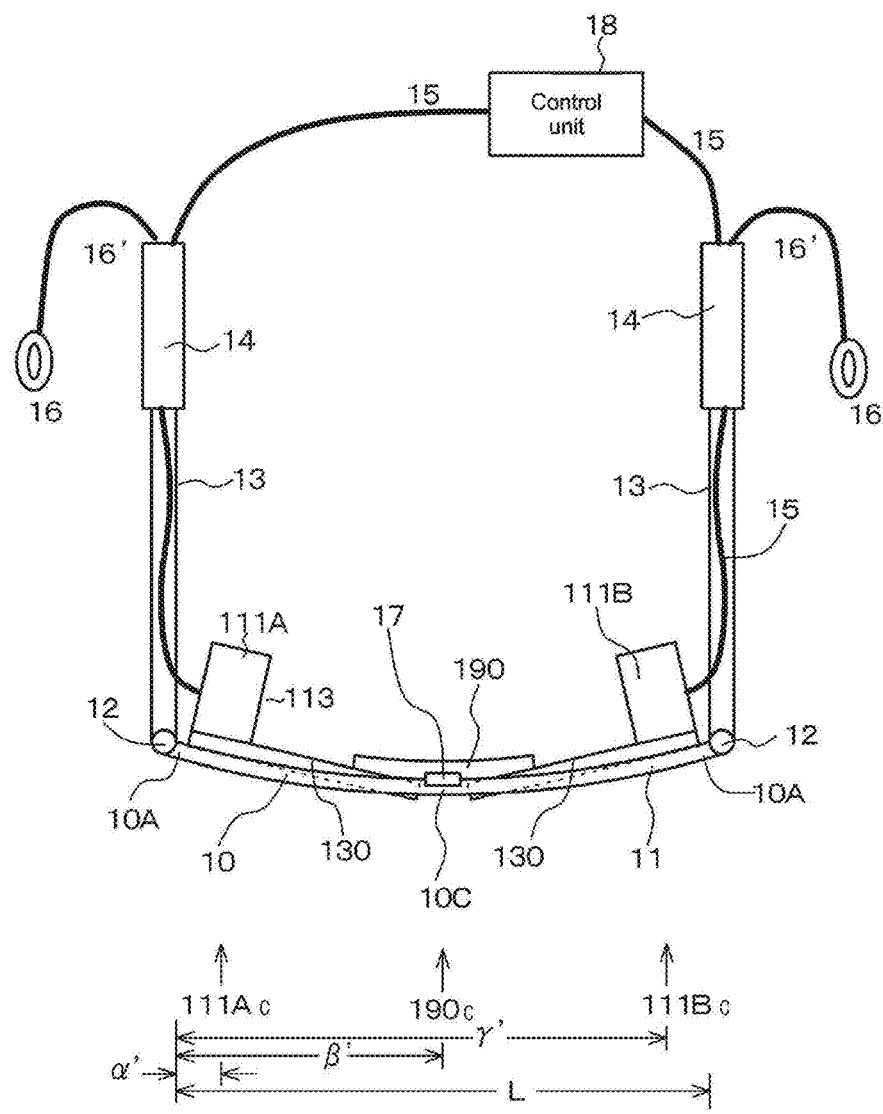
FIG. 32 is a schematic top view of the display apparatus
in Example 15.

For respectively attaching the image forming units (specifically the image forming units 111A and 111B) to the end portions of the coupling member 180, specifically, three through holes (not shown) are formed to each end portion of the coupling member, and tapped-hole sections (screw sections, not shown) corresponding to these through holes are formed to each of the image forming units 111A and 111B. Thereafter, screws (not shown) are fastened into the hole sections formed to the image forming units 111A and 111B through the through holes. Between each of the screws and each of the hole sections, a spring is inserted in advance. Therefore, by controlling the degree of screw fastening, the image forming units may be adjusted in state of attachment, i.e., adjusted in angle with respect to the coupling member. After such attachment, the screws are each hidden using a lid (not shown). In FIGS. 27 and 31, the coupling member 180 and a coupling member 190 are both shaded for explicit indication thereof. The coupling member 180 is attached to the center portion 10C of the frame 10, which is positioned between the two eyes 21 of the viewer 20. This center portion 10C corresponds to a bridge section of ordinary glasses. On the side of the coupling member 180 facing the viewer 20, a nose pad 10' is attached. FIGS. 28 and 32 do not show the nose pad 10'. The frame 10 and the coupling member 180 are each made of metal or plastic, and the coupling member 180 is shaped like a bent rod.

In such a head mounted display (HMD) in Example 14, the coupling member 180 couples together the two image display devices 100, and this coupling member 180 is attached to the center portion 10C of the frame 10 that is positioned between the two eyes 21 of the viewer 20. That is, the image display devices 100 are not directly attached to the frame 10. Therefore, the temple sections 13 are extended outward when the viewer 20 wears the frame 10 on his head portion. As a result, even if the frame 10 is deformed, such deformation of the frame 10 does not cause displacement (position change) of the image forming units 111A and 111B, and even if such displacement occurs, the displacement is negligible. Such a configuration thus prevents a change of convergence angle between right and left images without fail. Further, the configuration eliminates having to increase the rigidity of the front section 11 of the frame 10 so that the frame 10 is not increased in weight, the design ability is not impaired, and the cost is not increased. Still further, with the image display devices 100 not directly attached to the eyeglass-shaped frame 10, the frame 10 may be in various designs and colors to meet the viewer's preferences, and the designing of the frame 10 is less restricted and highly flexible. What is more, the coupling member 180 is hidden behind the frame 10 when the head mounted display is viewed from the front of the viewer. This offers the head mounted display with sophistication and refinement of design.

Example 15

Figure 30:
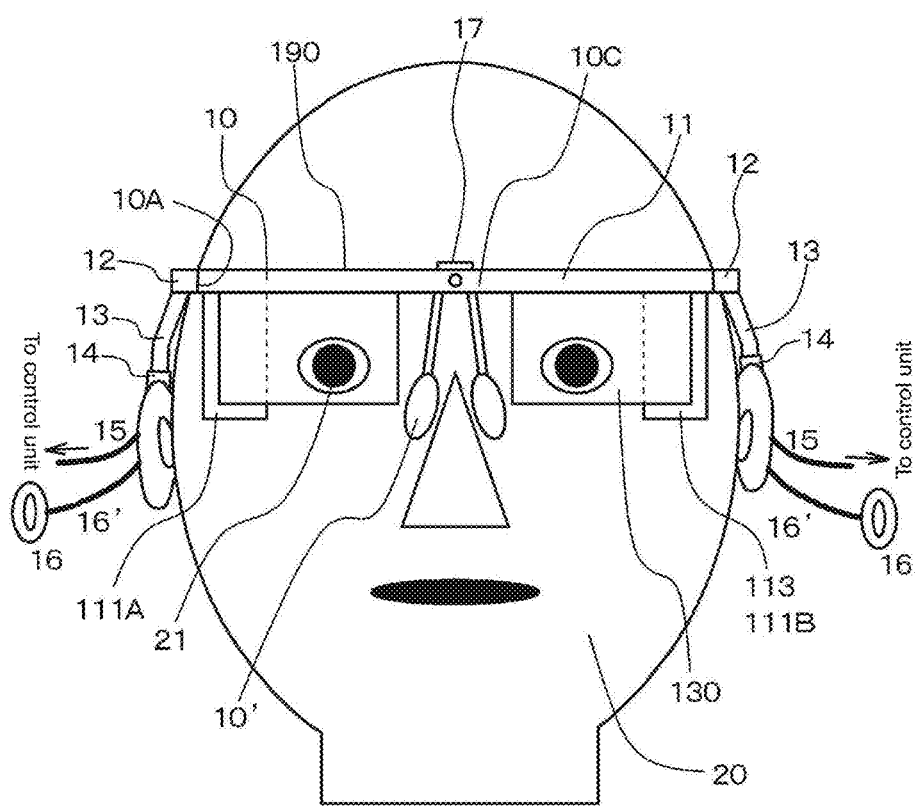
FIG. 30 is a schematic front view of a display apparatus
in Example 15.

Example 15 is a modification of Example 14. FIG. 30 is a schematic front view of a head mounted display in Example 15, and FIG. 31 is another schematic front view of the display apparatus in Example 15, i.e., the head mounted display with no frame. FIG. 32 is a schematic top view of the head mounted display in Example 15.

In the head mounted display in Example 15, unlike in Example 14, the rod-like coupling member 190 does not couple the two image forming units 111A and 111B but the two light guide units 120. Alternatively, the two light guide units 120 may be integrally manufactured, and the resulting integrally-manufactured light guide unit 120 may be provided with the coupling member 190.

Also in the head mounted display in Example 15, using a screw, for example, the coupling member 190 is attached to the center portion 10C of the frame 10 positioned between the two eyes 21 of the viewer 20. The image forming units 111 are positioned outside of the eyes 21 of the viewer 20. The image forming units 111 are each attached to the end portion of the light guide unit 120. When a distance from the center 190$_C$ of the coupling member 190 to an end portion of the frame 10 is β, and when the length of the frame 10 is L, β=0.5×L is satisfied. Note that values of α' and γ' in Example 15 are the same as those of α and γ in Example 14.

In Example 15, the frame 10 and the image display devices are in the same structure and configuration as the frame 10 and the image display devices described in Example 14, and thus are not described in detail again. The head mounted display in Example 15 is also substantially in the same structure and configuration as the head mounted display in Example 14 except for the above-mentioned difference, and thus is not described in detail again.

While the present disclosure has been described with Examples in detail, the foregoing description of Examples is in all aspects illustrative and not restrictive. The display apparatuses (head mounted displays) and the image display devices in Examples are by way of example, and numerous other modifications and variations can be devised therefor. As an example, the light guide plate may be provided with a surface relief hologram (refer to United States Patent No. 20040062505A1). In the light guide unit, the diffraction grating element may be a transmissive diffraction grating element, or the first or second deflection section may be a reflective diffraction grating element, and the remaining may be a transmissive diffraction grating element. Alternatively, the diffraction grating element may be a reflective blazed diffraction grating element. In the display apparatuses in Examples 9 and 10, and 12 and 13, in some cases, the dimmer unit is not used but only the light shielding member may be provided. The light guide unit, the image display device, and the display apparatus in the first embodiment of the present disclosure may be combined with those in the second embodiment of the present disclosure.

In Examples, the image forming unit 111 or 211 is described to offer image display in a color, e.g., green. The image forming unit 111 or 211 may offer color image display. In this case, the light source may be so configured as to emit light in red, green, and blue, for example. To be specific, the light emitted from red, green, and blue light-emitting elements, i.e., red, green, and blue light, may be mixed and made uniform in luminance using a light bulb to obtain white light.

The dimmer unit may be detachably provided in an area from which the light guide unit emits light. For detachably providing the dimmer unit, the dimmer unit may be attached to the light guide unit using a screw made of transparent plastic, for example. The dimmer unit may be then connected to a control circuit via connectors and wiring lines. This control circuit is for controlling the light transmittance of the dimmer unit, and is provided in the control unit 18 that controls the image forming unit, for example.

In some cases, an optical shutter for use may be configured by application of electrodeposition/dissociation that occurs in response to the reversible oxidation reduction of metal, e.g., silver particles. Specifically, $Ag^+$ (silver) and $I^-$ (iodine) are dissolved in advance in an organic solvent, and Ag is precipitated by reduction of $Ag^+$ through appropriate voltage application to electrodes so that the dimmer unit is reduced in light transmittance. In other cases, an optical shutter for use may be configured by utilizing color change of substance that occurs in response to the oxidation reduction of an electrochromic material. To be specific, first and second electrodes are provided, and first and second electrochromic material layers are sandwiched between the first and second electrodes. The first electrochromic material layer is configured by a prussian blue metal complex, and the second electrochromic material layer is configured by a nickel-substituted prussian blue metal complex. In other cases, an optical shutter for use may be configured by controlling the light transmittance by electrowetting. To be specific, first and second electrodes are provided, and an insulating first liquid and a conductive second liquid are filled between the first and second electrodes. By voltage application between the first and second electrodes, the interface between the first and second liquids is changed in shape, e.g., from being flat to being bent, thereby controlling the light transmittance.

As the image forming unit or the light source configured by light-emitting elements and a light bulb, the following is also possible other than the combination of a backlight emitting white light as a whole and a liquid crystal display including red, green, and blue light-emitting pixels, for example.

Figure 33:
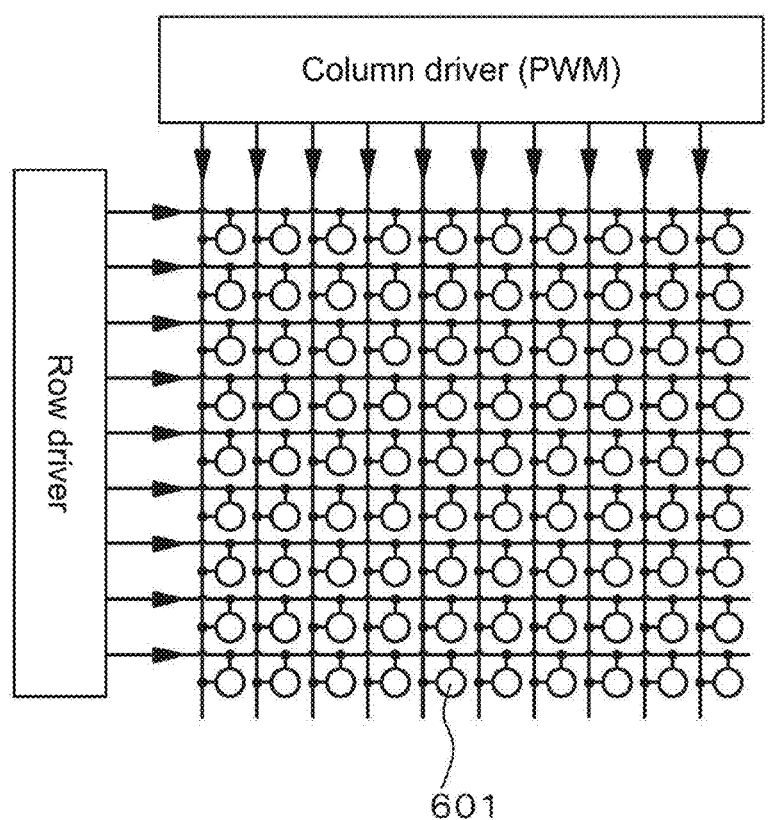
FIG. 33 is a conceptual view of an image forming unit.

As a modification example of the image forming unit, an active-matrix image forming unit is also possible as in a conceptual view of FIG. 33, for example, i.e., the unit includes a light-emitting panel in which light-emitting elements 601 being semiconductor laser elements are arranged in a 2D matrix, and the light-emitting elements 601 are each controlled to emit/not to emit light. Such control allows direct perception of light emission in the light-emitting elements 601, thereby images are displayed. The light emitted from this image forming unit is directed into the light guide plate 121 via the collimator optical system 112. Also in the below, the light-emitting elements are semiconductor laser elements.

Figure 34:
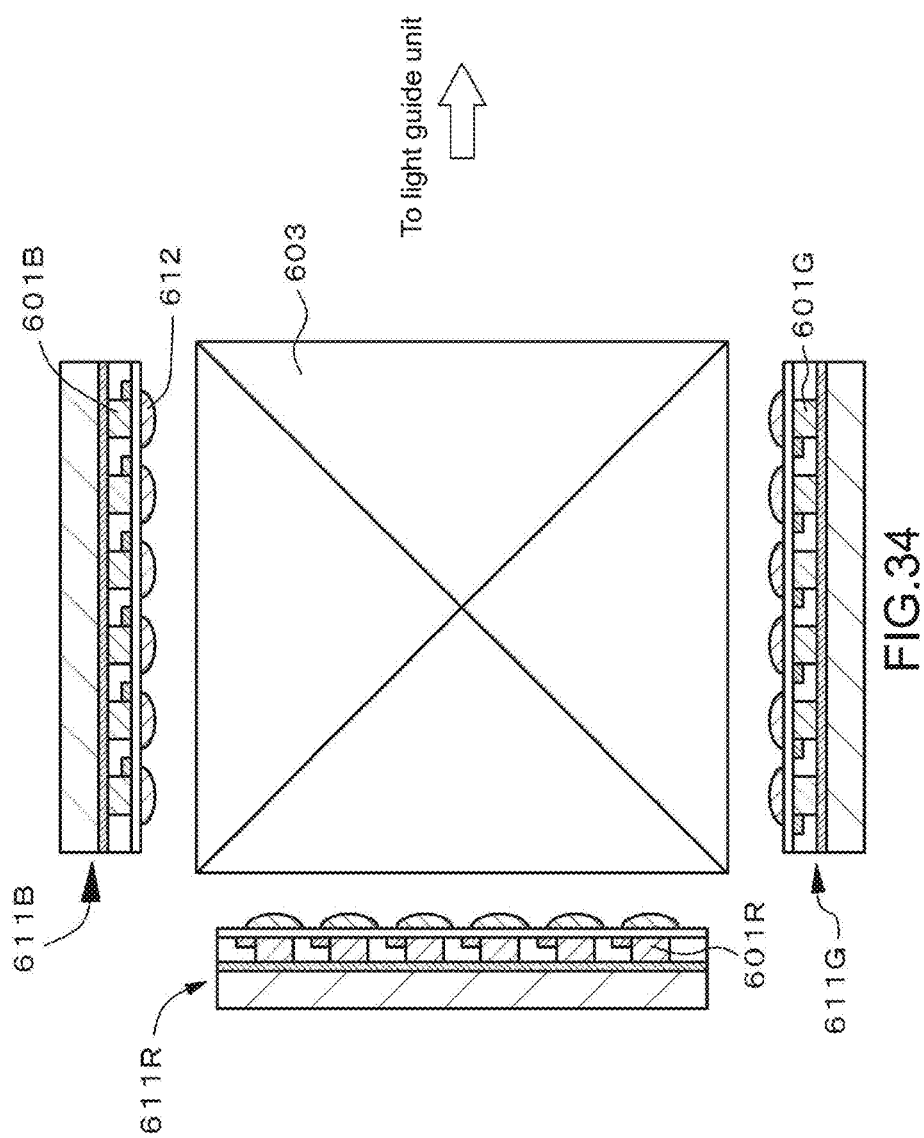
FIG. 34 is a conceptual view of a modification of the
image forming unit.

A color-display image forming unit in a conceptual view of FIG. 34 is also possible. This image forming unit includes α. a red light-emitting panel 611R in which red light-emitting elements 601R are arranged in a 2D matrix, the red light-emitting elements emitting red light, β. a green light-emitting panel 611G in which green light-emitting elements 601G are arranged in a 2D matrix, the green light-emitting elements emitting green light, γ. a blue light-emitting panel 611B in which blue light-emitting elements 601B are arranged in a 2D matrix, the blue light-emitting elements emitting blue light, and δ. a section configured to collectively direct the light emitted from the red, green, and blue light-emitting panels 611R, 611G, and 611B to a single optical path, e.g., dichroic prism 603.

This color-display image forming unit controls light-emission/no light-emission of the red, green, and blue light-emitting elements 601R, 601G, and 601B. The light emitted from this image forming unit is also directed into the light guide plate 121 via the collimator optical system 112.

Herein, a reference numeral 612 denotes a micro lens for gathering the light coming from the light-emitting elements.

Figure 35:
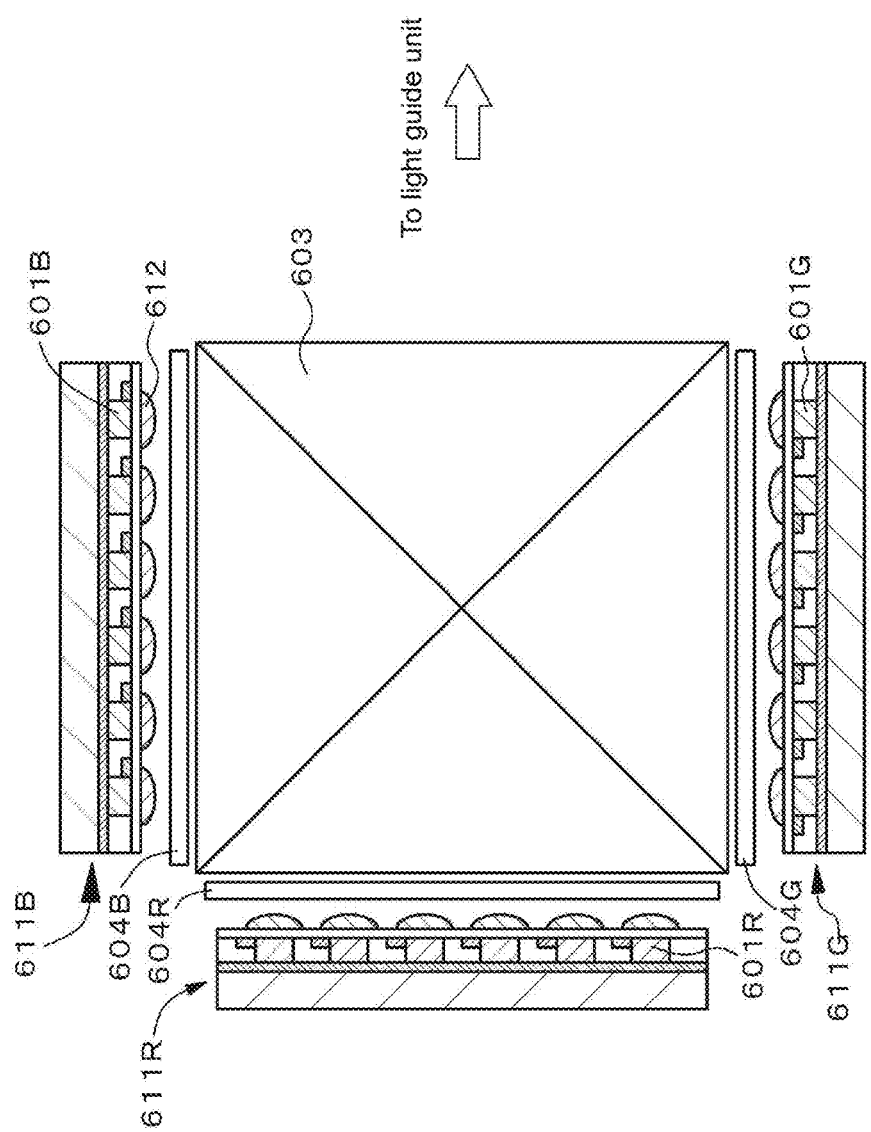
FIG. 35 is a conceptual view of another modification of
the image forming unit.

FIG. 35 is a conceptual view of an image forming unit configured by the light-emitting panels 611R, 611G, 611B, and others in which the light-emitting elements 601R, 601G, and 601B are each arranged in a 2D matrix. The light emitted from the light-emitting panels 611R, 611G, 611B is controlled by light-pass control units 604R, 604G, and 604B in terms of light-pass/no light-pass. The light then enters the dichroic prism 603, is collectively directed to a single optical path, and is then directed into the light guide plate 121 via the collimator optical system 112.

Figure 36:
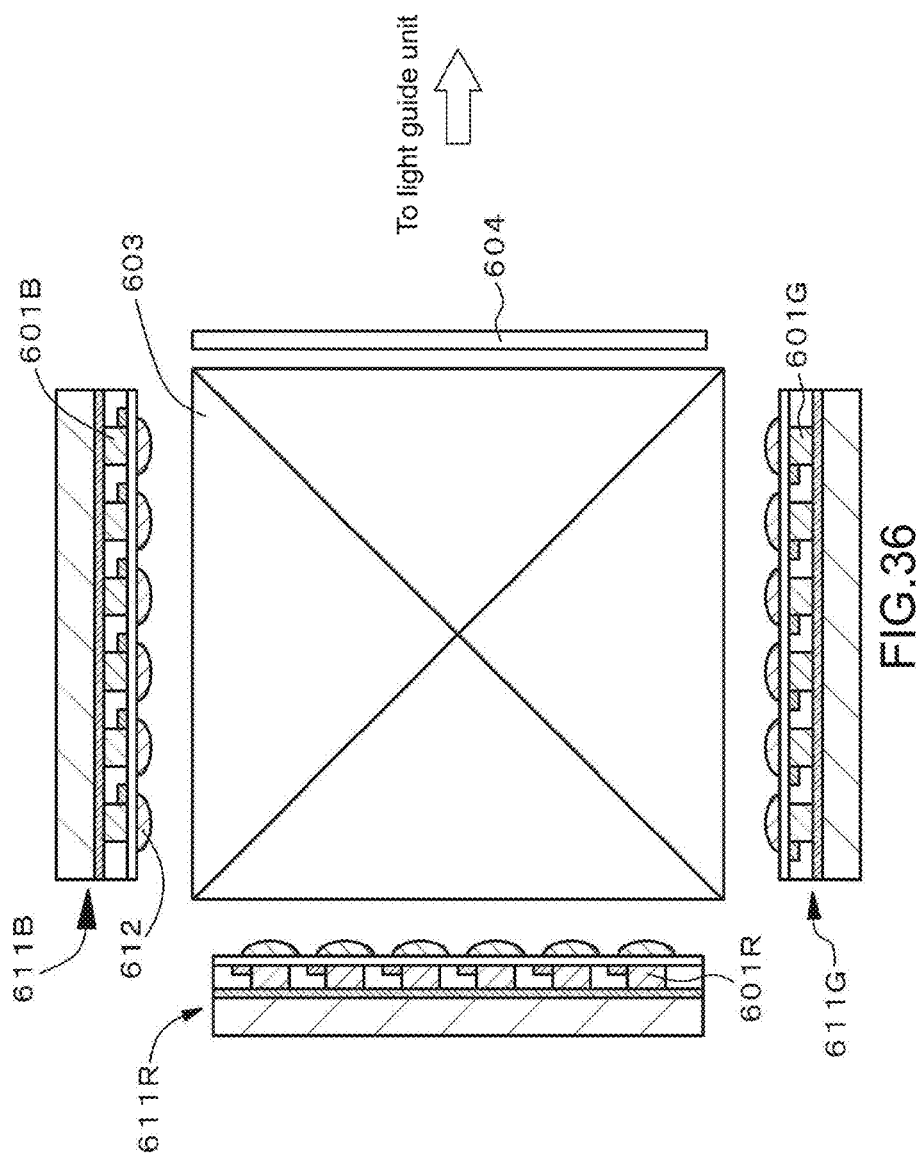
FIG. 36 is a conceptual view of still another modification
of the image forming unit.

FIG. 36 is a conceptual view of the image forming unit configured by the light-emitting panels 611R, 611G, 611B, and others in which the light-emitting elements 601R, 601G, and 601B are each arranged in a 2D matrix. The light emitted from the light-emitting panels 611R, 611G, 611B enters the dichroic prism 603, and is collectively directed to a single optical path. The light from the dichroic prism 603 is then controlled by the light-pass control units 604 in terms of light-pass/no light-pass, and is directed into the light guide plate 121 via the collimator optical system 112.

Figure 37:
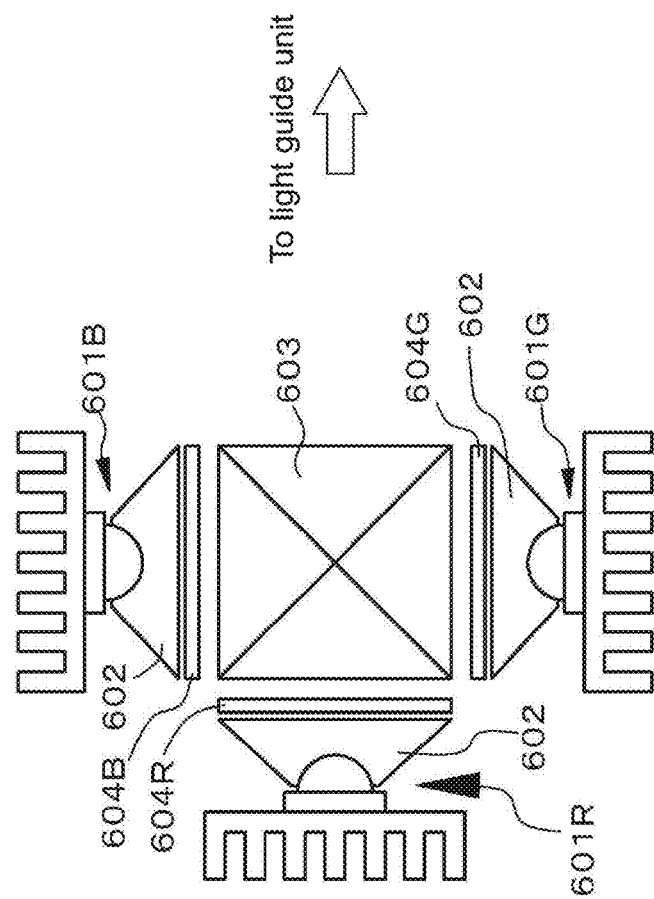
FIG. 37 is a conceptual view of still another modification
of the image forming unit.
Figure 38:
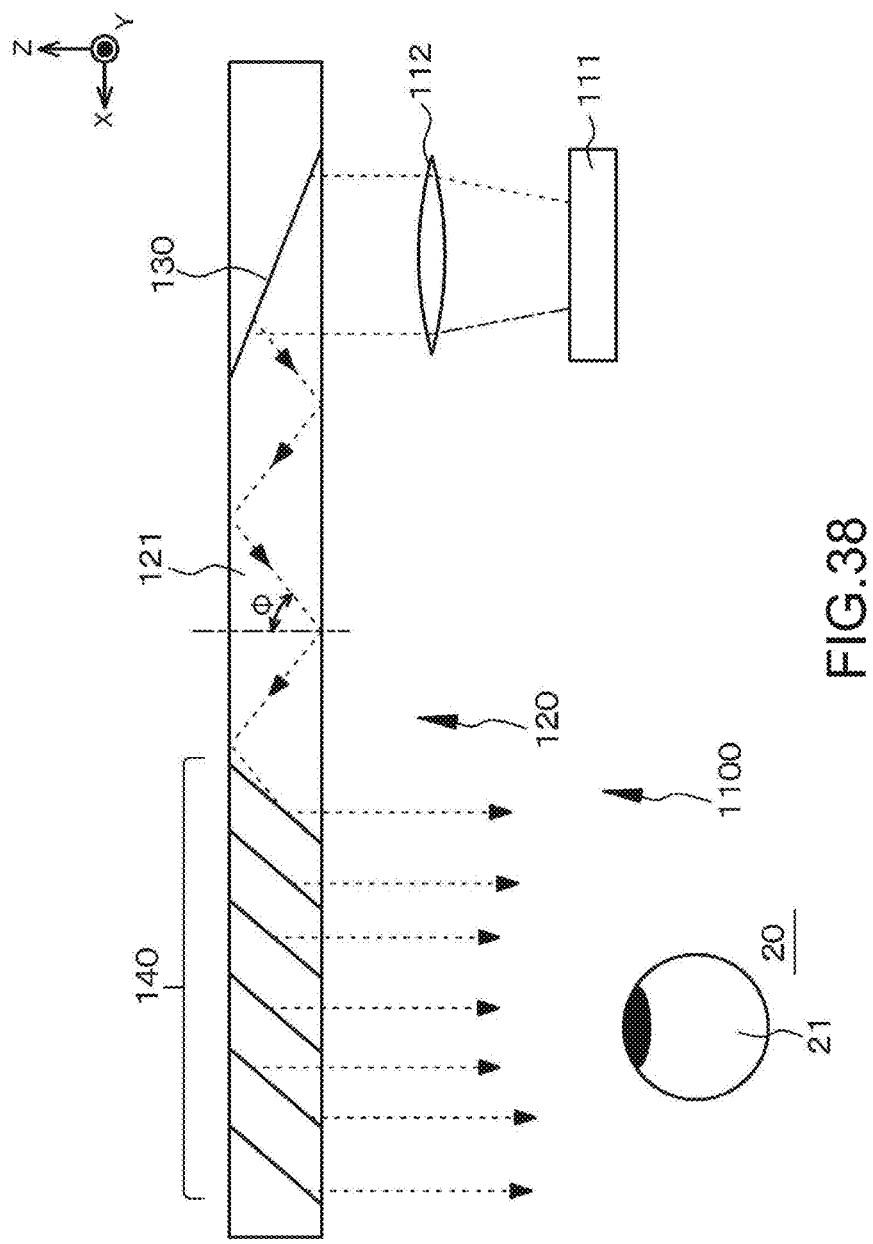
FIG. 38 is a conceptual view of a previous image display
device.
Figure 39:
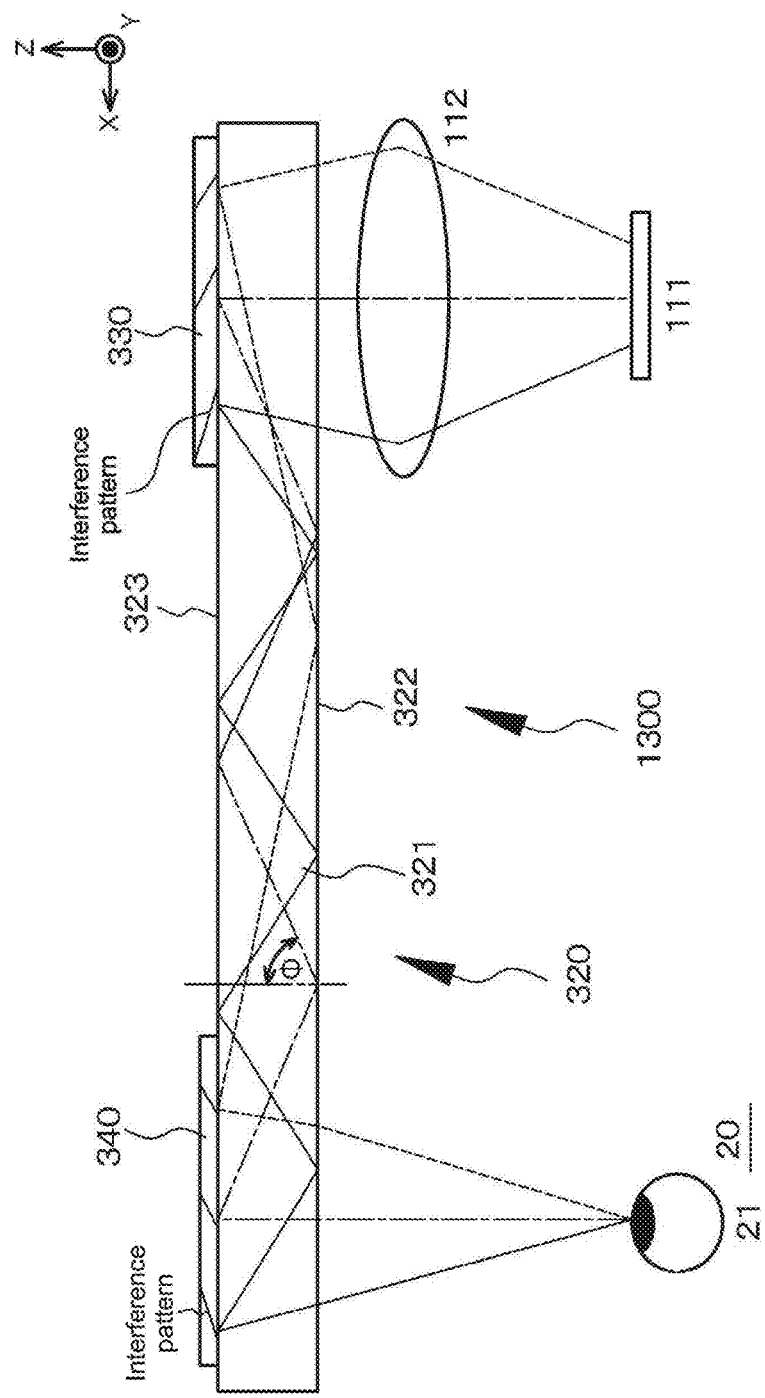
FIG. 39 is a conceptual view of another previous image
display device in a different configuration from the image
display device of FIG. 38.

An image forming unit of FIG. 37 is also possible. This image forming unit includes the light-emitting elements 601R emitting red light, a light-pass control unit being a light bulb for controlling light-pass/no light-pass of the light emitted from the red light-emitting elements 601R, e.g., liquid crystal display 604R, the light-emitting elements 601G emitting green light, a light-pass control unit being a light bulb for controlling light-pass/no light-pass of the light emitted from the green light-emitting elements 601G, e.g., liquid crystal display 604G, the light-emitting elements 601B emitting blue light, and a light-pass control unit being a light bulb for controlling light-pass/no light-pass of the light emitted from the blue light-emitting elements 601B, e.g., liquid crystal display 604B. The image forming unit also includes a light directing member 602 configured to guide the light emitted from the light-emitting elements 601R, 601G, and 601B, and a section configured to collectively direct the light to a single optical path, e.g., dichroic prism 603. The light emitted from the dichroic prism 603 is directed into the light guide plate 121 via the collimator optical system 112.

The present disclosure may be also in the following structures.

[A01] [Image Display Device: First Embodiment]
An image display device, comprising:
an image forming unit; and
a light guide unit, the light guide unit including
a light guide plate configured to guide light of an image formed in the image forming unit, and
a support member,
the light guide plate being supported by one or more buffer members at, at least, a plurality of portions of the support member.

[A02] The image display device according to [A01], wherein:
the one or more buffer members comprise a first buffer member and a second buffer member separate from the first buffer member.

[A03] The image display device according to [A02], wherein:
the light guide plate is supported by the first buffer member at a first portion of the support member, and
the light guide plate is supported by the second buffer member at a second portion of the support member, the first and second portions being opposed to each other with the light guide plate being sandwiched therebetween.

[A04] The image display device according to [A01], wherein:
the one or more buffer members comprise a continuous buffer member adapted to be in contact with an outer circumferential portion of at least two sides of the light guide plate.

[A05] The image display device according to any one of [A01] to [A04], wherein:
an elastic modulus of the buffer member is smaller than an elastic modulus of the light guide plate.

[A06] The image display device according to any one of [A01] to [A05], wherein:
the buffer member is made of resin.

[A07] The image display device according to any one of [A01] to [A06], wherein:
the light guide plate includes four sides; and
the support member is shaped to be around the light guide plate on four sides.

[A08] The image display device according to any one of [A01] to [A07], wherein:
the light guide plate is rectangular.

[A09] The image display device according to any one of [A01] to [A08], wherein:
the support member is shaped like a picture frame to be around the light guide plate.

[A10] The image display device according to any one of [A01] to [A09], further comprising a dimmer unit.

[A11] The image display device according to [A04], wherein:
the continuous buffer member is adapted to be entirely in contact with an outer circumferential portion.

[B01] [Image Display Device: Second Embodiment]
An image display device, comprising:
an image forming unit; and
a light guide unit, the light guide unit including
a light guide plate configured to guide light of an image formed in the image forming unit, and
a support member,
the light guide plate and the support member including therebetween a fixing member, the fixing member being provided around the light guide plate to fix the light guide plate to the support member.

[B02] The image display device according to [B01], wherein:
the fixing member is provided with a buffer area.

[B03] The image display device according to [B01] or [B02], wherein:
the fixing member comprises a spring.

[B04] The image display device according to any one of [B01] to [B03], wherein:
the fixing member comprises an adhesive layer.

[B05] The image display device according to [B04], wherein:
the adhesive layer is formed with a notch section.

[B06] The image display device according to any one of [B01] to [B05], wherein:
the light guide plate is provided with a buffer area on an outer circumferential section.

[B07] The image display device according to any one of [B01] to [B06], wherein:
the support member is provided with a buffer area on an inner circumferential section.

[B08] The image display device according to [B06] or [B07], wherein:
the buffer area is provided with a notch section.

[B09] The image display device according to any one of [B01] to [B08], further comprising a dimmer unit.

[C01] [Light Guide Unit: First Embodiment]
A light guide unit, comprising:
a light guide plate; and
a support member,
the light guide plate being supported by one or more buffer members, the one or more buffer members supporting the light guide plate at, at least, a plurality of portions of the support member.

[C02] The light guide unit according to [C01], wherein:
the one or more buffer members comprise a first buffer member and a second buffer member separate from the first buffer member.

[C03] The light guide unit according to [C02] wherein:
the light guide plate is supported by the first buffer member at a first portion of the support member, and
the light guide plate is supported by the second buffer member at a second portion of the support member, the first and second portions being opposed to each other with the light guide plate being sandwiched therebetween.

[C04] The light guide unit according to [C01] wherein:
the one or more buffer members comprise a continuous buffer member adapted to be in contact with an outer circumferential portion of at least two sides of the light guide plate.

[C05] The light guide unit according to any one of [C01] to [C04] wherein:
an elastic modulus of the buffer member is smaller than an elastic modulus of the light guide plate.

[C06] The light guide unit according to any one of [C01] to [C05] wherein:
the buffer member is made of resin.

[C07] The light guide unit according to any one of [C01] to [C03] wherein:
the light guide plate includes four sides; and
the support member is shaped to be around the light guide plate on four sides.

[C08] The light guide unit according to any one of [C01] to [C07] wherein:
the light guide plate is rectangular.

[C09] The light guide unit according to any one of [C01] to [C08] wherein:
the support member is shaped like a picture frame to be around the light guide plate.

[C10] The light guide unit according to any one of [C01] to [C09], further including a dimmer unit.

[C11] The light guide unit according to [C04], wherein:
the continuous buffer member is adapted to be entirely in contact with an outer circumferential portion.

[D01] [Light Guide Unit: Second Embodiment]
A light guide unit, comprising:
a light guide plate; and
a support member,
the light guide plate and the support member including therebetween a fixing member, the fixing member being provided around the light guide plate to fix the light guide plate to the support member.

[D02] The light guide unit according to [D01], wherein:
the fixing member is provided with a buffer area.

[D03] The light guide unit according to [D01] or [D02], wherein:
the fixing member comprises a spring.

[D04] The light guide unit according to any one of [D01] to [D03], wherein:
the fixing member comprises an adhesive layer.

[D05] The light guide unit according to [D04], wherein:
the adhesive layer is formed with a notch section.

[D06] The light guide unit according to any one of [D01] to [D05], wherein:
the light guide plate is provided with a buffer area on an outer circumferential section.

[D07] The light guide unit according to any one of [D01] to [D06], wherein:
the support member is provided with a buffer area on an inner circumferential section.

[D08] The light guide unit according to [D06] or [D07], wherein:
the buffer area is provided with a notch section.

[D09] The light guide unit according to any one of [D01] to [D08], further including a dimmer unit.

[E01] [Display Apparatus: First Embodiment]
A display apparatus, comprising:
a frame; and
an image display device attached to the frame,
the image display device including
an image forming unit, and
a light guide unit,
the light guide unit including
a light guide plate configured to guide light of an image formed in the image forming unit, and
a support member,
the light guide plate being supported by one or more buffer members, the one or more buffer members supporting the light guide plate at, at least, a plurality of portions of the support member.

[E02] [Display Apparatus: Second Embodiment]
A display apparatus, comprising:
a frame; and
an image display device attached to the frame,
the image display device including
an image forming unit, and
a light guide unit,
the light guide unit including
a light guide plate configured to guide light of an image formed in the image forming unit, and
a support member,
the light guide plate and the support member including therebetween a fixing member, the fixing member being provided around the light guide plate to fix the light guide plate to the support member.

[E03] A display apparatus, including
a frame configured to be mounted on a viewer's head portion; and
an image display device attached to the frame,
the image display device including
an image forming unit, and
a light guide unit,
the display apparatus including the light guide unit according to any one of [C01] to [C11] and [D01] to [D09].

[E04] The display apparatus according to any one of [E01] to [E03], wherein the frame is configured to be mounted on a viewer's head portion.

It should be understood by those skilled in the art that various modifications, combinations, sub-combinations and alterations may occur depending on design requirements and other factors insofar as they are within the scope of the appended claims or the equivalents thereof.

What is claimed is:
1. An image display device, comprising:
an image forming unit; and
a light guide unit, the light guide unit including:

a unitary light guide plate configured to guide light of an image formed in the image forming unit, wherein the unitary light guide plate has a thickness along a Z axis and a length along an X axis, and wherein the unitary light guide plate is configured to guide the light along the X axis;

a support member; and one or more buffer members supporting the unitary light guide plate at, at least, a plurality of locations of the support member, wherein:

the unitary light guide plate has a first elastic modulus;

at least one buffer member of the one or more buffer members has a second elastic modulus selected to reduce image quality degradation caused by expansion or contraction of the unitary light guide plate, the second elastic modulus of the at least one buffer member being smaller than the first elastic modulus of the unitary light guide plate;

the unitary light guide plate is attached to the support member at a first location of the support member via the at least one buffer member; and the unitary light guide plate is further attached to the support member at a second location of the support member via the at least one buffer member, the first and second locations being at opposite ends of the unitary light guide plate along the X axis.

2. The image display device according to claim 1, wherein:

the at least one buffer member having the second elastic modulus comprises a first buffer member and a second buffer member separate from the first buffer member;

the unitary light guide plate is attached to the support member at the first location of the support member via the first buffer member; and the unitary light guide plate is attached to the support member at the second location of the support member via the second buffer member.

3. The image display device according to claim 1, wherein:

the at least one buffer member having the second elastic modulus comprises a continuous buffer member adapted to be in contact with an outer circumferential portion of at least two sides of the unitary light guide plate.

4. The image display device according to claim 1, wherein:

the at least one buffer member having the second elastic modulus is made of resin.

5. The image display device according to claim 1, wherein:

the unitary light guide plate includes four sides; and the support member is shaped to be around the unitary light guide plate on four sides.

6. The image display device according to claim 5, wherein:

the unitary light guide plate is rectangular.

7. The image display device according to claim 1, further comprising a dimmer unit.

8. An image display device, comprising:

an image forming unit; and a light guide unit, the light guide unit including:

a unitary light guide plate configured to guide light of an image formed in the image forming unit, wherein the unitary light guide plate has a thickness along a Z axis and a length along an X axis, and wherein the unitary light guide plate is configured to guide the light along the X axis;

a support member; and a fixing member disposed between the unitary light guide plate and the support member, the fixing member being provided around the unitary light guide plate to fix the unitary light guide plate to the support member, wherein:

the fixing member comprises at least one deformable buffer area adapted to reduce image quality degradation caused by expansion or contraction of the unitary light guide plate;

the unitary light guide plate is fixed to the support member at a first location of the support member via the at least one deformable buffer area; and the unitary light guide plate is further fixed to the support member at a second location of the support member via the at least one deformable buffer area, the first and second locations being at opposite ends of the unitary light guide plate along the X axis.

9. The image display device according to claim 8, wherein:

the deformable buffer area of the fixing member comprises a spring.

10. The image display device according to claim 8, wherein:

the fixing member comprises an adhesive layer.

11. The image display device according to claim 10, wherein:

the deformable buffer area of the fixing member comprises a notch section formed in the adhesive layer.

12. An image display device, comprising:

an image forming unit; and a light guide unit, the light guide unit including:

a light guide plate configured to guide light of an image formed in the image forming unit;

a support member; and a fixing member disposed between the light guide plate and the support member, the fixing member being provided around the light guide plate to fix the light guide plate to the support member, wherein:

the light guide plate comprises a deformable buffer area on an outer circumferential section, the deformable buffer area of the light guide plate being an integral part of the light guide plate but different in construction from a center portion of the light guide plate and being adapted to reduce image quality degradation caused by expansion or contraction of the light guide plate.

13. The image display device according to claim 12, wherein:

the deformable buffer area of the light guide plate comprises a notch section.

14. An image display device, comprising:

an image forming unit; and a light guide unit, the light guide unit including:

a light guide plate configured to guide light of an image formed in the image forming unit;

a support member; and a fixing member disposed between the light guide plate and the support member, the fixing member being provided around the light guide plate to fix the light guide plate to the support member, wherein:

the support member comprises a deformable buffer area on an inner circumferential section, the deformable buffer area being an integral part of the support member and being adapted to reduce image quality degradation caused by expansion or contraction of the light guide plate.

15. The image display device according to claim 14, wherein:
the deformable buffer area of the support member comprises a notch section.

16. A light guide unit, comprising:
a unitary light guide plate having a thickness along a Z axis and a length along an X axis, wherein the unitary light guide plate is configured to guide light along the X axis;
a support member; and
one or more buffer members supporting the unitary light guide plate at, at least, a plurality of locations of the support member, wherein:
the unitary light guide plate has a first elastic modulus;
at least one buffer member of the one or more buffer members has a second elastic modulus selected to reduce image quality degradation caused by expansion or contraction of the unitary light guide plate, the second elastic modulus of the at least one buffer member being smaller than the first elastic modulus of the unitary light guide plate;
the unitary light guide plate is attached to the support member at a first location of the support member via the at least one buffer member; and
the unitary light guide plate is further attached to the support member at a second location of the support member via the at least one buffer member, the first and second locations being at opposite ends of the unitary light guide plate along the X axis.

17. A light guide unit, comprising:
a unitary light guide plate having a thickness along a Z axis and a length along an X axis, wherein the unitary light guide plate is configured to guide light along the X axis;
a support member; and
a fixing member disposed between the unitary light guide plate and the support member, the fixing member being provided around the unitary light guide plate to fix the unitary light guide plate to the support member, wherein:
the fixing member comprises at least one deformable buffer area adapted to reduce image quality degradation caused by expansion or contraction of the unitary light guide plate;
the unitary light guide plate is fixed to the support member at a first location of the support member via the at least one deformable buffer area; and
the unitary light guide plate is further fixed to the support member at a second location of the support member via the at least one deformable buffer area, the first and second locations being at opposite ends of the unitary light guide plate along the X axis.

18. A display apparatus, comprising:
a frame; and
an image display device attached to the frame, the image display device including:
an image forming unit, and
a light guide unit, the light guide unit including:
a unitary light guide plate configured to guide light of an image formed in the image forming unit, wherein the unitary light guide plate has a thickness along a Z axis and a length along an X axis, and wherein the unitary light guide plate is configured to guide the light along the X axis;
a support member; and
one or more buffer members supporting the unitary light guide plate at, at least, a plurality of locations of the support member, wherein:
the unitary light guide plate has a first elastic modulus;
at least one buffer member of the one or more buffer members has a second elastic modulus selected to reduce image quality degradation caused by expansion or contraction of the unitary light guide plate, the second elastic modulus of the at least one buffer member being smaller than the first elastic modulus of the unitary light guide plate;
the unitary light guide plate is attached to the support member at a first location of the support member via the at least one buffer member; and
the unitary light guide plate is further attached to the support member at a second location of the support member via the at least one buffer member, the first and second locations being at opposite ends of the unitary light guide plate along the X axis.

19. The display apparatus according to claim 18, wherein the frame is configured to be mounted on a viewer's head portion.

20. A display apparatus, comprising:
a frame; and
an image display device attached to the frame, the image display device including:
an image forming unit, and
a light guide unit, the light guide unit including:
a unitary light guide plate configured to guide light of an image formed in the image forming unit, wherein the unitary light guide plate has a thickness along a Z axis and a length along an X axis, and wherein the unitary light guide plate is configured to guide the light along the X axis;
a support member; and
a fixing member disposed between the unitary light guide plate and the support member, the fixing member being provided around the unitary light guide plate to fix the unitary light guide plate to the support member, wherein:
the fixing member comprises at least one deformable buffer area adapted to reduce image quality degradation caused by expansion or contraction of the unitary light guide plate;
the unitary light guide plate is fixed to the support member at a first location of the support member via the at least one deformable buffer area; and
the unitary light guide plate is further fixed to the support member at a second location of the support member via the at least one deformable buffer area, the first and second locations being at opposite ends of the unitary light guide plate along the X axis.

21. The display apparatus according to claim 20, wherein the frame is configured to be mounted on a viewer's head portion.

* * * * *